US 12,084,525 B2

(12) United States Patent
Lin et al.

(10) Patent No.: US 12,084,525 B2
(45) Date of Patent: Sep. 10, 2024

(54) SULFATE ESTER MODIFIED CELLULOSE NANOFIBERS AND METHOD FOR PRODUCING CELLULOSE NANOFIBERS

(71) Applicant: Yokogawa Electric Corporation, Tokyo (JP)

(72) Inventors: Lianzhen Lin, Kyoto (JP); Masanori Hori, Kyoto (JP); Ayako Maruta, Kyoto (JP)

(73) Assignee: Yokogawa Electric Corporation, Musashino (JP)

(*) Notice: Subject to any disclaimer, the term of this patent is extended or adjusted under 35 U.S.C. 154(b) by 0 days.

(21) Appl. No.: 17/956,990

(22) Filed: Sep. 30, 2022

(65) Prior Publication Data

US 2023/0054106 A1    Feb. 23, 2023

Related U.S. Application Data

(63) Continuation of application No. 16/477,957, filed on Jul. 15, 2019, now Pat. No. 11,535,682.

(30) Foreign Application Priority Data

Jan. 16, 2017  (JP) ................. 2017-005293
May 24, 2017  (JP) ................. 2017-102915
Sep. 22, 2017 (JP) ................. 2017-183063

(51) Int. Cl.
   *C08B 5/14*   (2006.01)
   *C08B 7/00*   (2006.01)
   *C08B 15/00*  (2006.01)

(52) U.S. Cl.
   CPC ............ *C08B 5/14* (2013.01); *C08B 7/00* (2013.01); *C08B 15/00* (2013.01)

(58) Field of Classification Search
   CPC .............. C08B 5/14; C08B 7/00; C08B 15/00
   See application file for complete search history.

(56) References Cited

U.S. PATENT DOCUMENTS

| | | | |
|---|---|---|---|
| 7,357,339 B2 | 4/2008 | Kondo et al. | |
| 8,309,708 B2 | 11/2012 | Hashaikeh et al. | |
| 8,337,901 B2 | 12/2012 | Hauser et al. | |
| 8,377,563 B2 | 2/2013 | Miyawaki | |
| 9,803,128 B2 | 10/2017 | Goi et al. | |
| 10,315,155 B2 | 6/2019 | Chu et al. | |
| 2005/0236121 A1 | 10/2005 | Kondo et al. | |
| 2007/0049746 A1 | 3/2007 | Yoshida et al. | |
| 2009/0011033 A1 | 1/2009 | Hauser et al. | |
| 2009/0247740 A1 | 10/2009 | Yoshida et al. | |
| 2010/0286387 A1 | 11/2010 | Hashaikeh et al. | |
| 2013/0303750 A1 | 11/2013 | Zhu et al. | |
| 2014/0073722 A1 | 3/2014 | Shiramizu et al. | |
| 2014/0234640 A1 | 8/2014 | Kohno | |
| 2015/0166741 A1 | 6/2015 | Ikuma et al. | |
| 2015/0203723 A1* | 7/2015 | Combs ................ | C08L 1/20 |
| | | | 428/355 CP |
| 2016/0168363 A1* | 6/2016 | Nelson ................ | D21H 11/18 |
| | | | 106/18.11 |
| 2016/0200958 A1 | 7/2016 | Goi et al. | |
| 2017/0106334 A1 | 4/2017 | Chu | |
| 2018/0312609 A1 | 11/2018 | Lin et al. | |

FOREIGN PATENT DOCUMENTS

| | | |
|---|---|---|
| CN | 103796830 A | 5/2014 |
| EP | 2 749 677 A1 | 7/2014 |
| FR | 660924 A | 7/1929 |
| JP | 2005-270891 A | 10/2005 |
| JP | 2007-092034 A | 4/2007 |
| JP | 2007-185117 A | 7/2007 |
| JP | 2008-533231 A | 8/2008 |
| JP | 2010-104768 A | 5/2010 |
| JP | 2011-056456 A | 3/2011 |
| JP | 2012-526156 A | 10/2012 |
| JP | 2013-044076 A | 3/2013 |
| JP | 2014-001361 A | 1/2014 |
| JP | 2016-011392 A | 1/2016 |

(Continued)

OTHER PUBLICATIONS

JP 2010-104768 A, English Machine Translation, Published May 12, 2010 (Year: 2010).*
Beck-Candanedo, S., et al., "Effect of Reaction Conditions on the Properties and Behavior of Wood Cellulose Nanocrystal Suspensions", Biomacromolecules, vol. 6, No. 2, 2005, pp. 1048-1054.
Roman, M., et al., "Effect of Sulfate Groups from Sulfuric Acid Hydrolysis on the Thermal Degradation Behavior of Bacterial Cellulose", Biomacromolecules, vol. 5, No. 5, 2004, pp. 1671-1677.
Bondeson, D., et al., "Optimization of the isolation of nanocrystals from microcrystalline cellulose by acid hydrolysis", vol. 13, 2006, pp. 172-180 (10 pages).
V.A. Barbash et al., "The Effect of Mechanochemical Treatment of the Cellulose on Characteristics of Nanocellulose Films", Nanoscale Research Letters, vol. 11, No. 410, 2016, pp. 1-8 (8 pages total).

(Continued)

*Primary Examiner* — Jonathan S Lau
*Assistant Examiner* — Jaret J Crews
(74) *Attorney, Agent, or Firm* — Sughrue Mion, PLLC

(57) ABSTRACT

Sulfate ester modified cellulose nanofibers having an average fiber diameter in the range of 1 nm to 500 nm, and having sulfate ester modified hydroxyl groups on surfaces of the cellulose nanofibers. A method of producing cellulose nanofibers that are nanosized, that have a high crystallinity degree, and that have large aspect ratios, the method being a chemical method that does not require any physical pulverization, that is energy-saving, and that can be performed under mild reaction conditions. A method of producing modified cellulose nanofibers including modifying the surfaces of the cellulose nanofibers through esterification or urethanization. A method of producing cellulose nanofibers includes impregnating cellulose with a fibrillation solution containing dimethylsulfoxide, at least one carboxylic acid anhydride selected from acetic anhydride and propionic anhydride, and sulfuric acid to fibrillate the cellulose.

9 Claims, 24 Drawing Sheets

(56) References Cited

FOREIGN PATENT DOCUMENTS

| JP | 2016-079202 A | 5/2016 |
| JP | WO2015/029959 A1 | 3/2017 |
| JP | 2017-082188 A | 5/2017 |
| JP | 2017-101186 A | 6/2017 |
| WO | 2015/187412 A1 | 12/2015 |
| WO | 2017/073700 A1 | 5/2017 |

OTHER PUBLICATIONS

Irina Kalashnikova et al., "Modulation of Cellulose Nanocrystals Amphiphilic Properties to Stabilixe Oil/Water Interface", Biomacromolecules, 2012, vol. 13, pp. 267-275 (9 pages total).
Third Party Observation dated Mar. 10, 2020, issued in Japanese Application No. 2018-561455.
Nanocellulose Forum, well understanding for cellulose by illustration (2015), 5 pages total.
Kawasaki Masayuki, Chemical Economy (2015) 4, 33-37 (3 pages total).
Brookfield Digital Rheometer Model DV-III+ Operating Instructions, Manual No. M/98-211-A0701 (cover, table of contents and Appendix D), retrieved Mar. 12, 2020 (6 pages total).
Tanaka et al., "Influence of Flexibility and Dimensions of Nanocellulose on the Flow Properties of Their Aqueous Dispersions", Biomacromolecules, 2015, vol. 16, pp. 2127-2131 (5 pages total).
English Translation of International Search Report, dated Apr. 3, 2018 from the International Bureau in counterpart International application No. PCT/JP2018/001070.

* cited by examiner

SULFATE ESTER MODIFIED CELLULOSE NANOFIBERS AND METHOD FOR PRODUCING CELLULOSE NANOFIBERS

CROSS-REFERENCE

This is a continuation of application Ser. No. 16/477,957 filed Jul. 15, 2019, which is a National Stage of International Application No. PCT/JP2018/001070 filed Jan. 16, 2018, claiming priority based on Japanese Patent Application No. 2017-005293 filed Jan. 16, 2017, Japanese Patent Application No. 2017-102915 filed May 24, 2017, and Japanese Patent Application No. 2017-183063 filed Sep. 22, 2017.

TECHNICAL FIELD

The present invention relates to sulfate ester modified cellulose nanofibers and a method of producing cellulose nanofibers.

BACKGROUND ART

A cellulose fiber (cell wall unit) is an assembly of cellulose nanofibers (microfibrils). The cellulose nanofibers have been socially attracting close attention as a reinforcing material because the nanofibers have mechanical characteristics comparable to those of steel and have nanostructures each having a diameter of from about 5 nm to about 20 nm. The cellulose nanofibers are bound together through hydrogen bonds therebetween. Accordingly, in order that the cellulose nanofibers may be drawn out, the hydrogen bonds need to be cleaved to separate the microfibrils (hereinafter sometimes referred to as "fibrillation"). A mechanical fibrillation method involving applying an intense physical force to cellulose and a chemical fibrillation method involving releasing the hydrogen bonds through chemical action have been known as fibrillation methods.

A method involving swelling cellulose powder with water to bring the powder into a soft state and nanosizing the powder through strong mechanical shearing with, for example, a high-pressure homogenizer or a water jet has been known as the mechanical fibrillation method (e.g., Patent Literature 1 and Patent Literature 2). The method involves a problem in that its productivity is low because pretreatment for pulverizing cellulose pulp into powder is needed. Further, the method may cause damage to the cellulose nanofibers. In addition, the nanosization of the cellulose is insufficient, and hence the nanofibers to be obtained may form such a network structure that the nanofibers are not completely disentangled from each other in some cases.

In addition, a method of producing bionanofibers, which involves jetting a dispersion of cellulose at high pressure to cause the dispersion to collide with a hard body for collision, has been known (Patent Literature 3). The method requires high energy, and hence problems in terms of production efficiency and production cost occur as the scale of an apparatus for the method increases. Further, a strong mechanical pulverization method causes a mechanochemical reaction intrinsic to a solid state, and hence involves a problem in that the crystallinity degree of the cellulose nanofibers to be obtained reduces or a problem in that the percent yield of the cellulose nanofibers reduces.

A method involving subjecting cellulose to chemical treatment, such as acid hydrolysis, to prepare a cellulose nanocrystal (CNC) has been known as the chemical fibrillation method (e.g., Non Patent Literature 1). In the method, an acid concentration is high, and hence the cellulose is vigorously hydrolyzed. Accordingly, the width of nanosized cellulose is about 20 nm, but the length thereof is only from about 200 nm to about 500 nm. In addition, an aspect ratio (ratio between the length and width of a fiber) is small. Accordingly, there is a problem in that substantially no reinforcing effect can be expressed, and hence a free-standing film to be obtained from the cellulose nanocrystal is brittle. In addition, the hydrolysis is performed, and hence the percent yield of the nanocrystal reduces.

In addition, a surface-modified cellulose nanofiber obtained by modifying the surface of a cellulose nanofiber with any appropriate functional group has a high affinity for a polymer material, and is hence useful as a raw material for various polymer composite materials. The nanofiber has been utilized in, for example, a heat-dissipating material formed of a composite material of heat conductive inorganic particles and cellulose nanofibers (Patent Literature 4). Specifically, a method involving swelling and/or partially dissolving a cellulose-based substance with a mixed solvent containing an ionic liquid and an organic solvent, and then esterifying the resultant has been known as a method of producing cellulose nanofibers having esterified surfaces (Patent Literature 5 and Patent Literature 6). However, when the mixed solvent containing the ionic liquid and the organic solvent is used, cost concerning the recovery and reuse of the ionic liquid is high.

In addition, modified cellulose subjected to sulfuric acid esterification is used in applications such as a medical material and a surfactant. A method of producing sulfuric acid-esterified cellulose is, for example, a sulfur trisulfide/N,N-dimethylformamide synthesis method, a chlorosulfonic acid/pyridine method, or an ammonium sulfate method. In each of the methods, conditions for a synthesis reaction are severe, and hence the degree of substitution of the cellulose is difficult to control. Accordingly, a problem, such as a reduction in molecular weight thereof, occurs. In addition, a method involving adding cellulose to a mixed solution of sulfuric anhydride and dimethylformamide, and subjecting the surfaces of cellulose particles to sulfuric acid esterification modification while controlling the temperature of the mixture with an ice bath has been known (Patent Literature 7). The sulfuric acid-esterified cellulose prepared by the sulfuric acid esterification method is not a cellulose nanofiber but a cellulose derivative in which cellulose I crystalline structure intrinsic to natural cellulose and microfibrils are broken.

In recent years, a method of producing modified cellulose involving using a fibrillation solution containing an aprotic polar solvent, a base catalyst and an acid catalyst, and a carboxylic acid anhydride has been proposed (Patent Literature 8 and Patent Literature 9). In particular, in Patent Literature 8, sulfuric acid is given as an example of a catalyst. However, an experiment by the inventors of the present invention has provided a finding that, when dimethylsulfoxide is used as a fibrillation solvent and sulfuric acid is used as a catalyst, the acetylation modification of cellulose cannot be performed.

CITATION LIST

Patent Literature

[PTL 1] JP 2005-270891 A
[PTL 2] JP 2007-185117 A
[PTL 3] JP 2011-056456 A
[PTL 4] JP 2016-79202 A

[PTL 5] JP 2010-104768 A
[PTL 6] JP 2013-44076 A
[PTL 7] JP 2007-92034 A
[PTL 8] JP 2017-82188 A
[PTL 9] WO 2017/073700 A1

Non Patent Literature

[NPL 1] Biomacromolecules 2005, 6, 1048-1054

SUMMARY OF INVENTION

Technical Problem

The present invention provides novel cellulose nanofibers that have an average fiber diameter in the range of 1 nm to 500 nm, and that have sulfuric acid-esterified hydroxyl groups on surfaces of the cellulose nanofibers. The present invention also provides a method of producing cellulose nanofibers that are nanosized, that have a high crystallinity degree, and that have large aspect ratios, the method being a chemical method that does not require any physical pulverization, that is energy-saving, and that can be performed under mild reaction conditions. The present invention also provides a method of producing modified cellulose nanofibers including modifying the surfaces of the cellulose nanofibers through esterification, urethanization, or the like.

Solution to Problem

The inventors of the present invention have made extensive investigations with a view to achieving the object, and as a result, have found a method of producing cellulose nanofibers that have nanosized fiber diameters, that have a high crystallinity degree, and that are less vulnerable to fiber shape damage, the method including impregnating cellulose with a fibrillation solution containing dimethylsulfoxide, at least one carboxylic acid anhydride selected from acetic anhydride and propionic anhydride, and sulfuric acid to fibrillate the cellulose. The inventors have also found that the use of the method provides novel cellulose nanofibers having sulfuric acid-esterified hydroxyl groups on surfaces of the cellulose nanofibers.

In one aspect of the present invention, there are provided sulfate ester modified cellulose nanofibers. The sulfate ester modified cellulose nanofibers have an average fiber diameter in the range of 1 nm to 500 nm, and have sulfate ester modified hydroxyl groups on surfaces of the cellulose nanofibers.

In one embodiment, the cellulose nanofibers have a sulfur content of from 0.01 wt % to 35 wt %.

In one embodiment, the cellulose nanofibers each have cellulose I crystalline structure.

In another aspect of the present invention, there is provided a method of producing cellulose nanofibers. The production method includes impregnating cellulose with a fibrillation solution containing dimethylsulfoxide, at least one carboxylic acid anhydride selected from acetic anhydride and propionic anhydride, and sulfuric acid to fibrillate the cellulose.

In one embodiment, a weight ratio between the cellulose and the fibrillation solution is from 0.5/99.5 to 50/50 in terms of former/latter ratio.

In one embodiment, the cellulose nanofibers to be obtained by the production method include cellulose nanofibers having sulfate ester modified hydroxyl groups on surfaces of the cellulose nanofibers.

In one embodiment, a concentration of the sulfuric acid in the fibrillation solution is from 0.05 wt % to 15 wt %.

In one embodiment, a concentration of the carboxylic acid anhydride in the fibrillation solution is from 0.5 wt % to 90 wt %.

In still another aspect of the present invention, there is provided a method of producing modified cellulose nanofibers. The production method includes the steps of: producing cellulose nanofibers by the above-mentioned method; and reacting the resulted cellulose nanofibers to further react with an esterification modification agent or a urethanization modification agent to modify surfaces of the cellulose nanofibers.

In one embodiment, a concentration of sulfuric acid in a fibrillation solution to be used in the step of producing the cellulose nanofibers is from 0.05 wt % to 5 wt %.

In one embodiment, the esterification modification agent includes at least one kind selected from a carboxylic acid anhydride, a vinyl carboxylate, a carboxylic acid halide, and a carboxylic acid.

In one embodiment, the urethanization modification agent includes an isocyanate.

Advantageous Effects of Invention

The cellulose nanofibers of the present invention have an average fiber diameter in the range of 1 nm to 500 nm, and have sulfuric acid-esterified hydroxyl groups on the surfaces of the cellulose nanofibers. The cellulose nanofibers having sulfuric acid-esterified hydroxyl groups on surfaces of the cellulose nanofibers (hereinafter sometimes referred to as "sulfate ester modified cellulose nanofibers") of the present invention are novel modified cellulose nanofibers that have not heretofore been known. Further, in the sulfate ester modified cellulose nanofibers of the present invention, a cellulose I crystalline structure intrinsic to natural cellulose is not broken and can be maintained. The sulfate ester modified cellulose nanofibers of the present invention have high mechanical strength, and have a high viscosity and high thixotropy. The sulfate ester modified cellulose nanofibers can be easily redispersed in water even after having been dried.

The fibrillation solution to be used in the present invention contains dimethylsulfoxide, acetic anhydride and/or propionic anhydride, and sulfuric acid. The fibrillation solution can be impregnated even into a space between the microfibrils or elementary microfibrils of a cellulose fiber to efficiently cleave a hydrogen bond between the fibrils through a chemical reaction or physical action. Accordingly, according to the present invention, cellulose nanofibers can be produced in an energy-saving manner and at a high fibrillation rate. In addition, according to the present invention, the fiber diameters of cellulose nanofibers can be easily controlled, and hence cellulose nanofibers each having a fiber diameter of from several nanometers to several hundreds of nanometers can be easily prepared. Further, the chemicals to be used in the fibrillation solution are easily available, and the safety of the fibrillation solution is high. Further, the acid concentration in the fibrillation solution is low, and hence damage to the cellulose is low.

DESCRIPTION OF EMBODIMENTS

<A. Sulfate ester modified Cellulose Nanofibers>

Figure 1:
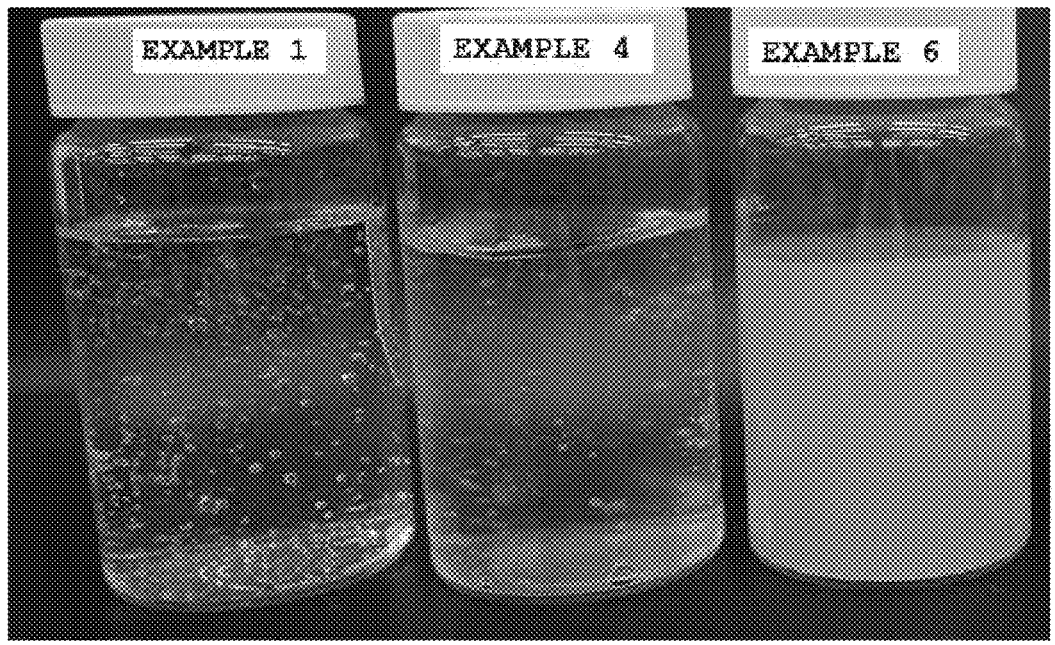
FIG. 1 is a photograph of aqueous dispersions (solid content concentration: 0.25 wt %) of cellulose nanofibers obtained in Examples 1, 4, and 6.

Cellulose nanofibers of the present invention have an average fiber diameter in the range of from 1 nm to 500 nm, and have sulfuric acid-esterified hydroxyl groups on the surfaces of the cellulose nanofibers. The cellulose nanofibers may be such that all the hydroxyl groups on the surfaces of the cellulose nanofibers are subjected to sulfuric acid esterification modification, or may be such that only part of the hydroxyl groups are subjected to sulfuric acid esterification modification. A sulfate ester modified cellulose derivative has heretofore been known as sulfuric acid-esterified cellulose. However, sulfate ester modified cellulose nanofibers have not been known. The sulfate ester modified cellulose nanofibers of the present invention each have cellulose I crystalline structure intrinsic to natural cellulose. Accordingly, excellent characteristics of cellulose can be suitably maintained. Further, each of the cellulose nanofibers has high hydrophilicity, and is excellent in water retaining property and moisture retaining property. In addition, the sulfate ester modified cellulose nanofibers of the present invention are excellent in adsorbing properties for a cation, a metal, inorganic particles, and the like. Further, the sulfate ester modified cellulose nanofibers of the present invention have antiviral properties. As described later, the sulfuric acid esterification modification ratio of the sulfate ester modified cellulose nanofibers of the present invention may be adjusted within a desired range. Accordingly, the nanofibers may be turned into sulfate ester modified cellulose nanofibers having a high sulfuric acid esterification modification ratio and then used as they are in any appropriate applications. In addition, the nanofibers may be turned into sulfate ester modified cellulose nanofibers having a low sulfuric acid esterification modification ratio and then used as modified cellulose nanofibers further modified with any appropriate modification reaction agent. The sulfate ester modified cellulose nanofibers of the present invention may each have any other functional group, such as an acetyl group or a propionic group.

The sulfuric acid esterification modification ratio of the sulfate ester modified cellulose nanofibers to be obtained in the present invention may be set to any appropriate value in accordance with applications and the like. The sulfuric acid esterification modification ratio of the sulfate ester modified cellulose nanofibers may be represented by a sulfur content (wt %) in the cellulose nanofibers. The sulfur content (wt %) in the sulfate ester modified cellulose nanofibers is preferably from 0.01 wt % to 35 wt %, more preferably from 0.1 wt % to 28 wt %, still more preferably from 0.5 wt % to 20 wt %. When the sulfur content is more than 35 wt %, the crystallinity degree and heat resistance of the nanofibers may reduce. When the sulfur content is less than 0.01 wt %, a characteristic of a sulfuric acid ester functional group may not be sufficiently obtained, and hence desired characteristics as the sulfate ester modified cellulose nanofibers cannot be exhibited in some cases. Even sulfate ester modified cellulose nanofibers having a sulfur content of less than 0.01 wt % can be suitably used in a modification step involving using a modification reaction agent to be described later.

The sulfur content (wt %) in the cellulose nanofibers may be determined by a combustion absorption-ion chromatography (IC) method. The content may also be identified by infrared spectroscopy (IR). Herein, a sulfur content measured by the following method is defined as the sulfur content of the sulfate ester modified cellulose nanofibers.

Measurement method: Combustion absorption-IC

Measuring apparatus: ICS-1500 manufactured by Nippon Dionex K.K.

Measurement conditions: A sample was weighed in a magnetic board and burned under an oxygen atmosphere (flow rate: 1.5 L/min) in a ring furnace (1,350° C.). Three percent hydrogen peroxide water (20 ml) was caused to absorb a produced gas component to provide an absorbed liquid. The resultant absorbed liquid was diluted in measuring cylinder to 100 ml with pure water, and the diluted liquid was subjected to ion chromatography. A sulfate ion concentration with respect to the cellulose nanofibers was calculated from a measurement result. Further, the sulfate ion concentration was converted into the sulfur content with the following equation. The detection limit value of the sulfate ion concentration based on cellulose by the method is 0.01 wt %. Accordingly, the determination lower limit value of the sulfur content converted from the sulfate ion concentration is 0.01 wt %. Accordingly, sulfate ester modified cellulose nanofibers having a sulfur content of less than 0.01 wt % may be cellulose nanofibers that are unmodified (i.e., not subjected to sulfuric acid esterification modification).

$$\text{Sulfur content (wt \%)} = \text{sulfate ion concentration} \times 32/96$$

The average fiber diameter of the sulfate ester modified cellulose nanofibers of the present invention falls within the range of from 1 nm to 500 mm. The average fiber diameter of the cellulose nanofibers is preferably from 2 nm to 100 nm, more preferably from 3 nm to 50 nm, still more preferably from 5 nm to 20 nm. When the average fiber diameter is less than 1 nm, the performance of the nanofibers, such as strength, may reduce. When the average fiber diameter is more than 500 nm, fiber diameters are large, and hence the performance as the nanofibers tends to be hardly exhibited. The average fiber diameter refers to a value obtained by randomly selecting 50 fibers from an image of a SEM photograph and averaging their diameters.

The sulfate ester modified cellulose nanofibers of the present invention have high aspect ratios. The fiber lengths and aspect ratios of the cellulose nanofibers are important in many applications. The lengths of the sulfate ester modified cellulose nanofibers of the present invention are so long that it is difficult to measure the lengths through a direct observation approach, such as a SEM. Accordingly, it is difficult to define the fiber lengths and the aspect ratios through measurement. Therefore, herein, as an indirect method, the viscosity and thixotropy index (TI value) of an aqueous dispersion of the cellulose nanofibers were used as indicators of their fiber lengths and aspect ratios.

The viscosity of the aqueous dispersion of the sulfate ester modified cellulose nanofibers of the present invention (0.3 wt % aqueous dispersion of the cellulose nanofibers, measurement temperature: 25° C., number of revolutions: 2.6 rpm) is, for example, 500 mPa·s or more, preferably from 500 mPa·s to 25,000 mPa·s, more preferably from 800 mPa·s to 20,000 mPa·s, still more preferably from 1,000 mPa·s to 18,000 mPa·s, particularly preferably from 1,500 mPa·s to 15,000 mPa·s.

In addition, the TI value (2.6 rpm/26 rpm) of the 0.3 wt % aqueous dispersion of the sulfate ester modified cellulose nanofibers of the present invention at 25° C. is, for example, from 3 to 30, preferably from 4 to 25, more preferably from 5 to 20. When the value of the viscosity and the TI value fall within such ranges, a state in which the average fiber diameter of the cellulose nanofibers is 500 nm or less and the aspect ratios thereof are 100 or more can be secured.

The viscosity and the TI value are preferably larger than their minimum values because the fiber diameters of the nanofibers reduce and the fiber lengths thereof increase. The viscosity and the TI value are more preferably even larger because the cellulose nanofibers can be applied as a thickener or a thixotropy-imparting agent.

The TI value was determined through the measurement of the viscosities of the aqueous dispersion by the following method (in conformity with JIS K 6833).

TI value=ηa/ηb (ηa: viscosity at a number of revolutions "a" (rpm), ηb: viscosity at a number of revolutions "b" (rpm), the number of revolutions "b" is 10 times as large as the number of revolutions "a")

In this embodiment, viscosities at numbers of revolutions of 2.6 rpm and 26 rpm were measured with an E-type rotational viscometer at 25° C. (the viscosities were each measured three times, and the average of the measured values was adopted), and the thixotropy index (TI) value was calculated from the following equation.

$$TI \text{ value} = (\text{viscosity at } 25° \text{ C. and } 2.6 \text{ rpm})/(\text{viscosity at } 25° \text{ C. and } 26 \text{ rpm})$$

As described above, sulfate ester modified cellulose nanofibers having a sulfur content of less than 0.01 wt % may be cellulose nanofibers that are unmodified (i.e., not subjected to sulfuric acid esterification modification). The viscosity of the sulfate ester modified cellulose nanofibers having a sulfur content of less than 0.01 wt % may be set to any appropriate value. The viscosity (viscosity at a number of revolutions of 5 rpm) of a 0.3 wt % aqueous dispersion of the sulfate ester modified cellulose nanofibers having a sulfur content of less than 0.01 wt % at 25° C. is, for example, from 200 mPa·s to 15,000 mPa·s, preferably from 300 mPa·s to 10,000 mPa·s, more preferably from 500 mPa·s to 8,000 mPa·s, still more preferably from 800 mPa·s to 5,000 mPa·s.

The TI value of the cellulose nanofibers having a sulfur content of less than 0.01 wt % at 25° C. is, for example, from 3 to 25, preferably from 4 to 20, more preferably from 5 to 15. When the value of the viscosity and the TI value fall within such ranges, a state in which the average fiber diameter of the cellulose nanofibers is 500 nm or less and the aspect ratios thereof are 100 or more can be secured. The viscosity and the TI value are preferably larger than their minimum values because the fiber diameters of the nanofibers reduce and the fiber lengths thereof increase. The viscosity and the TI value are more preferably even larger because the cellulose nanofibers can be applied as a thickener or a thixotropy-imparting agent. A method of measuring the TI value is the same as that described above except that the numbers of revolutions at which the viscosities of the aqueous dispersion are measured are set to numbers of revolutions of 10 rpm and 100 rpm at 25° C.

The crystallinity degree of the sulfate ester modified cellulose nanofibers of the present invention (including a case in which the nanofibers have a sulfur content of less than 0.01 wt %, and are hence unmodified cellulose nanofibers) may depend on raw material cellulose to be used. For example, the original crystallinity degree of cotton-based cellulose may be higher than that of wood-based cellulose. That is, the crystallinity degree of the cellulose nanofibers varies depending on the raw material cellulose to be used. However, the crystallinity degree of the cellulose nanofibers affects the performance of the cellulose nanofibers, such as their heat resistance, thickening effect, or reinforcing effect, and is hence preferably from 20% to 99%, more preferably from 30% to 95%, still more preferably from 40% to 90%, particularly preferably from 50% to 85%. When the crystallinity degree is less than 20%, the heat resistance or rigidity of the cellulose nanofibers may reduce. Meanwhile, when the crystallinity degree is more than 99%, the control of a fibrillation condition or the selection of a raw material may be severe.

The sulfate ester modified cellulose nanofibers may be used in any appropriate applications. The sulfate ester modified cellulose nanofibers of the present invention have a large viscosity and large thixotropy, and hence the transparency and mechanical strength of a dispersion thereof or a film formed by using the dispersion are high. Further, the nanofibers can be redispersed in water even after having been dried. Accordingly, applications thereof include a reinforcing material, a functional material, a matrix material, a thickener, a humectant, a surfactant, and a solid catalyst. In particular, the nanofibers can be expected to find applications in many fields, such as electronic, optical, material, pharmaceutical, medical, chemical, food, and cosmetic fields. Examples of the applications include: a reinforcing material for a film, a sheet material, a resin, or an inorganic material; and a thickener or thixotropy-imparting agent for a liquid material, such as an adhesive, a paint, or an ink. Further, the sulfate ester modified cellulose nanofibers have antiviral properties. Accordingly, the nanofibers can be suitably used in the medical field.

A film may be formed from the sulfate ester modified cellulose nanofibers of the present invention. Further, a composited film may be formed by further mixing the sulfate ester modified cellulose nanofibers with any other organic material or inorganic material. A method of forming a film from the sulfate ester modified cellulose nanofibers may be a dry method, or may be a wet method.

When a film is formed by the wet method, for example, after fibrillation, a fibrillation solution containing the sulfate ester modified cellulose nanofibers is cast or applied onto a substrate, and the resultant is immersed in a solvent capable of coagulating the sulfate ester modified cellulose nanofibers or causing the nanofibers to gel so that the nanofibers may be coagulated. Next, the resultant is washed and dried to provide the film. Any appropriate solvent may be used as the solvent capable of coagulating the nanofibers or causing the nanofibers to gel (hereinafter sometimes referred to as "coagulating solvent"). An aqueous solution of a polyvalent alkaline substance or an alcohol is preferred as the coagulating solvent.

When a film is formed by the dry method, the film is formed by: casting or applying a dispersion obtained by dispersing the sulfate ester modified cellulose nanofibers, which have been washed, in water or an alcohol onto a substrate; and volatilizing the solvent. The dispersing solvent of the dispersion of the sulfate ester modified cellulose nanofibers to be used in the dry method only needs to be a solvent in which the sulfate ester modified cellulose nanofibers can be dispersed, and any appropriate solvent may be used. For example, water, an alcohol, and an amide-based solvent, and a mixed solvent thereof are preferred. Water or a mixed solvent containing water is particularly preferred.

At the time of the film forming, heating may be performed for volatilizing the solvent. When the heating is performed, a temperature may be set to any appropriate temperature. For example, when water is used as the solvent, a forming temperature is preferably from 20° C. to 100° C., more preferably from 30° C. to 90° C. A case in which the forming temperature is much lower than the boiling point of the solvent to be used is not preferred because the volatilization rate of the solvent is slow. When the forming temperature is excessively higher than the boiling point of the solvent, air bubbles may occur owing to the volatilization of the solvent to reduce the transparency of the film.

When the composited film of the sulfate ester modified cellulose nanofibers and the resin is formed, a resin soluble in water, an alcohol, a ketone, or an amide-based solvent is preferred. Examples thereof include polyvinyl alcohol, hydroxypropyl cellulose, carboxymethyl cellulose, and polyvinyl butyral.

Any appropriate method is used as a method of forming the composited film of the sulfate ester modified cellulose nanofibers and the resin. For example, after a solution having dissolved therein the resin and a dispersion of the sulfate ester modified cellulose nanofibers have been mixed to prepare a mixed solution, the solution may be turned into a film as in the above-mentioned sulfate ester modified cellulose nanofiber film.

Further, when a composited film of the sulfate ester modified cellulose nanofibers and inorganic particles is formed, the composited film is obtained by: dispersing the inorganic particles in a dispersion of the sulfate ester modified cellulose nanofibers; and then forming the resultant in the same manner as in the above-mentioned film forming method.

<B. Method of producing Cellulose Nanofibers>

A method of producing cellulose nanofibers of the present invention includes impregnating cellulose with a fibrillation solution containing dimethylsulfoxide (hereinafter sometimes referred to as "DMSO"), at least one carboxylic acid anhydride selected from acetic anhydride and propionic anhydride, and sulfuric acid to fibrillate the cellulose (hereinafter sometimes referred to as "fibrillation step"). The method of producing cellulose nanofibers of the present invention is characterized in that pretreatment for the cellulose, such as mechanical crushing, is not required, and the fibrillation solution is directly impregnated into the cellulose to fibrillate and nanosize the cellulose.

More specifically, the fibrillation solution is impregnated into a space between the microfibrils or elementary microfibrils of a cellulose fiber to efficiently cleave a hydrogen bond therebetween through a chemical reaction or physical action. Thus, the microfibrils can disentangle by themselves to provide cellulose nanofibers (microfibrils or elementary microfibrils). The average fiber diameter of the cellulose nanofibers can be easily controlled to from several nanometers to several hundreds of nanometers by controlling the addition amounts of sulfuric acid and the carboxylic acid anhydride, a treatment time, a stirring speed, and a shear force.

A sulfuric acid esterification modification ratio may be affected by a sulfuric acid concentration in the fibrillation solution, the concentration of acetic anhydride or propionic anhydride therein, a stirring time, and the shear force of stirring. For example, in the case where the sulfuric acid concentration in the fibrillation solution, and the concentration of acetic anhydride or propionic anhydride therein are increased, even when a milder stirring method is used, sulfate ester modified cellulose nanofibers having a high sulfuric acid esterification modification ratio may be obtained. Specifically, in the case where the concentration of acetic anhydride or propionic anhydride in the fibrillation solution is set to 8 wt % or more, and the sulfuric acid concentration therein is set to 0.5 wt % or more, even when the fibrillation solution and the cellulose are stirred by using a mild stirring method, such as a magnetic stirrer or a flask, 0.5 hour or more of stirring treatment provides sulfate ester modified cellulose nanofibers having an average fiber diameter in the range of 1 nm to 10 nm and a sulfuric acid esterification modification ratio of 0.01 wt % or more in terms of sulfur content.

Meanwhile, even in the case where the sulfuric acid concentration in the fibrillation solution, and the concentration of acetic anhydride or propionic anhydride therein are reduced, sulfate ester modified cellulose nanofibers having a high sulfuric acid esterification modification ratio may be obtained by using stronger stirring means. Specifically, in the case where the concentration of acetic anhydride or propionic anhydride in the fibrillation solution is set to from 0.5 wt % to 8 wt %, and the sulfuric acid concentration therein is set to from 0.05 wt % to 0.5 wt %, through the use of strong stirring means, such as a bead mill, a paint shaker, or a homogenizer, even when the fibrillation solution and the cellulose are treated for any appropriate time period, sulfate ester modified cellulose nanofibers having an average fiber diameter in the range of 1 nm to 10 nm and a sulfuric acid esterification modification ratio of 0.01 wt % or more in terms of sulfur content are obtained.

In addition, the water content of the raw material cellulose or a water content in a reaction system may affect the modification ratio. As the water content increases, the sulfuric acid esterification reaction ratio of the cellulose may reduce to reduce the modification ratio of the resulted cellulose nanofibers. Further, the sulfuric acid esterification modification ratio of the sulfate ester modified cellulose nanofibers may be set to a desired value by appropriately setting the addition amounts of sulfuric acid and the carboxylic acid anhydride, and a reaction condition. Therefore, those conditions only need to be appropriately adjusted so that a desired sulfuric acid esterification modification ratio may be obtained. For example, cellulose nanofibers having such a sulfuric acid esterification modification ratio as to be capable of exhibiting characteristics suitable as sulfate ester modified cellulose nanofibers are obtained. In addition, cellulose nanofibers having characteristics substantially the same as those of unmodified cellulose nanofibers may be obtained by suppressing the sulfuric acid esterification modification ratio. As described above, when the sulfuric acid esterification modification ratio is equal to or less than the detection limit value, the cellulose nanofibers to be obtained may be unmodified cellulose nanofibers.

In addition, when cellulose nanofibers having a low sulfuric acid esterification modification ratio (e.g., less than 0.01 wt % in terms of sulfur content) are prepared, cellulose nanofibers having an average fiber diameter in the range of 5 nm to 500 nm and a low sulfuric acid esterification modification ratio are obtained by, for example, setting the concentration of acetic anhydride or propionic anhydride in the fibrillation solution to from 0.5 wt % to 10 wt %, setting the sulfuric acid concentration therein to from 0.05 wt % to 5 wt %, and controlling the strength of the shear force of the stirring and the stirring time. In addition, when the sulfuric acid concentration in the fibrillation solution is set to from 0.05 wt % to 1 wt %, cellulose nanofibers having a low sulfuric acid esterification modification ratio are obtained by treating the fibrillation solution and the cellulose through the use of a mild stirring method, such as a stirrer or a flask, for from 1 hour to 3 hours. In addition, when strong stirring means, such as a bead mill, a paint shaker, or a homogenizer, is used, the stirring time only needs to be suppressed to 2 hours or less. In addition, in order to obtain sulfate ester modified cellulose nanofibers having a low sulfuric acid esterification modification ratio, when the sulfuric acid concentration in the fibrillation solution is set to from 1 wt % to 5 wt %, the treatment time is preferably suppressed to 2 hours or less irrespective of the strength of the stirring.

The mechanism via which the cellulose is fibrillated in the fibrillation solution containing dimethylsulfoxide, acetic anhydride and/or propionic anhydride, and sulfuric acid has not been elucidated. However, dimethylsulfoxide and acetic anhydride or propionic anhydride are reaction auxiliaries indispensable to the sulfuric acid esterification reaction of the cellulose, and are hence assumed to accelerate the sulfuric acid esterification reaction of the cellulose. That is, the sulfuric acid esterification modification reaction of the cellulose nanofibers in the production method of the present invention may be performed through dimethylsulfoxide and acetic anhydride or propionic anhydride.

B-1. Raw Material Cellulose

The cellulose serving as a raw material for the cellulose nanofibers may be in the form of cellulose alone, such as: pulp, such as linter pulp, wood pulp, or bamboo pulp; or cotton. The cellulose may be in a mixed form containing a non-cellulose component, such as lignin or hemicellulose; examples of the form include wood, bamboo, old paper, and straw. A cellulose substance containing cellulose I crystalline structure is preferred as the raw material cellulose. Examples of the cellulose substance containing cellulose I crystalline structure include substances each containing wood-derived cellulose pulp, linter pulp, cotton, cellulose powder, wood, or bamboo.

The lignin content of the raw material cellulose is preferably 20 wt % or less, more preferably 15 wt % or less, still more preferably 10 wt % or less. When the lignin content is excessively large, the fibrillation rate of the cellulose may become slower. In addition, the content of cellulose containing a cellulose I crystalline structure out of the cellulose in the raw material cellulose is preferably 20 wt % or more, more preferably 30 wt % or more, still more preferably 40 wt % or more, particularly preferably 50 wt % or more.

The water content of the raw material cellulose is not particularly limited, and may be set to any appropriate value. The water content of the raw material cellulose is preferably from 0 wt % to 50 wt %, more preferably from 2 wt % to 20 wt %, still more preferably from 3 wt % to 15 wt %, particularly preferably from 5 wt % to 10 wt %. In addition, when sulfate ester modified cellulose nanofibers having a high sulfuric acid esterification modification ratio are produced, the water content of the raw material cellulose is preferably from 0 wt % to 50 wt %, more preferably from 0.5 wt % to 20 wt %, still more preferably from 1 wt % to 15 wt %, particularly preferably from 1.5 wt % to 10 wt %. When the raw material cellulose contains moisture, the impregnation of the fibrillation solution into a space between the microfibrils can be facilitated (i.e., the impregnation rate of the fibrillation solution increases). Meanwhile, when the water content of the raw material cellulose is more than 50 wt %, the fibrillation rate tends to reduce. Further, the sulfuric acid esterification modification ratio may reduce.

The shape of the raw material cellulose is not particularly limited, and raw material cellulose of any appropriate shape is selected so as to be suitable for the impregnation of the fibrillation solution and stirring at the time of fibrillation treatment for the cellulose. As a preferred example, for example, when cellulose pulp is used, the pulp only needs to be cut into a size of from several millimeters to several tens of centimeters in accordance with the size of a fibrillation reaction apparatus. The fibrillation solution to be used in the present invention has high impregnability, and hence there is no need to excessively pulverize the cellulose into powder. In addition, when raw material cellulose containing a large amount of lignin, such as wood, bamboo, or an agricultural residue, is used, the cellulose is preferably turned into a chip shape, a fibrous shape, or a particle shape to be exposed from a non-cellulose substance, such as lignin, to the extent possible.

In the fibrillation step, a weight ratio between the cellulose and the fibrillation solution is preferably from 0.5/99.5 to 50/50 in terms of former/latter ratio, more preferably from 1/99 to 30/70 in terms of former/latter ratio, still more preferably from 1.5/98.5 to 20/80 in terms of former/latter ratio, particularly preferably from 2/98 to 15/85 in terms of former/latter ratio. When the weight ratio of the cellulose is excessively low, the production efficiency of the cellulose nanofibers may reduce. In addition, when the weight ratio of the cellulose is excessively high, a time period for a reaction between the cellulose and the fibrillation solution lengthens, and hence there is a risk in that productivity reduces and the size uniformity of the nanofibers to be obtained reduces.

The average fiber diameter of the cellulose nanofibers to be obtained by the production method of the present invention is not limited, and for example, the average fiber diameter falls within the range of from 1 nm to 500 nm. The average fiber diameter of the cellulose nanofibers is preferably from 2 nm to 100 nm, more preferably from 3 nm to 50 nm, still more preferably from 5 nm to 20 nm. When the average fiber diameter is less than 1 nm, the percent yield of the nanofibers tends to reduce, and the performance of the nanofibers, such as strength, may reduce. When the average fiber diameter is more than 500 nm, fiber diameters are large, and hence the performance as the nanofibers tends to be hardly exhibited. The average fiber diameter refers to a value obtained by randomly selecting 50 fibers from an image of a SEM photograph and averaging their diameters.

As described above, in the method of producing cellulose nanofibers of the present invention, the sulfuric acid esterification modification ratio of the cellulose nanofibers may be set to a desired value by appropriately setting, for example, the contents of acetic anhydride and/or propionic anhydride, and sulfuric acid in the fibrillation solution, and a fibrillation condition. When the sulfur content (sulfuric acid esterification modification ratio) of the cellulose is equal to or less than the detection limit value, the resulted cellulose nanofibers may be unmodified cellulose nanofibers.

The cellulose nanofibers to be obtained by the production method of the present invention may be modified cellulose nanofibers having sulfuric acid-esterified hydroxyl groups on the surfaces of the cellulose nanofibers. In addition, cellulose nanofibers that may be substantially used as unmodified cellulose nanofibers may be obtained by suppressing their modification ratio. As described above, cellulose nanofibers suppressed in sulfuric acid esterification modification ratio may be unmodified cellulose nanofibers. As described above, the fibrillation solution to be used in the present invention contains DMSO, sulfuric acid, and acetic anhydride and/or propionic anhydride. In this embodiment, DMSO, and acetic anhydride and/or propionic anhydride are reaction auxiliaries indispensable to the sulfuric acid esterification reaction of the cellulose, and are hence assumed to accelerate the sulfuric acid esterification reaction of the cellulose.

DMSO is a solvent having excellent impregnability into the cellulose. Sulfuric acid reacts with a hydroxyl group of the cellulose through DMSO, and acetic anhydride and/or propionic anhydride described above to accelerate the sulfuric acid esterification modification reaction rate and fibrillation rate of the cellulose. Therefore, sulfate ester modified cellulose nanofibers may be produced by adding the cellulose to the fibrillation solution and stirring the mixture. The sulfuric acid esterification modification ratio of the nanofibers may be controlled in a wide range by the addition amounts of sulfuric acid, and acetic anhydride and/or propionic anhydride, a stirring time, and a shear force.

In this embodiment, the fibrillation solution is impregnated into a space between the microfibrils or elementary microfibrils of the cellulose fiber to subject hydroxyl groups on the surfaces of the microfibrils to sulfuric acid esterification modification, thereby efficiently cleaving a hydrogen bond therebetween. Thus, cellulose nanofibers (microfibrils or elementary microfibrils) (substantially sulfate ester modified cellulose nanofibers) are obtained. The reaction mechanism via which the cellulose is subjected to sulfuric acid esterification modification under a mild reaction condition like that of the present invention has not been clearly understood. DMSO, and acetic anhydride and/or propionic anhydride are reaction auxiliaries indispensable to the sulfuric acid esterification reaction of the cellulose, and hence sulfuric acid is assumed to easily undergo an esterification reaction with a hydroxyl group of the cellulose by virtue of their action. The sulfuric acid esterification modification ratio and fiber diameters of the cellulose nanofibers to be obtained may be easily controlled by controlling the addition amounts of acetic anhydride and/or propionic anhydride, and sulfuric acid, and reaction conditions (e.g., a stirring speed or a shear force and a time period). For example, in the case where the sulfuric acid concentration in the fibrillation solution is low, the following tendency is observed: the sulfuric acid esterification modification ratio reduces, and the fiber diameters of the nanofibers to be obtained increase. In this case, cellulose nanofibers having a low sulfuric acid esterification modification ratio and small fiber diameters may be prepared by using a strong stirring apparatus, such as a paint shaker or a bead mill, in combination.

B-2. Fibrillation Solution

B-2-1. Dimethylsulfoxide

DMSO in the fibrillation solution is assumed to function as an impregnating solvent, and as fibrillation and modification reaction auxiliaries. The fibrillation solution may contain a solvent except DMSO as required. Examples thereof include: sulfoxide-based solvents except DMSO; amide-based solvents, such as dimethylacetamide (DMAc), dimethylformamide (DMF), N-methylacetamide, formamide, and N-methylformamide; glycol-based solvents, such as ethylene glycol and propylene glycol; alcohol-based solvents, such as methanol, ethanol, and isopropyl alcohol; and acetonitrile. When the fibrillation solution contains a solvent except DMSO, the content of the solvent except DMSO is preferably 50 wt % or less, more preferably 30 wt % or less of the fibrillation solution. When the content of the solvent except DMSO is excessively high, the sulfuric acid esterification reaction rate of the cellulose may reduce.

The content of DMSO in the fibrillation solution may be set to any appropriate value. Specifically, DMSO is used so that the concentrations of sulfuric acid, and acetic anhydride and/or propionic anhydride in the fibrillation solution may be desired concentrations.

B-2-2. Sulfuric Acid

The sulfuric acid concentration in the fibrillation solution affects the fibrillation rate, and the fiber diameters and sulfuric acid esterification modification ratio of the sulfate ester modified cellulose nanofibers to be obtained. Sulfuric acid in the fibrillation solution serves to accelerate the fibrillation rate, while being a sulfuric acid esterification reaction agent, to improve the fibrillation efficiency of the cellulose.

The concentration of sulfuric acid in the fibrillation solution is preferably from 0.05 wt % to 15 wt %, more preferably from 0.1 wt % to 10 wt %, still more preferably from 0.3 wt % to 8 wt %. When the concentration of sulfuric acid is less than 0.05 wt %, the sulfuric acid esterification reaction may become slower, and hence the fibrillation efficiency may reduce. When the concentration of sulfuric acid is more than 15 wt %, the sulfuric acid esterification reaction is performed, but side reactions, such as the hydrolysis and/or oxidation reaction of the cellulose, and the oxidation of DMSO, may occur. In addition, such high concentration leads to an increase in usage amount of a chemical for neutralization or in usage amount of a washing agent for washing. Further, when the concentration of sulfuric acid is excessively high, the impregnability of the fibrillation solution into the cellulose reduces, and hence the fibrillation rate or fibrillation degree of the cellulose may reduce.

In addition, when cellulose nanofibers suitable for an esterification modification reaction or urethanization reaction to be described later (e.g., cellulose nanofibers having a sulfur content of less than 0.01 wt %) are produced, the concentration of sulfuric acid in the fibrillation solution may be set to any appropriate amount. The concentration of sulfuric acid in the fibrillation solution is preferably from 0.05 wt % to 5 wt %, more preferably from 0.1 wt % to 2 wt %, still more preferably from 0.2 wt % to 1.5 wt %, particularly preferably from 0.3 wt % to 1.0 wt %. A case in which the sulfuric acid concentration is less than 0.05 wt % is not preferred because the fibrillation rate becomes slower. Meanwhile, when the concentration is more than 5 wt %, the sulfuric acid esterification reaction is liable to occur, and hence the sulfuric acid esterification modification ratio may be excessively high. In addition, the control of any other fibrillation condition or the adjustment of any other component in the fibrillation solution may be difficult. As described above, cellulose nanofibers having a sulfur content of less than 0.01 wt %, which are obtained by setting the sulfuric acid concentration in the fibrillation solution within the range, may be unmodified cellulose nanofibers.

The water content of sulfuric acid may be set within any appropriate range. When the water content of sulfuric acid to be used is high, the sulfuric acid esterification modification ratio of the cellulose nanofibers to be obtained may reduce, or the fiber diameters of the cellulose nanofibers to be obtained may increase. Accordingly, the water content of sulfuric acid is preferably as low as possible from the viewpoint that those inconveniences are avoided. The water content of sulfuric acid is, for example, 80 wt % or less, preferably 70 wt % or less, more preferably 60 wt % or less.

B-2-3. Acetic Anhydride and/or Propionic Anhydride

The role of acetic anhydride and/or propionic anhydride in the fibrillation solution is assumed as follows: instead of undergoing an esterification reaction with a hydroxyl group of the cellulose, acetic anhydride and/or propionic anhydride is impregnated into a space between cellulose microfibrils or elementary fibrils together with DMSO to be involved in the sulfuric acid esterification reaction and fibrillation of the cellulose, and to accelerate the reaction and the fibrillation. The concentration of acetic anhydride and/or propionic anhydride in the fibrillation solution may largely affect the sulfuric acid esterification modification ratio and the fibrillation degree. In addition to those carboxylic acid anhydrides, a monobasic carboxylic acid (monocarboxylic acid) anhydride (formula: $R_1CO$—$O$—$OCR_2$) to be described below may be used. A preferred monobasic carboxylic acid anhydride is, for example, a saturated aliphatic monocarboxylic acid anhydride. Specifically, for example, butyric anhydride, isobutyric anhydride, valeric anhydride, or ethanoic propionic anhydride may be used. Those monobasic carboxylic acid anhydrides may each be used in combination with acetic anhydride.

The concentration of acetic anhydride and/or propionic anhydride in the fibrillation solution of this embodiment is preferably from 0.5 wt % to 90 wt %, more preferably from 3 wt % to 80 wt %. As described above, the concentration of acetic anhydride and/or propionic anhydride in the fibrillation solution may be appropriately set in accordance with a desired esterification modification ratio.

For example, when cellulose nanofibers having characteristics suitable as sulfate ester modified cellulose nanofibers (e.g., sulfate ester modified cellulose nanofibers having a sulfur content of 0.01 wt % or more) are produced, the concentration of acetic anhydride or propionic anhydride is preferably from 3 wt % to 80 wt %, more preferably from 5 wt % to 65 wt %. When the concentration is less than 3 wt %, the sulfuric acid esterification modification reaction rate may become slower. In addition, when the concentration is more than 80 wt %, the impregnability of the fibrillation solution into the cellulose may reduce to reduce the fibrillation degree or to prevent the sulfuric acid esterification reaction from advancing. Further, an acylation modification reaction caused by a reaction between acetic anhydride or propionic anhydride and a hydroxyl group may preferentially occur.

In addition, when cellulose nanofibers having a low sulfuric acid esterification modification ratio (e.g., a sulfur content of less than 0.01 wt %) are prepared, the concentration of acetic anhydride and/or propionic anhydride in the fibrillation solution is preferably from 0.5 wt % to 20 wt %, more preferably from 1 wt % to 15 wt %, still more preferably from 3 wt % to 10 wt %. In the case where the addition amount of acetic anhydride and/or propionic anhydride is less than 0.5 wt %, the fibrillation rate may become slower to make the cellulose nanofibers to be obtained thicker. In addition, in the case where the concentration of acetic anhydride and/or propionic anhydride is more than 20 wt %, the sulfuric acid esterification reaction is liable to occur, and hence, even when the stirring speed and the shear force or the stirring time are controlled, the sulfuric acid esterification modification ratio may be excessively high.

B-3. Fibrillation Step

The method of producing cellulose nanofibers of the present invention includes mixing the fibrillation solution and the raw material cellulose to impregnate the cellulose with the fibrillation solution. Thus, a hydrogen bond of the cellulose can be efficiently cleaved, and hence cellulose nanofibers (including sulfate ester modified cellulose nanofibers) are obtained.

In the fibrillation step, it is preferred that the respective components of the fibrillation solution be added and mixed to prepare the fibrillation solution, and then the fibrillation solution be mixed with the raw material cellulose. The respective components of the fibrillation solution are liquids, and hence the respective components of the fibrillation solution and the raw material cellulose may be simultaneously added to a fibrillation container without any previous mixing of the components of the fibrillation solution. In addition, the respective components of the fibrillation solution may be added to the raw material cellulose in a random order.

After the fibrillation solution and the cellulose have been mixed, moderate mechanical stirring or physical stirring to be used in a typical chemical reaction, such as an ultrasonic wave, is preferably performed for maintaining the uniformities of the components and temperature of a fibrillation mixed liquid (solution containing the fibrillation solution and the cellulose). High-shear force stirring with a fibrillation apparatus to be typically used in a mechanical fibrillation method for the cellulose, such as a high-pressure homogenizer or a water jet, may not be performed. A strong stirring apparatus, such as a paint shaker, a bead mill, a homogenizer, a kneader, or a grinder, may be used in combination for accelerating the fibrillation and/or improving the uniformity of the fibrillation. When the ratio of the cellulose in the fibrillation solution is large, the cellulose may be uniformly and efficiently fibrillated by using a stirring apparatus capable of dealing with a high viscosity, such as an extruder or a kneader.

In addition, as another method, the raw material cellulose is immersed in the fibrillation solution under a temperature to be described later for up to a certain time period without stirring. Next, a diluent solvent, such as water or an alcohol, is added to the mixture, and the whole is stirred until the solvent is uniformly dispersed. After that, the cellulose nanofibers may be recovered by filtration or centrifugation.

The fibrillation may be performed at any appropriate temperature. For example, the fibrillation may be performed at room temperature, or warming may be performed for accelerating the fibrillation. The temperature of the fibrillation solution is preferably from 5° C. to 100° C., more preferably from 15° C. to 80° C., still more preferably from 20° C. to 60° C. When the temperature of the fibrillation solution is less than 5° C., the fibrillation rate may reduce owing to an increase in viscosity of the solution, or the sulfuric acid esterification reaction of the fibrillated cellulose nanofibers may not advance. Meanwhile, when the temperature is more than 100° C., the cellulose may decompose or any other side reaction may occur.

A time period required for the fibrillation may vary depending on the concentrations of acetic anhydride and/or propionic anhydride, and sulfuric acid in the fibrillation solution, the fiber diameters and sulfuric acid esterification modification ratio of the cellulose nanofibers to be produced, and a stirring approach. The time period required for the fibrillation is preferably from 10 minutes to 10 hours, more preferably from 15 minutes to 8 hours, still more preferably from 25 minutes to 6 hours. When the reaction time falls short of the range, it may be impossible to perform the sulfuric acid esterification modification of the nanofibers, or the fibrillation degree may reduce. Meanwhile, when the fibrillation time is more than 10 hours, the sulfuric acid esterification modification ratio may be excessively high, or the crystallinity degree of the cellulose nanofibers to be obtained may reduce. Further, when the fibrillation time is excessively long, the oxidation reaction (Albright-Goldman oxidation reaction) of the cellulose by DMSO and acetic anhydride and/or propionic anhydride may occur to transform DMSO into methyl sulfide having a malodor.

When sulfate ester modified cellulose nanofiber shaving a sulfur content of less than 0.01 wt % are produced, the fibrillation step may be performed at, for example, room temperature, or warming may be performed for accelerating the fibrillation. The temperature of the fibrillation solution is preferably from 10° C. to 150° C., more preferably from 15° C. to 80° C., still more preferably from 20° C. to 70° C. When the temperature of the fibrillation solution is less than 10° C., the fibrillation rate may reduce owing to an increase in viscosity of the solution, or the uniformity of the fiber diameters of the fibrillated cellulose nanofibers may reduce. Meanwhile, when the temperature is more than 150° C., the cellulose may decompose, or acetic anhydride and/or propionic anhydride may volatilize. Further, any other side reaction may occur.

In addition, a time period required for the fibrillation may vary depending on the concentrations of acetic anhydride and/or propionic anhydride, and sulfuric acid in the fibrillation solution, the fiber diameters of the nanofibers to be produced, and a stirring approach. The time period required for the fibrillation is preferably from 10 minutes to 10 hours, more preferably from 20 minutes to 8 hours, still more preferably from 30 minutes to 5 hours.

B-4. Washing (Neutralization) Step

After the fibrillation, a solvent that dissolves DMSO, sulfuric acid, and acetic anhydride and/or propionic anhydride (hereinafter sometimes referred to as "washing solvent") is added to the fibrillation solution to stop the sulfuric acid esterification modification reaction and the fibrillation, and to wash the cellulose nanofibers, followed by the recovery of the cellulose nanofibers. When the reuse of the fibrillation solution is considered, after the fibrillation, the following is preferably performed: the fibrillation solution and a cellulose component are separated by a method such as filtration or squeezing, and then the cellulose component is washed with the washing solvent.

The washing solvent only needs to be a solvent in which the cellulose nanofibers can be dispersed, and DMSO, sulfuric acid, and acetic anhydride and/or propionic anhydride are dissolved, and any appropriate solvent is used. Examples thereof include: water; alcohols, such as methanol and ethanol; and amides, such as dimethylacetamide (DMAc). Water and alcohols are preferred. The sulfuric acid functional groups of the sulfate ester modified cellulose nanofibers to be obtained after the washing are each in an acid form (—O—$SO_3H$).

In addition, when the sulfuric acid functional groups are transformed into sulfate forms, sulfate ester modified cellulose nanofibers in sulfate forms are obtained by: adding a washing solvent containing an alkaline substance to the fibrillation solution; stirring the mixture for a certain time period; then filtering the mixture; and further washing the filtrate with a washing solvent free of any alkaline substance.

Any appropriate alkaline substance may be used as the alkaline substance. Specific examples thereof include: inorganic alkaline substances, such as hydroxides, oxides, carbonates, hydrogen carbonates, and acetates of alkali metals or alkaline earth metals; and amines. Any appropriate alkaline substance may be selected as the alkaline substance in accordance with, for example, the applications of the sulfate ester modified cellulose nanofibers to be obtained. For example, when the water dispersibility of the sulfate ester modified cellulose nanofibers to be obtained is required, an inorganic alkaline substance containing an alkali metal, such as potassium, sodium, or lithium, is preferred. Meanwhile, when the dispersibility of the sulfate ester modified cellulose nanofibers in an organic solvent, such as an alcohol, is required, a tertiary amine or a quaternary ammonium compound is preferably used. Those alkaline substances may each be the same as a base catalyst to be used in an esterification modification reaction or urethanization modification reaction to be described later.

A stirring or mixing time for the neutralization may be set to any appropriate value in accordance with the alkaline substance to be used. The time is preferably from 1 minute to 180 minutes, more preferably from 3 minutes to 120 minutes, still more preferably from 5 minutes to 60 minutes.

A method of washing and recovering the cellulose nanofibers is, for example, a vacuum filtration method, pressure filtration method, or centrifugation for general industry. When large cellulose fibers or particles that are not fibrillated or are incompletely fibrillated remain, the fibers or particles may be removed by an approach such as decantation, centrifugation, or filtration.

In addition, at the time of the washing or after the washing, the cellulose nanofibers are preferably redispersed in water and further treated with a mixer or a homogenizer because the fibrillation degree and the uniformity of the fiber diameters of the cellulose nanofibers to be obtained are further improved.

After the fibrillation, the cellulose nanofibers may be washed and recovered by the above-mentioned method, or a dispersion after the fibrillation (fibrillation solution containing the cellulose nanofibers) may be subjected to a step of producing modified cellulose nanofibers to be described later as it is or after having been subjected to required adjustment. In addition, when an aprotic polar solvent, such as an amide, is used in the washing step, the cellulose nanofibers may be dispersed in the solvent before their use. When water or an alcohol is used in the washing step, the procedure may proceed to a modification step to be described later after a protic solvent, such as water or the alcohol, has been replaced with an aprotic polar solvent to be used in the modification step.

After the fibrillation and the sulfuric acid esterification reaction, the cellulose nanofibers may be washed and recovered by the above-mentioned method, or the dispersion after the fibrillation (fibrillation solution containing the cellulose nanofibers) may be turned into a film or fibers as it is or after having been subjected to required adjustment. For example, a film-like gel of the cellulose nanofibers is obtained by: applying a slurry-like dispersion obtained after the fibrillation onto a substrate; and passing the resultant through an aqueous solution containing a polyvalent alkaline substance or through an alcohol. A cellulose nanofiber film is obtained by further washing the film-like gel with water or an alcohol and drying the washed product.

When the dispersion is turned into fibers, fibers containing the cellulose nanofibers are obtained by: extruding the slurry-like dispersion obtained after the fibrillation from a nozzle to turn the dispersion into a fibrous shape; passing the resultant through an alcohol in the same manner as that described above to provide a fibrous gel; and then washing and drying the gel. When the viscosity of the dispersion after the fibrillation is high, the dispersion may be formed into a shape after having been diluted to such a viscosity as to be formable by adding a solvent, such as water or an alcohol.

The fact that the cellulose nanofibers obtained by the above-mentioned method are sulfate ester modified cellulose nanofibers may be confirmed from the elemental analysis and IR spectrum of purified cellulose nanofibers. Part of the hydroxyl groups of the nanofibers may be subjected to acylation modification depending on a fibrillation condition and/or a reaction condition.

<C. Method of producing Hydrophobized Modified Cellulose Nanofibers>

The above-mentioned sulfate ester modified cellulose nanofibers (that may contain unmodified cellulose nanofibers) are hydrophilic cellulose nanofibers. In order to improve the hydrophobicity of those hydrophilic cellulose nanofibers, hydrophobized modified cellulose nanofibers may be obtained by causing the hydrophilic cellulose nanofibers to react with an esterification reaction agent or a urethanization reaction agent to hydrophobize the nanofibers. A method of producing hydrophobized modified cellulose nanofibers (hereinafter sometimes referred to as "modified cellulose nanofibers") of the present invention includes a step of causing the cellulose nanofibers obtained by the above-mentioned method of producing cellulose nanofibers to further react with an esterification modification agent, such as a carboxylic acid anhydride or a vinyl carboxylate, or a urethanization modification agent, such as an isocyanate, to modify the surfaces of the cellulose nanofibers.

The cellulose nanofibers to be subjected to the modification step are preferably nanofibers having a sulfur content of less than 6 wt %. As described above, the cellulose nanofibers may be cellulose nanofibers whose surface hydroxyl groups are unmodified, or part of their surface hydroxyl groups may be subjected to sulfuric acid esterification. As described above, cellulose nanofibers having a low sulfuric acid esterification modification ratio (e.g., a sulfur content of less than 6 wt % or an average degree of substitution of 0.3 or less) may be suitably used in the step of producing hydrophobized modified cellulose nanofibers. When part of the cellulose nanofibers are subjected to sulfuric acid esterification modification, sulfuric acid functional groups are preferably transformed into sulfate groups with an alkali. The above-mentioned method may be used as a method of transforming the functional groups into sulfate groups.

The esterification modification reaction or urethanization modification reaction of the cellulose nanofibers may be performed by any appropriate method. For example, esterification-modified or urethanization-modified cellulose nanofibers may be obtained by subjecting the esterification reaction agent or the urethanization reaction agent and the cellulose nanofibers to a dehydration reaction. Details about the foregoing are described next.

The esterification modification reaction or the urethanization modification reaction is performed by: dispersing the cellulose nanofibers obtained in the foregoing in a solvent; adding the esterification modification agent or the urethanization modification agent to the dispersion; and causing the agent and the nanofibers to react with each other. At the time of the reaction, an esterification reaction catalyst or a urethanization reaction catalyst may be used. In addition, after the fibrillation, the following may be performed: after the fibrillation solution has been removed from the fibrillation mixed liquid by filtration or squeezing, a modification reaction solvent to be described later and the esterification modification agent or the urethanization modification agent are added to the residue, and the mixture is stirred at any appropriate temperature for up to any appropriate time period. As still another method, the following may be performed: the cellulose nanofibers obtained by the washing in the foregoing are dispersed in the reaction solvent to be described later, the esterification modification agent or the urethanization modification agent is added to the dispersion, and the agent and the nanofibers are caused to react with each other. At the time of the reaction, as described above, an esterification reaction catalyst or a urethanization reaction catalyst may be used. Further, after the fibrillation, the following may be performed: an alkaline substance and the reaction agent are directly added to the fibrillation mixed liquid without the removal of the fibrillation solution, and the agent and the nanofibers are caused to react with each other at any appropriate temperature for up to any appropriate time period. The alkaline substance neutralizes sulfuric acid in a reaction system, and serves as a base catalyst.

Any appropriate solvent may be used as the reaction solvent. Examples thereof include aprotic polar solvents, such as pyridine, dimethylacetamide, formacetamide, N-methylpyrrolidone (NMP), a ketone, and toluene. The reaction solvents may be used alone or as a mixture thereof. Pyridine is preferred from the viewpoint that pyridine also functions as a base catalyst. An amide-based solvent is preferred from the viewpoint that the cellulose nanofibers obtained in the foregoing step are easily dispersed therein, and hence their modification reaction can be uniformly performed. Low-boiling point solvents, such as the ketone and toluene, are preferred from the viewpoint that each of the solvents is easy to remove after the modification reaction, and is hence excellent in terms of purification cost. In this way, any appropriate solvent only needs to be used in accordance with purposes in consideration of its advantage.

C-1. Esterification Modification Reaction

Any appropriate compound may be used as the esterification modification agent. The esterification modification agent is, for example, at least one kind selected from a carboxylic acid anhydride, a vinyl carboxylate, a carboxylic acid halide, and a carboxylic acid. Of those, a carboxylic acid anhydride and a vinyl carboxylate are preferred.

Examples of the carboxylic acid anhydride include acetic anhydride, propionic anhydride, butyric anhydride, and benzoic anhydride.

Examples of the vinyl carboxylate include vinyl acetate, vinyl propionate, vinyl butyrate, vinyl caproate, vinyl cyclohexanecarboxylate, vinyl caprylate, vinyl caprate, vinyl laurate, vinyl myristate, vinyl palmitate, vinyl stearate, vinyl pivalate, vinyl octylate, divinyl adipate, vinyl methacrylate, vinyl crotonate, vinyl pivalate, vinyl octylate, vinyl benzoate, and vinyl cinnamate.

Examples of the carboxylic acid halide include acetyl chloride, propionyl chloride, butyryl chloride, octanoyl chloride, stearoyl chloride, benzoyl chloride, and p-toluenesulfonyl chloride. The carboxylic acid halide tends to have a fast reaction rate and hence show a vigorous reaction. The cellulose nanofibers (CNFs) may be largely damaged, and hence the reaction rate is preferably controlled so that the modification reaction may occur only on the surfaces of the cellulose nanofibers.

An aliphatic carboxylic acid or aromatic carboxylic acid having a boiling point of 150° C. or more is preferred as the carboxylic acid. Examples thereof include butyric acid, pivalic acid, methacrylic acid, lauric acid, cinnamic acid, crotonic acid, and benzoic acid. The carboxylic acid has a low reaction rate under normal pressure, and hence the reaction is preferably performed under reduced pressure.

The addition amount of the esterification modification agent may be set to any appropriate value. The addition amount of the esterification modification agent is preferably from 0.05 mol to 15 mol, more preferably from 0.1 mol to 10 mol, still more preferably from 0.3 mol to 9 mol, particularly preferably from 0.5 mol to 8 mol per 1 mol of the anhydrous glucan of the cellulose nanofibers. When the addition amount is excessively small, the reaction rate of the agent may become slower, or the modification ratio of the nanofibers may be excessively low. Meanwhile, when the addition amount of the esterification modification agent is excessively large, owing to excessive modification, the crystallinity degree of the cellulose nanofibers may reduce, or cost for the production of the nanofibers may increase.

When the carboxylic acid anhydride or the vinyl carboxylate is used, a base catalyst is preferably further added because its reaction rate increases. Any appropriate catalyst may be used as the basic catalyst. Examples thereof include: hydroxides, carbonates, hydrogen carbonates, and carboxylates of alkali metals or alkaline earth metals; pyridines; imidazoles; and amines. Those basic catalysts may be used alone or in combination thereof.

In the case where the carboxylic acid halide is used, its reaction is vigorous, and hence the reaction advances even when no catalyst is used. However, a catalyst may be added. The catalyst to be added is preferably the above-mentioned base catalyst, more preferably a weakly basic base catalyst, such as an amine.

When the carboxylic acid is used, a base catalyst may be used, or an acid catalyst may be used. Of those, an acid catalyst is preferably used. Examples of the acid catalyst include sulfuric acid and p-toluenesulfonic acid.

The reaction temperature of the esterification modification reaction is adjusted to any appropriate value in accordance with the kind of the esterification modification agent and the catalyst. For example, when the carboxylic acid anhydride or the vinyl carboxylate is used, the reaction temperature is preferably from room temperature to 150° C., more preferably from room temperature to 120° C., still more preferably from 25° C. to 100° C., particularly preferably from 30° C. to 90° C. When the reaction temperature is excessively low, the reaction rate may become slower. When the reaction temperature is excessively high, the cellulose nanofibers may be damaged.

The reaction time of the esterification modification reaction only needs to be adjusted to any appropriate value in accordance with the reaction temperature, and the kind and addition amount of the catalyst. The reaction time is, for example, from 20 minutes to 240 minutes. When the reaction time is excessively short, the modification ratio may reduce. When the reaction time is excessively long, the crystallinity degree or percent yield of the cellulose nanofibers may reduce owing to excessive modification.

C-2. Urethanization Modification Reaction

Any appropriate compound may be used as the urethanization modification agent. Of those, an isocyanate is preferred. Examples of the isocyanate include: monofunctional isocyanates, such as methyl isocyanate, 2-isocyanatoethyl acrylate, and 2-isocyanatoethyl methacrylate; diisocyanates, such as diphenylmethane diisocyanate, hexamethylene diisocyanate, and toluene diisocyanate; and polyfunctional isocyanates.

The addition amount of the isocyanate is set to any appropriate value. The isocyanate is preferably used in an addition amount in the same range as that of the esterification modification agent.

A urethanization modification reaction catalyst is preferably a base catalyst to be used in the esterification modification reaction. Of such catalysts, an amine-based organic basic catalyst is preferred. Metal catalysts, such as dibutyltin dilaurate and zirconium tetraacetoacetate, may also each be suitably used. The catalyst only needs to be added in any appropriate amount in accordance with the kind and addition amount of the urethanization modification reaction agent, and the reaction temperature of the urethanization modification reaction.

As in typical urethane synthesis, the reaction temperature of the urethanization modification reaction is adjusted to any appropriate temperature in accordance with the reactivity of the isocyanate, and the kind and addition amount of the catalyst. For example, the reaction temperature is from room temperature to 120° C., preferably from 25° C. to 100° C., more preferably from 30° C. to 95° C., still more preferably from 35° C. to 80° C. When the reaction temperature is excessively low, the reaction rate may become lower. When the reaction temperature is excessively high, the cellulose nanofibers may be damaged.

The reaction time of the urethanization modification reaction may be adjusted to any appropriate time in accordance with the reaction temperature, and the kind and addition amount of the catalyst. The reaction time is, for example, from 20 minutes to 240 minutes. When the reaction time is excessively short, the modification ratio may reduce. When the reaction time is excessively long, the crystallinity degree or percent yield of the cellulose nanofibers may reduce owing to excessive modification.

EXAMPLES

The present invention is described in more detail below on the basis of Examples. However, the present invention is not limited to these Examples.

Details about used raw materials and apparatus are as described below.

(Used Cellulose, Acetic Anhydride, Propionic Anhydride, Sulfuric Acid, and DMSO)

Cellulose pulp was used as raw material cellulose. The cellulose pulp is commercial wood pulp (manufactured by Georgia-Pacific LLC, product name: FLUFF PULP ARC48000GP, water content: 9 wt %).

The raw material cellulose was torn into sizes that could be loaded into a sample bottle (about a 1-centimeter square to about a 3-centimeter square) before its fibrillation.

Acetic anhydride, propionic anhydride, sulfuric acid, and DMSO were purchased from Nacalai Tesque, Inc.

(Stirrer)

Mighty Stirrer (model: HE-20G) manufactured by KPI was used as the stirrer. An oval-shaped strong stirring bar was used.

(Flask Reaction Vessel)

A 200-milliliter three-necked flask including a stirring blade was used.

(Paint Shaker)

Model 1410-00-IVF Single manufactured by RED DEVIL, US was used as the paint shaker.

(Mixer)

A mixer manufactured by Panasonic Corporation (product number: MX-X701) was used for dispersing cellulose nanofibers.

(Clearmix)

When a fibrillation degree was improved by using an organic solvent, CLEARMIX manufactured by M Technique Co., Ltd. (product name: CLM-0.8S, rotational speed: 18,000 rpm) was used instead of the mixer.

(Centrifugal Separator)

A centrifugal separator manufactured by Hitachi Kaki Co., Ltd. (product name: CR22G) was used for washing. A centrifugation speed was 12,000 rpm and a centrifugation time was 30 minutes.

Obtained cellulose nanofibers were subjected to the following evaluations.

(Shape Observation of Cellulose Nanofibers)

The shapes of cellulose nanofibers were observed with a FE-SEM (manufactured by JEOL Ltd., product name: "JSM-6700F", measurement conditions: 20 mA and 60 seconds). The average fiber diameter of the nanofibers was calculated by randomly selecting 50 fibers from an image of a SEM photograph, and adding and averaging measured values.

(Crystallinity Degree)

The crystallinity degree of the resulted cellulose nanofibers was measured by an XRD analysis method (Segal method) on the basis of the description in the reference: Textile Res. J. 29: 786-794 (1959), and was calculated from the following equation:

$$\text{Crystallinity degree (\%)}=[(I200-IAM)/I200]\times 100\%$$

where I200 represents the diffraction intensity of a lattice plane (002 plane) (diffraction angle $2\theta=22.6°$) in X-ray diffraction, and IAM represents the diffraction intensity of an amorphous portion (the lowest portion between the 002 plane and a 110 plane, diffraction angle $2\theta=18.5°$).

(IR Spectrum)

The analysis of part of the sample with a Fourier transform infrared spectrophotometer (FT-IR) was performed to confirm the presence or absence of the modification of the cellulose nanofibers. The analysis was performed with NICOLET iS50 FT-IR Spectrometer in a reflection mode.

(Observation of Transparency of Aqueous Dispersion of Cellulose Nanofibers)

The prepared cellulose nanofibers were dispersed in distilled water to prepare a 0.5 wt % aqueous dispersion in each of Examples 1 to 8 or a 0.3 wt % aqueous dispersion in each of Examples 9 to 27, and the transparency of each of the aqueous dispersions was visually observed. The transparency of each of the dispersions reflects the fiber diameters of the cellulose nanofibers. That is, as the fiber diameters of the cellulose nanofibers reduce, the transparency of the dispersion is improved.

(Measurement of Viscosity of Aqueous Dispersion of Cellulose Nanofibers)

The viscosity of a 0.5 wt % aqueous dispersion of the cellulose nanofibers (Examples 1 to 8) or of a 0.3 wt % aqueous dispersion thereof (Examples 9 to 30) was measured with DV-III RHEOMETER (SPINDLE CPE-42I) manufactured by BROOKFIELD by the following method (in conformity with JIS Z 880). The cellulose nanofibers obtained in each of Examples 1 to 8 were dispersed in water to prepare an aqueous dispersion having a concentration of 0.5 wt %, and its viscosity at a number of revolutions of 5 rpm was measured under a temperature of 25° C. In addition, the cellulose nanofibers obtained in each of Examples 9 to 30 were dispersed in water to prepare an aqueous dispersion having a concentration of 0.3 wt %, and its viscosity at a number of revolutions of 2.6 rpm was measured under a temperature of 25° C.

(Measurement of TI Value of Aqueous Dispersion of Cellulose Nanofibers)

A TI value was determined through the measurement of viscosities by the following method (in conformity with JIS K 6833). The viscosities of the aqueous dispersion of the cellulose nanofibers obtained in each of Examples 1 to 8 at numbers of revolutions of 10 rpm and 100 rpm were measured with DV-III RHEOMETER (SPINDLE CPE-42I) manufactured by BROOKFIELD at 25° C. (the viscosities were each measured three times, and the average of the measured values was adopted), and the thixotropy index (TI) value of the dispersion was calculated from the following equation. The concentration of the sulfate ester modified cellulose nanofibers is 0.3 wt %.

$$TI \text{ value}=(\text{viscosity at 25° C. and 10 rpm})/(\text{viscosity at 25° C. and 100 rpm}).$$

Similarly, the viscosities of the aqueous dispersion of the cellulose nanofibers obtained in each of Examples 9 to 30 were measured in the same manner as that described above except that the numbers of revolutions were changed to 2.6 rpm and 26 rpm (the viscosities were each measured three times, and the average of the measured values was adopted), and the thixotropy index (TI) value of the dispersion was calculated from the following equation. The concentration of the sulfate ester modified cellulose nanofibers is 0.3 wt %.

TI value=(viscosity at 25° C. and 2.6 rpm)/(viscosity at 25° C. and 26 rpm).

(Percent Yield of Cellulose Nanofibers)

Three grams of an aqueous dispersion of cellulose nanofibers was collected, and was cast onto a polypropylene (PP) case, followed by drying in a fan dryer at 105° C. for 5 hours. The weight of the dispersion after the drying was weighed, and the concentration of the cellulose nanofibers in the dispersion was calculated. The yield of the cellulose nanofibers was calculated on the basis of the concentration of the cellulose nanofibers in the dispersion and the weight of the dispersion. The percent yield of the cellulose nanofibers was calculated from the yield of the cellulose nanofibers and the weight of the used cellulose pulp.

(Determination of Sulfur Content of Sulfate Ester Modified Cellulose Nanofibers)

The sulfur content of sulfate ester modified cellulose nanofibers was determined by using a combustion absorption-IC method. That is, dried sulfate ester modified cellulose nanofibers (0.01 g) were loaded into a magnetic board and burned under an oxygen atmosphere (flow rate: 1.5 L/min) in a ring furnace (1,350° C.). Three percent hydrogen peroxide water (20 ml) was caused to absorb a produced gas component. The resultant absorbed liquid was diluted to 100 ml with pure water, and a sulfate ion concentration (wt %) was calculated from the ion chromatography measurement result of the diluted liquid. The sulfate ion concentration was converted into the sulfur content with the following equation. ION CHROMATOGRAPH MODEL ICS-1500 manufactured by Thermo Fisher Scientific K.K. was used in the analysis.

Sulfur content (wt %)=sulfate ion concentration×32/96

Further, the dried cellulose nanofibers were analyzed with a FT-IR (ATR mode), and the confirmation of the presence or absence of the sulfuric acid esterification modification of the nanofibers and the relative comparison of the average degrees of substitution thereof were performed by the presence or absence of absorption bands derived from a sulfuric acid ester group at frequencies of 1,250 $cm^{-1}$ and 820 $cm^{-1}$. The analysis was performed with "NICOLET MAGNA-IR760 Spectrometer" manufactured by NICOLET in a reflection mode.

(Average Degree of Substitution of Esterification- or Urethanization-modified Cellulose Nanofibers)

The surface modification ratio of cellulose nanofibers was represented by an average degree of substitution and measured by solid NMR. The following two methods were used in combination as measurement modes: a solid $^{13}C$—CP/MAS method and a solid DP/MAS method. The average degree of substitution refers to the average (average degree of substitution) of the numbers of modified hydroxyl groups (numbers of substituents) per one repeating unit of the cellulose.

Further, dried modified cellulose nanofibers were analyzed with a FT-IR (ATR mode), and the confirmation of the presence or absence of the modification of the nanofibers and the relative comparison of the average degrees of substitution thereof were performed by the presence or absence of an absorption band derived from a carbonyl group at a frequency of 1,730 $cm^{-1}$. The analysis was performed with "NICOLET MAGNA-IR760 Spectrometer" manufactured by NICOLET in a reflection mode.

Example 1

Nine grams of DMSO, 1.5 g of acetic anhydride (concentration in a fibrillation solution: 14 wt %), and 0.2 g of sulfuric acid (concentration in the fibrillation solution: 1.87 wt %) were loaded into a 20-milliliter sample bottle, and the mixture was stirred under a room temperature of 23° C. with a magnetic stirrer for about 30 seconds to prepare the fibrillation solution.

Next, 0.3 g of the cellulose pulp was added to the solution, and the mixture was further stirred at the same room temperature for 60 minutes. After the stirring, sulfuric acid was neutralized by adding and mixing the fibrillation solution containing the cellulose in 160 ml of a 0.2 wt % aqueous solution of sodium hydrogen carbonate. After that, a supernatant was removed by centrifugation. Further, 80 ml of distilled water and 80 ml of ethanol were added to the residue, and the mixture was stirred until the added liquids were uniformly dispersed. After that, a supernatant was removed by centrifuging the mixture under the same centrifugation conditions. The same procedure was repeated to wash the cellulose three times. A centrifugation speed was 12,000 rpm and a centrifugation time was 50 minutes. After the washing through centrifugation, distilled water was added to dilute the resultant until the entire weight became 50 g. Next, the mixture was stirred with a mixer for 3 minutes to provide a uniform aqueous dispersion of cellulose nanofibers. The resultant aqueous dispersion had a solid content (cellulose nanofibers) of 0.534 wt %, and its appearance was that of a transparent gel-like solution. The appearance of the aqueous dispersion is shown in FIG. 1. In addition, the percent yield of the cellulose nanofibers was 89%. The results are shown in Table 1.

Figure 2:
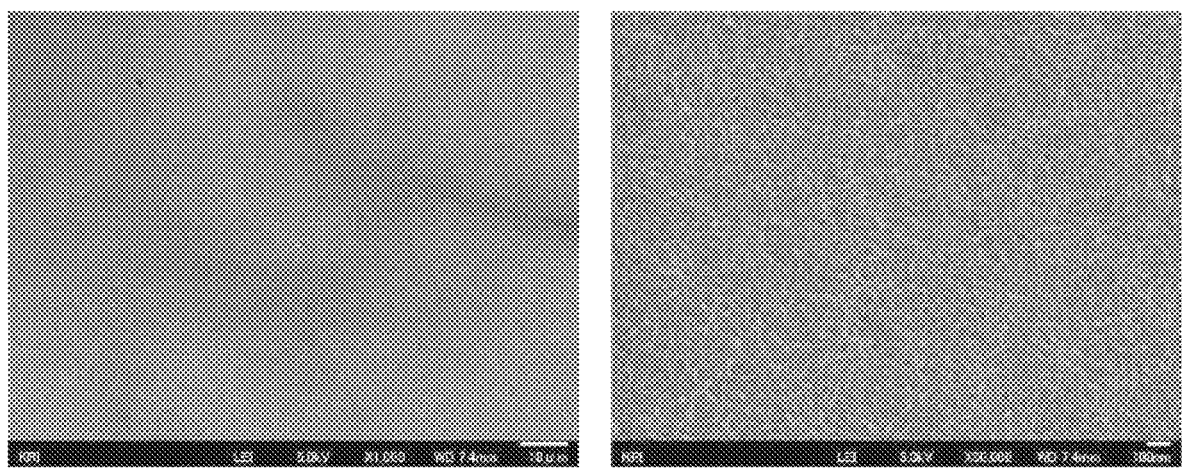
FIG. 2 are SEM photographs of the cellulose nanofibers obtained in Example 1.
Figure 3:
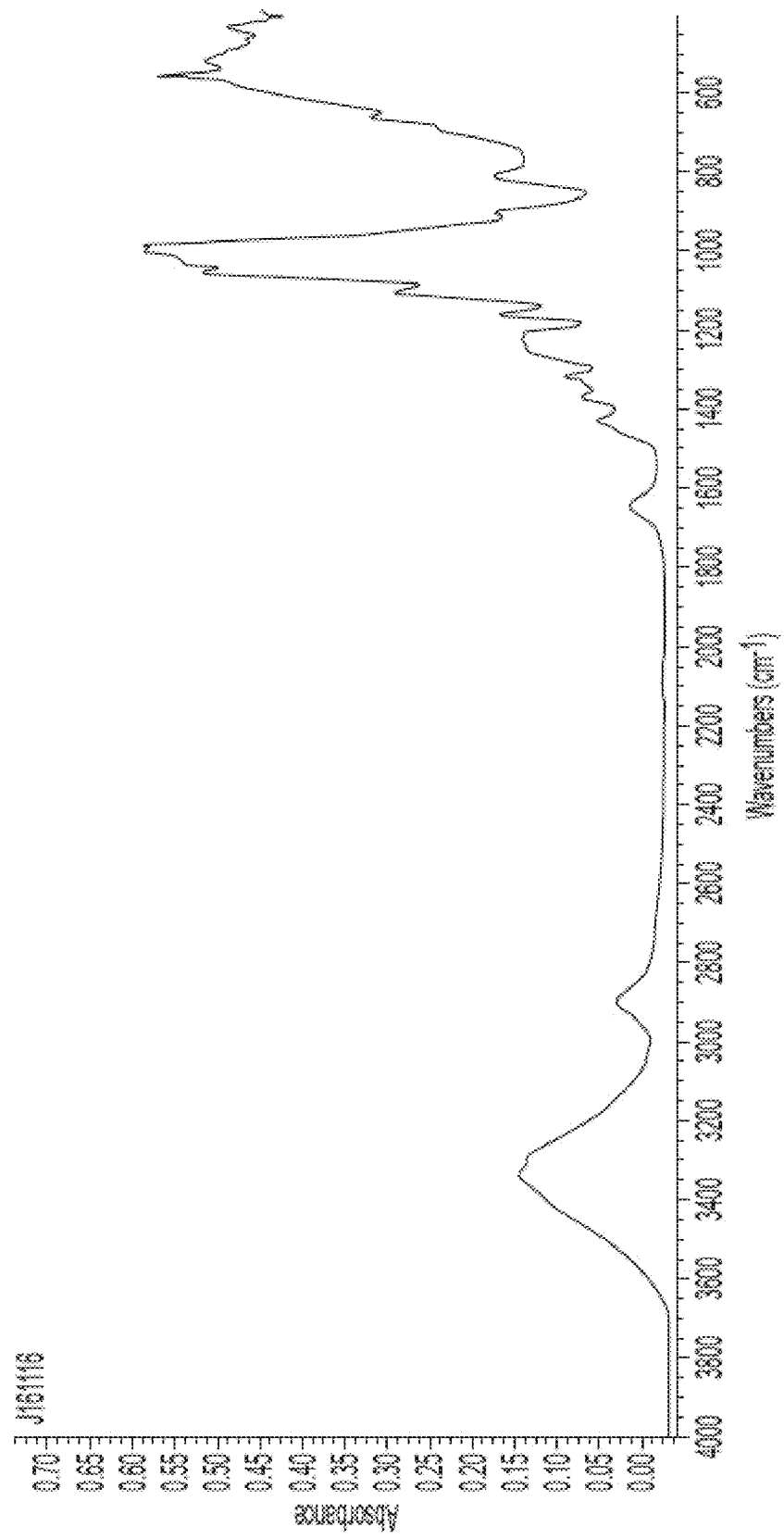
FIG. 3 is a FT-IR spectrum of the cellulose nanofibers obtained in Example 1.
Figure 4:
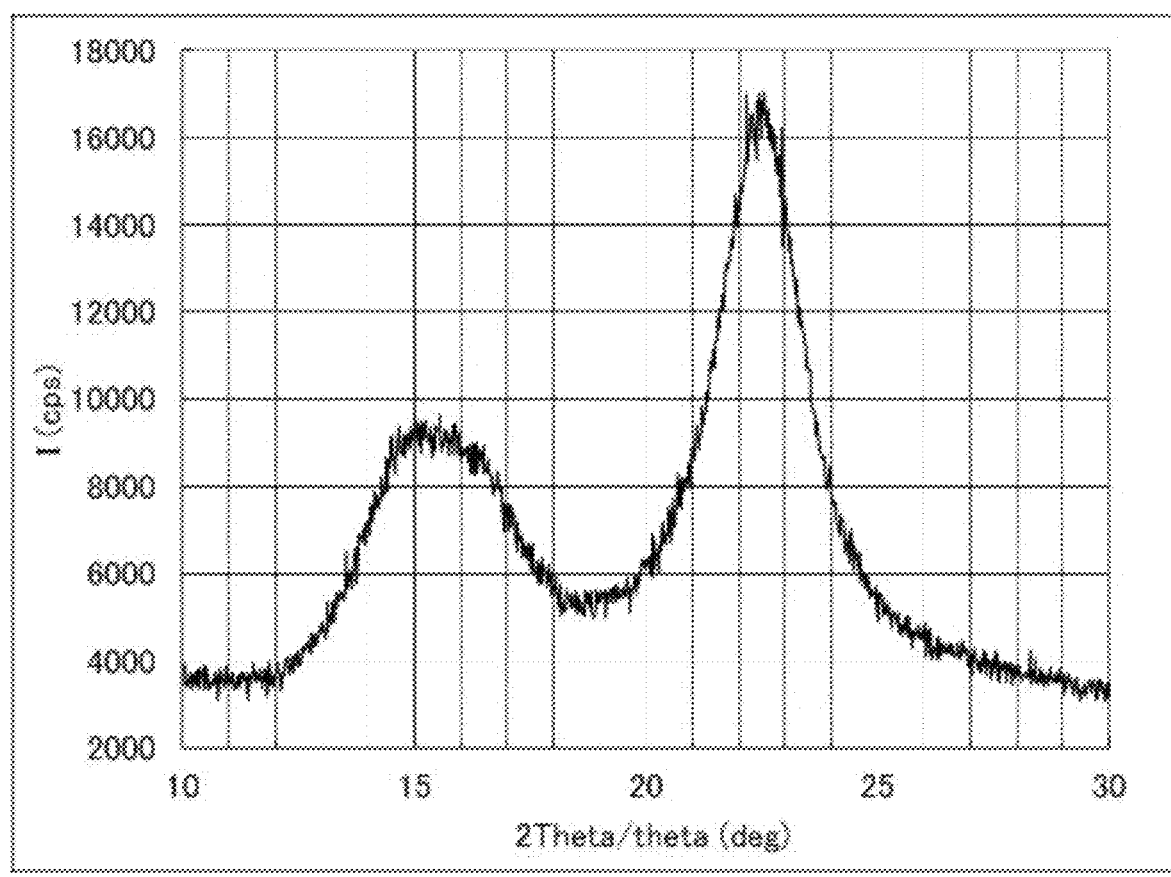
FIG. 4 is an XRD pattern of the cellulose nanofibers obtained in Example 1.

Next, 1 g of the resultant aqueous dispersion of the cellulose nanofibers was collected and dried. After that, the presence or absence of the modification of the cellulose was analyzed by FT-IR analysis. In addition, the dispersion was dried by the same drying approach, and then the crystallinity degree of the nanofibers was evaluated by an XRD analysis method. Further, 0.1 g of the aqueous dispersion was collected and diluted with distilled water whose amount was 10 times as large as that of the dispersion. After that, the diluted liquid was dried, and the shapes of the nanofibers were observed with a scanning electron microscope (SEM). The resultant SEM photographs are shown in FIGS. 2, the FT-IR spectrum of the nanofibers is shown in FIG. 3, and the XRD pattern thereof is shown in FIG. 4.

Figure 5:
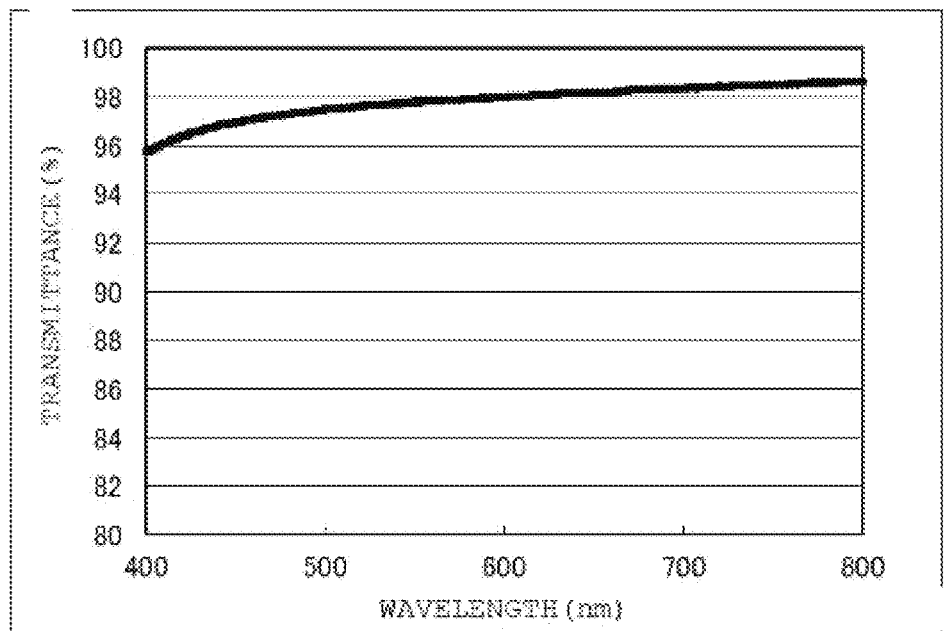
FIG. 5 is a graph of the result of the analysis of a 0.3 wt % aqueous dispersion of the cellulose nanofibers obtained in Example 1 with a spectrophotometer.
Figure 6:
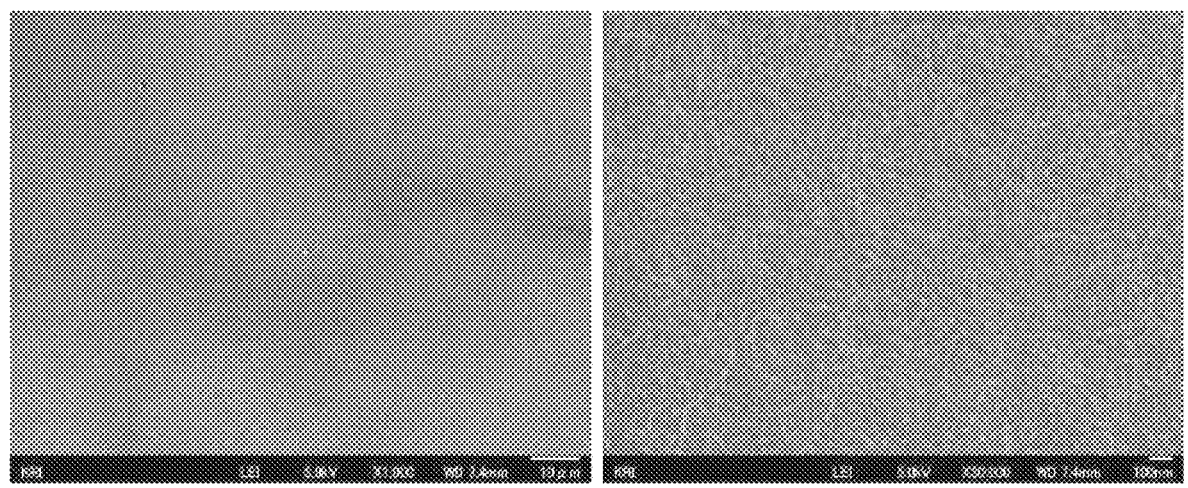
FIG. 6 are SEM photographs of cellulose nanofibers obtained in Example 2.

As a result of the SEM observation, it was found that the average fiber diameter of the cellulose nanofibers was 10 nm or less, and the nanofibers were substantially free of nanofibers or fine fibers each having a fiber diameter of 20 nm or more. In addition, the XRD pattern was the same as that of natural cellulose, and hence it was able to be confirmed that the nanofibers each had cellulose I crystalline structure and their crystallinity degree was 760. The crystallinity degree was 76%. The absorption band of C═O of an ester bond was not detected at a frequency of from about 1,700 $cm^{-1}$ to about 1,760 $cm^{-1}$ by the FT-IR analysis, and hence it could not be confirmed that the cellulose nanofibers were subjected to esterification modification by acetic anhydride. In addition, the absorption band of C=O of a carboxylic acid group or an aldehyde group could not be detected at a frequency of from about 1,600 cm$^{-1}$ to about 1,650 cm$^{-1}$, and hence it was found that substantially no oxidation reaction of the cellulose by DMSO occurred. Meanwhile, absorption bands characteristic of a sulfuric acid ester were detected at frequencies of about 1,250 cm$^{-1}$ and about 820 cm$^{-1}$. The sulfur content of the nanofibers measured by using the combustion absorption-IC method was 3.5 wt %. A 0.3 wt % aqueous dispersion of the cellulose nanofibers had a viscosity of 1,720 mPa·s and a TI value of 8.5 at 25° C. In addition, the result of the measurement of the 0.3 wt % aqueous dispersion of the sulfate ester modified cellulose nanofibers with a spectrophotometer is shown in FIG. 5. The light transmittance of the aqueous dispersion in a visible light range was 95% or more.

nanofibers are shown in FIG. 6. As a result of the SEM observation, the average fiber diameter of the resulted fibers was substantially 10 nm or less, and the nanofibers were substantially free of nanofibers or fine fibers each having a fiber diameter of 20 nm or more. In addition, a 0.3 wt % aqueous dispersion of the cellulose nanofibers had a viscosity of 1,690 mPa·s and a TI value of 11.0 at 25° C. The crystallinity degree of the cellulose nanofibers was 78%. In addition, the percent yield of the cellulose nanofibers was 91%. The results are shown in Table 1. In addition, the sulfur content of the resulted cellulose nanofibers was 2.8 wt %.

Example 3

Cellulose nanofibers were obtained in the same manner as in Example 2 except that: the addition amount of acetic anhydride was changed to 1.2 g (concentration in a fibril-

TABLE 1

| | Composition (weight ratio) | Time (minute(s)) | Fiber diameter | Crystallinity degree (%) | Sulfur content (wt %) | Appearance of dispersion | Viscosity (mPa · s) |
|---|---|---|---|---|---|---|---|
| Example 1 | DMSO/acetic anhydride/sulfuric acid/pulp (9/1.5/0.2/0.3) | 60 | 5 nm to 10 nm | 76 | 3.5 | Transparent gel | 1,720 |
| Example 2 | DMSO/acetic anhydride/sulfuric acid/pulp (9/1/0.13/0.3) | 110 | 5 nm to 10 nm | 78 | 2.8 | Transparent gel | 1,690 |
| Example 3 | DMSO/acetic anhydride/sulfuric acid/pulp (9/1.2/0.09/0.3) | 110 | 5 nm to 10 nm | 80 | 2.6 | Transparent gel | 1,801 |
| Example 4 | DMSO/acetic anhydride/sulfuric acid/pulp (9/0.5/0.1/0.3) | 110 | 10 nm to 100 nm | 80 | 1.5 | Somewhat opaque gel | 1,294 |
| Example 5 | DMSO/acetic anhydride/sulfuric acid/pulp (9/1/0.06/0.3) | 110 | 10 nm to 100 nm | 81 | 1.6 | Somewhat opaque gel | 1,312 |
| Example 6 | DMSO/acetic anhydride/sulfuric acid/pulp (9/0.5/0.06/0.3) | 110 | Several nanometers to several hundreds of nanometers | 83 | 1 . . . 3 | Opaque solution | 350 |
| Comparative Example 1 | DMSO/acetic anhydride/sulfuric acid/pulp (9/0/0.13/0.3) | 110 | Several micrometers to several tens of micrometers | — | — | Precipitate | — |
| Comparative Example 2 | DMSO/acetic anhydride/sulfuric acid/pulp (9/1/0/0.3) | 110 | Several micrometers to several tens of micrometers | — | — | Precipitate | — |

Example 2

Cellulose nanofibers were obtained in the same manner as in Example 1 except that: the addition amount of acetic anhydride was changed to 1 g (concentration in a fibrillation solution: 9.9 wt %); the addition amount of sulfuric acid was changed to 0.13 g (concentration in the fibrillation solution: 1.28 wt %); and the treatment time was changed to 110 minutes.

The resulted cellulose nanofibers were evaluated in the same manner as in Example 1. The resultant dispersion had a transparent gel-like appearance, which was substantially the same as that of Example 1, and had a cellulose nanofiber concentration of 0.546 wt %. The SEM photographs of the lation solution: 11.7 wt %); and the addition amount of sulfuric acid was changed to 0.09 g (concentration in the fibrillation solution: 0.87 wt %). 150 Milliliters of a 0.1 wt % aqueous solution of sodium hydrogen carbonate was used for neutralizing sulfuric acid.

Figure 7:
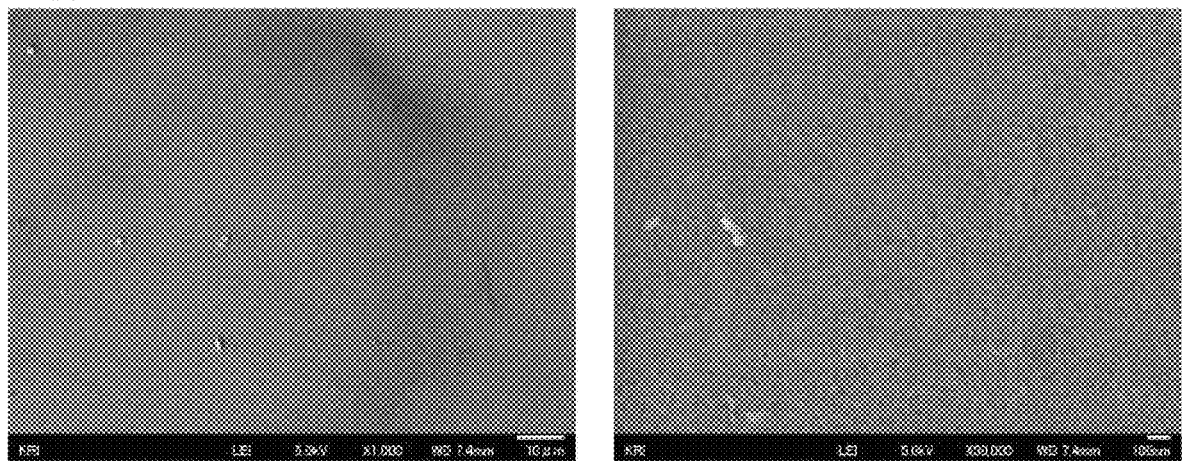
FIG. 7 are SEM photographs of cellulose nanofibers obtained in Example 3.

The resulted cellulose nanofibers were evaluated in the same manner as in Example 2. The resultant dispersion had a transparent gel-like appearance, which was substantially the same as that of Example 1, and an aqueous dispersion having a cellulose nanofiber concentration of 0.540 wt % was obtained. The SEM photographs of the nanofibers are shown in FIG. 7. The average fiber diameter of the resulted fibers was 10 nm or less, and the nanofibers were substantially free of nanofibers or fine fibers each having a fiber diameter of 20 nm or more. In addition, a 0.3 wt % aqueous dispersion of the cellulose nanofibers had a viscosity of 1,801 mPa·s and a TI value of 11.2 at 25° C. The crystallinity degree of the cellulose nanofibers was 80%. The percent yield of the cellulose nanofibers was 90%. The results are shown in Table 1. In addition, the sulfur content of the resulted cellulose nanofibers was 2.6 wt %.

Example 4

Cellulose nanofibers were obtained in the same manner as in Example 3 except that: the addition amount of acetic anhydride was changed to 0.5 g (concentration in a fibrillation solution: 5.2 wt %); and the addition amount of sulfuric acid was changed to 0.1 g (concentration in the fibrillation solution: 1.04 wt %).

Figure 8A:
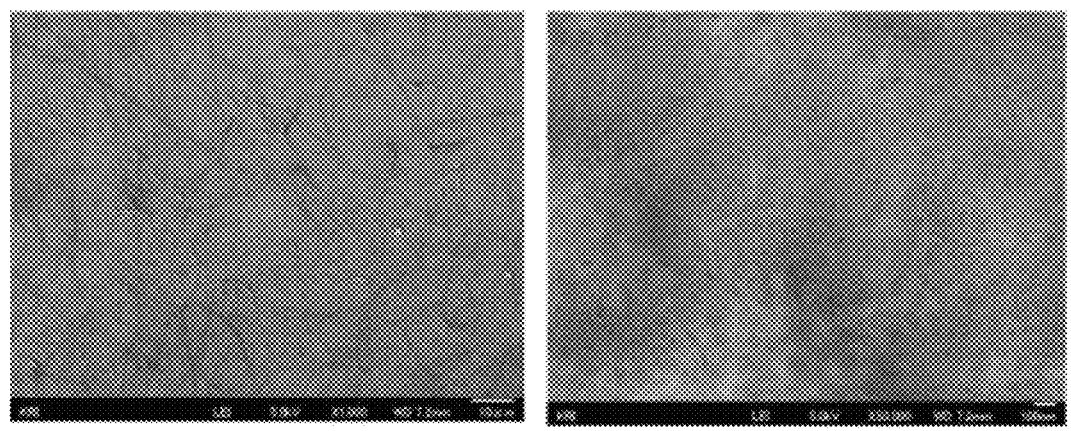
FIG. 8 are SEM photographs of the cellulose nanofibers obtained in Example 4 (FIG. 8(a)) and an IR spectrum thereof (FIG. 8(b)).
Figure 8:
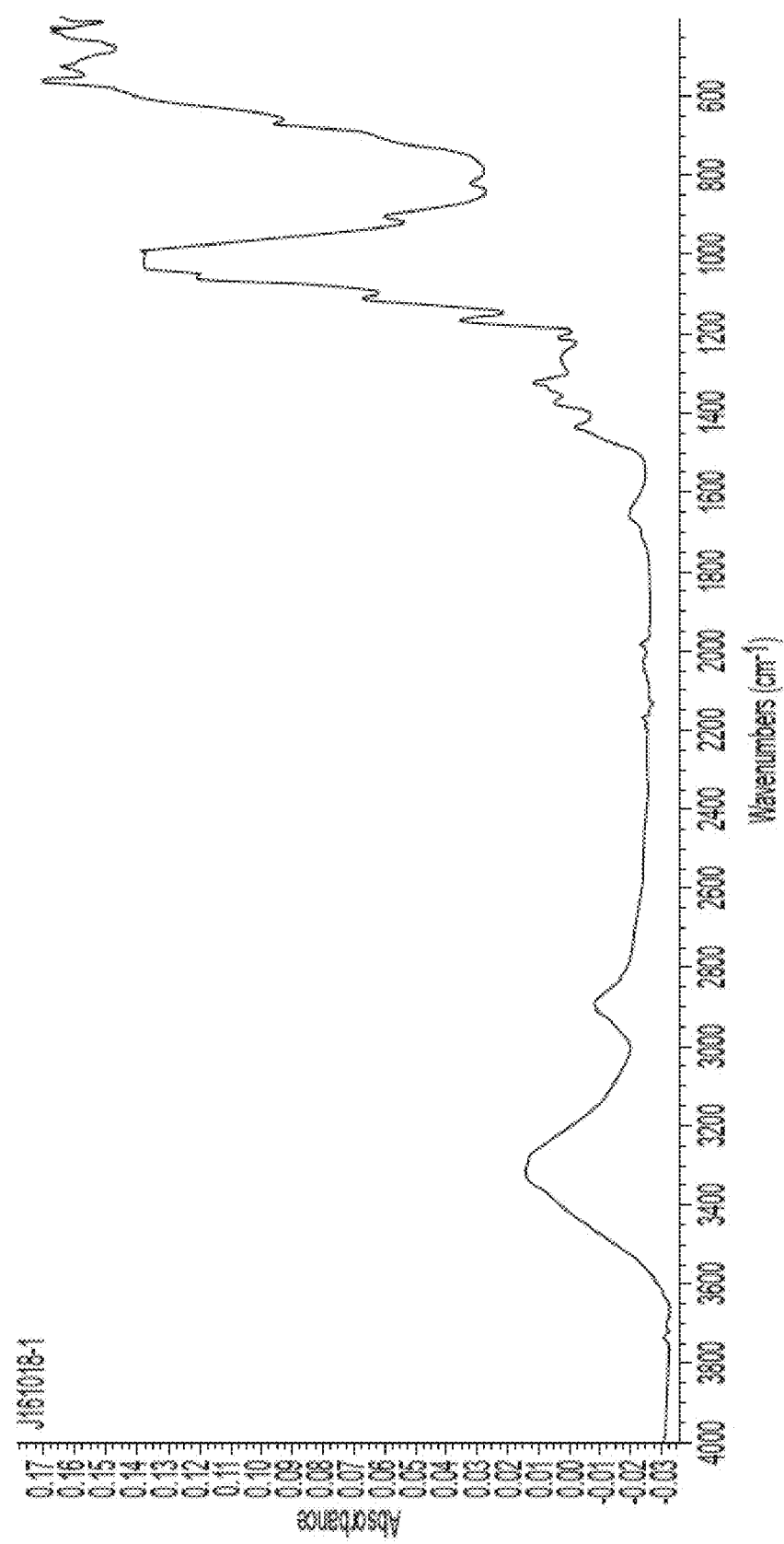

The resulted cellulose nanofibers were evaluated in the same manner as in Example 3. The resultant dispersion had a somewhat opaque gel-like appearance (FIG. 1), and an aqueous dispersion having a cellulose nanofiber concentration of 0.558 wt % was obtained. The SEM photographs of the nanofibers are shown in FIGS. 8(a), and the IR spectrum thereof is shown in FIG. 8(b). The fiber diameters of the resultant fibers were from several nanometers to 100 nm. In addition, a 0.3 wt % aqueous dispersion of the cellulose nanofibers had a viscosity of 1,294 mPa·s and a TI value of 7.8 at 25° C. The crystallinity degree of the nanofibers was 80%. The percent yield of the cellulose nanofibers was 93%. The results are shown in Table 1. In addition, the sulfur content of the resulted cellulose nanofibers was 1.5 wt %.

Example 5

Cellulose nanofibers were obtained in the same manner as in Example 4 except that: the addition amount of acetic anhydride was changed to 1 g (concentration in a fibrillation solution: 9.9 wt %); and the addition amount of sulfuric acid was changed to 0.06 g (concentration in the fibrillation solution: 0.6 wt %).

The appearance of the resultant aqueous dispersion of the cellulose nanofibers and the SEM photograph images of the nanofibers were substantially the same as those of Example 4. The aqueous dispersion had a cellulose nanofiber concentration of 0.552 wt %. In addition, a 0.3 wt % aqueous dispersion of the cellulose nanofibers had a viscosity of 1,312 mPa·s and a TI value of 8.8 at 25° C. The crystallinity degree of the nanofibers was 81%. The percent yield of the cellulose nanofibers was 92%. The results are shown in Table 1. In addition, the sulfur content of the resulted cellulose nanofibers was 1.6 wt %.

Example 6

Cellulose nanofibers were obtained in the same manner as in Example 5 except that the addition amount of acetic anhydride was changed to 0.5 g (concentration in a fibrillation solution: 5.2 wt %).

The resultant aqueous dispersion of the cellulose nanofibers was an opaque solution-like dispersion, and had a cellulose nanofiber concentration of 0.576 wt % (FIG. 1). The SEM observation found that the fiber diameters of the resultant fibers were from several nanometers to several hundreds of nanometers. In addition, a 0.3 wt % aqueous dispersion of the cellulose nanofibers had a viscosity of 350 mPa·s and a TI value of 3.0 at 25° C. The crystallinity degree of the nanofibers was 83%. The percent yield of the cellulose nanofibers was 96%. The results are shown in Table 1. In addition, the sulfur content of the resulted cellulose nanofibers was 1.3 wt %.

Comparative Example 1

The cellulose was fibrillated in the same manner as in Example 2 except that acetic anhydride was not added to the fibrillation solution.

The resultant fibrillated product was observed with an optical microscope. The pulp was disentangled into a fibrous shape, but the fiber diameters of most of the fibers were of the order of micrometers. The fiber diameters of a small part of the fibers were 20 nm or less. When the resultant aqueous dispersion was left to stand at room temperature for 1 hour, a precipitate occurred. Accordingly, its viscosity could not be measured. The results are shown in Table 1.

Comparative Example 2

The cellulose was fibrillated in the same manner as in Example 2 except that sulfuric acid was not added to the fibrillation solution.

As a result of the analysis of the resultant fibrillated product, the fibrillated product was substantially the same as the fibrillated product obtained in Comparative Example 1. The results are shown in Table 1.

As can be seen from the foregoing evaluation results of Examples 1 to 6, and Comparative Examples 1 and 2, cellulose nanofibers obtained by the production method of the present invention had a crystallinity degree of 70% or more and a percent yield of about 89% or more. An aqueous dispersion of cellulose nanofibers each having a fiber diameter of 100 nm or less had high transparency, a high viscosity, and high thixotropy. In addition, the cellulose nanofibers obtained in each of Examples 1 to 6 were sulfate ester modified cellulose nanofibers.

Example 7

Production of Film using Cellulose Nanofibers

The cellulose pulp was fibrillated under the same fibrillation conditions as those of Example 2 to provide slurry-like cellulose nanofibers. The resulted cellulose nanofibers were applied as they were onto a glass substrate, and were immersed in acetone together with the glass substrate. About 30 minutes after that, a gel-like cellulose nanofiber film was obtained. The resultant film was dried with a fan dryer at 85° C. until its moisture content became 50 wt %. Next, the dried product was loaded into a methanol bath, and the remaining dimethylsulfoxide, sulfuric acid, or acetic acid was replaced with methanol. The resultant was dried with a dryer at 85° C. again until the resultant became bone-dry. Thus, a cellulose nanofiber film was obtained.

Example 8

Production of Fibers using Cellulose Nanofibers

The cellulose pulp was fibrillated under the same fibrillation conditions as those of Example 2 to provide slurry-like cellulose nanofibers. The resulted cellulose nanofibers were sucked as they were in a 5-milliliter syringe, and were then extruded into an acetone bath. About 30 minutes after that, gel-like cellulose nanofibers were obtained. The resultant fibers were dried with a fan dryer at 85° C. until its moisture content became 50 wt %. Next, the dried product was loaded into a methanol bath, and the remaining dimethylsulfoxide, sulfuric acid, or acetic acid was replaced with methanol. The resultant was dried with a dryer at 85° C. again until the resultant became bone-dry. Thus, cellulose nanofiber fibers were obtained.

Example 9

Eighteen grams of DMSO, 2 g of acetic anhydride (concentration in a fibrillation solution: 9.9 wt %), and 0.15 g of sulfuric acid (concentration in the fibrillation solution: 0.74 wt %) were loaded into a 50-milliliter sample bottle, and the mixture was stirred under a room temperature of 23° C. with a magnetic stirrer for about 30 seconds to prepare the fibrillation solution.

Next, 0.6 g of the cellulose pulp was added to the solution, and the mixture was stirred at a room temperature of 23° C. for 80 minutes. The stirred mixture was added to an aqueous solution prepared from 3 g of sodium hydrogen carbonate and 400 ml of distilled water, and the contents were mixed at room temperature for 10 minutes. After that, a supernatant was removed by centrifugation. Next, 400 ml of distilled water was added to the residue, and the mixture was stirred until the added liquid was uniformly dispersed, followed by the removal of a supernatant by centrifugation under the same conditions as those described above. The same procedure was repeated to wash the cellulose four times. After the washing through centrifugation, distilled water was added to dilute the resultant until the entire weight became 150 g. Next, the mixture was stirred with a mixer for 3 minutes to provide a uniform aqueous dispersion of cellulose nanofibers.

Figure 9:
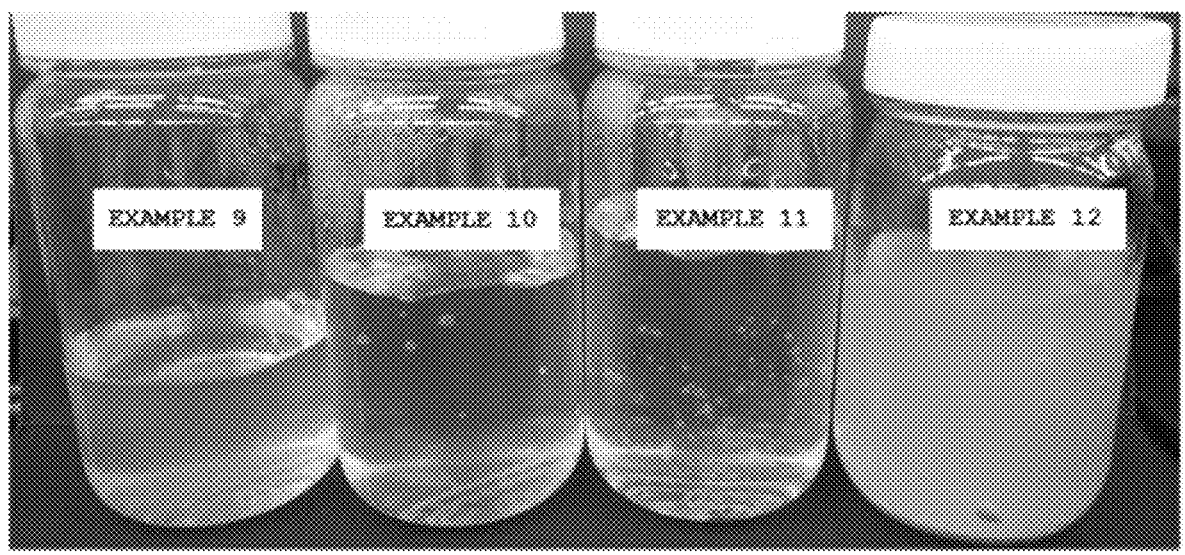
FIG. 9 is a photograph of aqueous dispersions (solid content concentration: 0.3 wt %) of cellulose nanofibers obtained in Examples 9 to 12.
Figure 10:
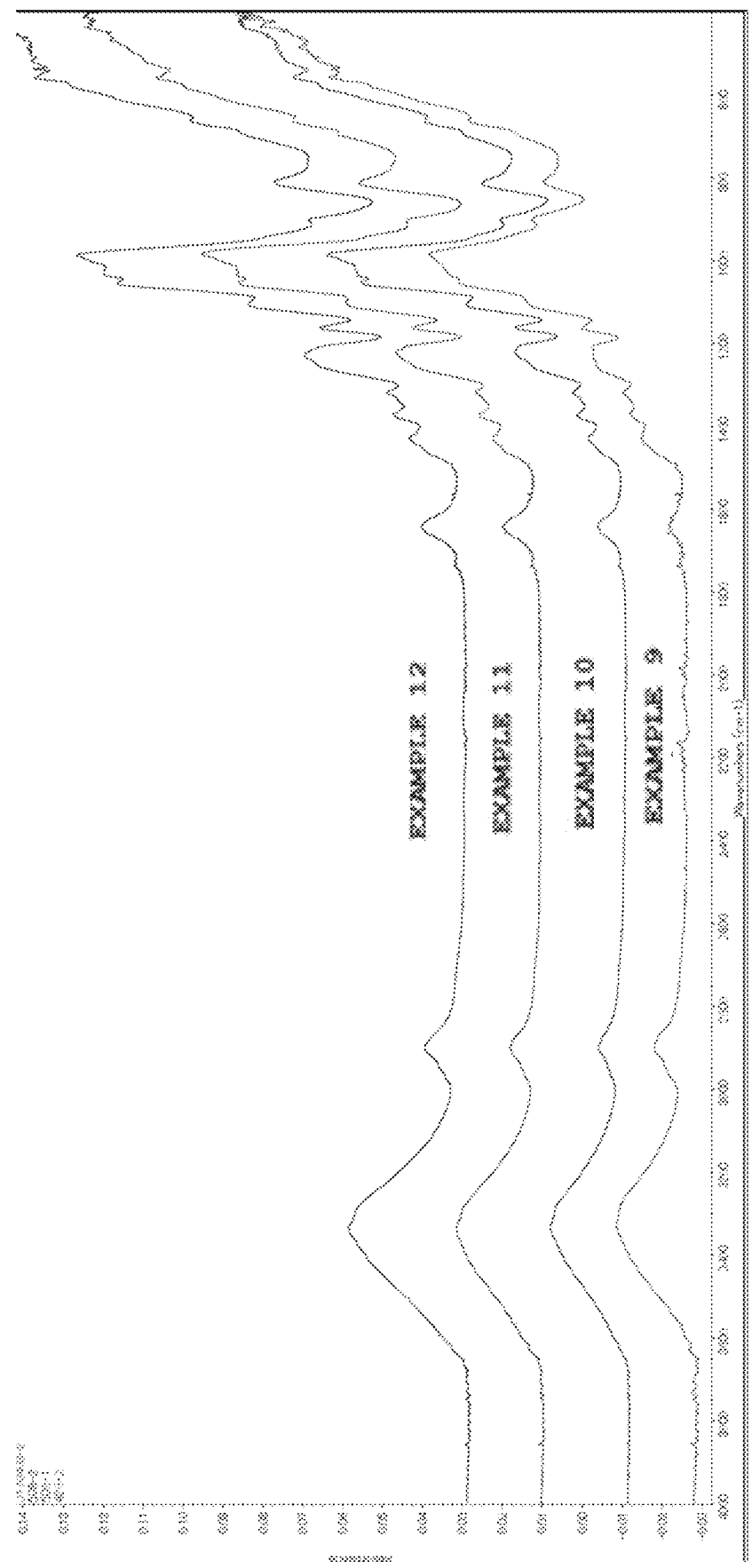
FIG. 10 is an IR spectrum of the cellulose nanofibers obtained in each of Examples 9 to 12.
Figure 11:
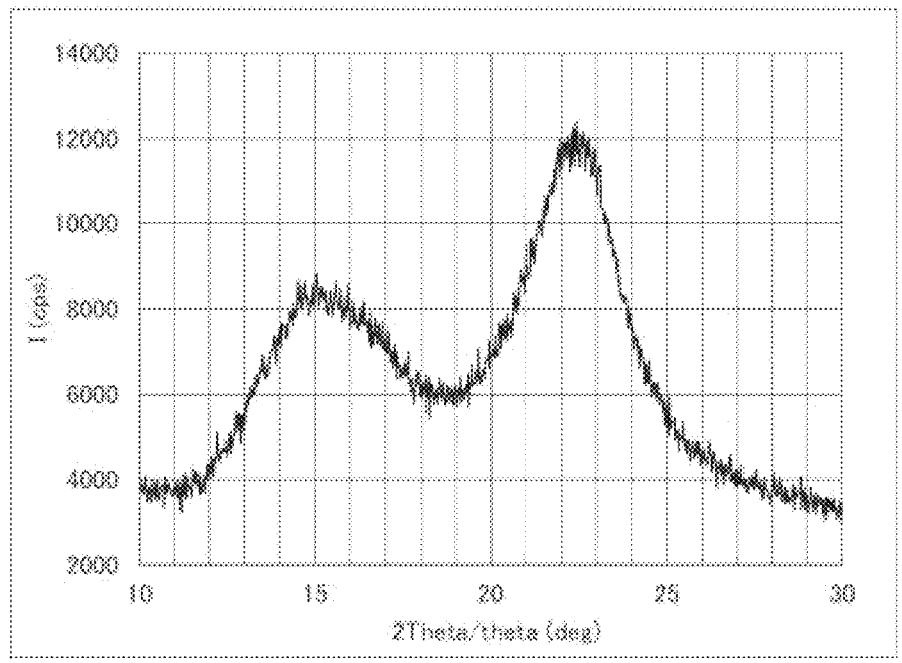
FIG. 11 is an XRD pattern of the cellulose nanofibers obtained in Example 9.
Figure 12:
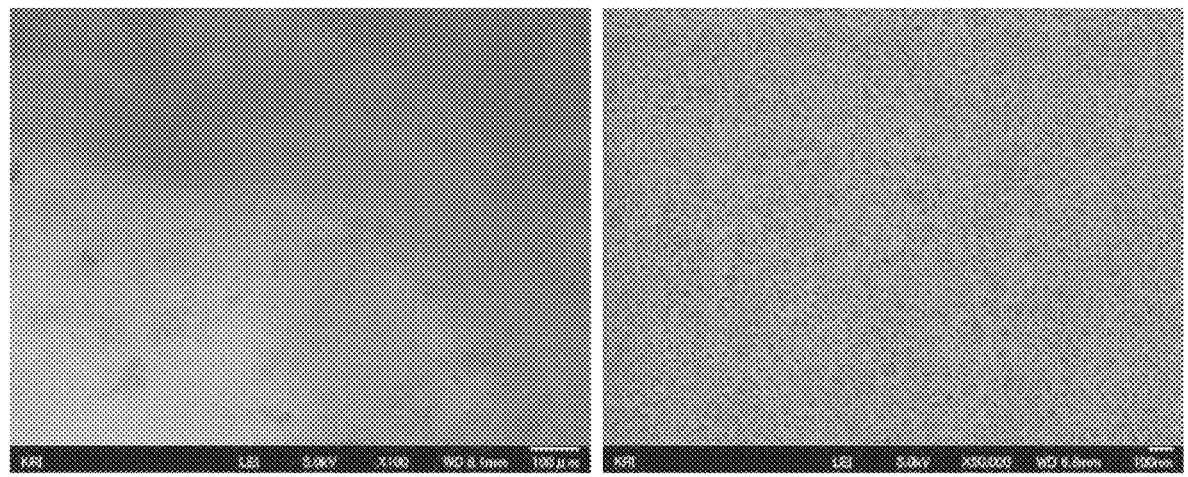
FIG. 12 are SEM photographs of the cellulose nanofibers obtained in Example 9.

The appearance of the resultant aqueous dispersion is shown in FIG. 9. The aqueous dispersion of the cellulose nanofibers was a semitransparent gel. The IR spectrum, XRD pattern, and SEM photographs of the nanofibers are shown in FIG. 10, FIG. 11, and FIGS. 12, respectively. The absorption band (1,730 $cm^{-1}$) of a carbonyl group involved in acylation modification was not detected from the IR spectrum of FIG. 10, and the absorption bands (1,250 $cm^{-1}$ and 820 $cm^{-1}$) of —O—$SO_3^{-1}$ were detected instead. Those absorption bands are considered to be bands characteristic of a sulfuric acid ester group. It was confirmed from the foregoing that sulfate ester modified cellulose nanofibers were obtained.

The cellulose I crystalline structure of natural cellulose was able to be confirmed by the XRD pattern of FIG. 11. As shown in the SEM photographs of FIGS. 12, nanofibers each having a diameter of 5 nm or less were able to be observed through enlargement at a magnification of 50,000. The evaluation results of the sulfur content, crystallinity degree, viscosity, and thixotropy index of the nanofibers are shown in Table 2. In addition, the dispersion had a viscosity of 2,030 mPa·s and a TI value of 8.6.

TABLE 2

| | Composition (g) | Time (minute(s)) | Fiber diameter | Appearance of dispersion | Viscosity (mPa · s) | TI value (2.6 rpm/ 26 rpm) | Sulfur content (wt %) | Crystallinity degree (%) |
|---|---|---|---|---|---|---|---|---|
| Example 9 | DMSO/sulfuric acid/ acetic anhydride/pulp (18/0.15/2/0.6) | 80 | Mostly 10 nm or less | Semitransparent gel | 2,030 | 8.6 | 2.13 | 69 |
| Example 10 | DMSO/sulfuric acid/ acetic anhydride/pulp (15/0.15/5/0.6) | 80 | 10 nm or less | Transparent gel | 2,280 | 9.8 | 3.71 | 62 |
| Example 11 | DMSO/sulfuric acid/ acetic anhydride/pulp (13/0.15/7/0.6) | 80 | 10 nm or less | Transparent gel | 2,129 | 10.5 | 3.86 | 59 |
| Example 12 | DMSO/sulfuric acid/ acetic anhydride/pulp (10/0.15/10/0.6) | 80 | Mostly 10 nm or less | Semitransparent gel | 2,630 | 9.1 | 3.77 | 73 |
| Example 13 | DMSO/sulfuric acid/ acetic anhydride/pulp (18/0.15/2/0.6) | 150 | 10 nm or less | Transparent gel | 2,520 | 9.7 | 3.4 | 55 |
| Example 14 | DMSO/sulfuric acid/ acetic anhydride/pulp (18/0.5/2/0.6) | 60 | Mostly 10 nm or less | Semitransparent gel | 2,560 | 8.4 | 4.30 | 66 |
| Example 15 | DMSO/sulfuric acid/ acetic anhydride/pulp (16/0.5/4/0.6) | 60 | 10 nm or less | Transparent gel | 2,789 | 10.9 | 6.64 | 58 |
| Example 16 | DMSO/sulfuric acid/ acetic anhydride/pulp (18/0.1/2/0.6) | 210 | Mostly 10 nm or less | Semitransparent gel | 1,952 | 8.6 | 2.71 | 67 |
| Example 17 | DMSO/sulfuric acid/ acetic anhydride/pulp (18/0.26/2/0.6) | 150 | 10 nm or less | Transparent gel | 2,930 | 9.2 | 7.50 | 53 |
| Example 18 | DMSO/sulfuric acid/ acetic anhydride/pulp (18/0.15/2/0.6) | 95 | Mostly 10 nm or less | Transparent gel | 2,768 | 8.5 | 3.1 | 59 |
| Example 19 | DMSO/sulfuric acid/ propionic anhydride/pulp (16/0.26/4/0.6) | 150 | Mostly 10 nm or less | Semitransparent gel | 1,890 | 7.9 | 2.5 | 65 |
| Example 20 | DMSO/sulfuric acid/ acetic anhydride/pulp (7/0.15/13/0.6) | 80 | Mostly 100 nm or less | Opaque gel | 1,630 | 5.8 | 0.8 | 78 |
| Comparative Example 3 | DMSO/sulfuric acid/ acetic anhydride/pulp (20/0.25/0/0.6) | 120 | Several hundreds of nanometers to several tens of micrometers | White precipitate | — | — | Undetectable | — |

TABLE 2-continued

| | Composition (g) | Time (minute(s)) | Fiber diameter | Appearance of dispersion | Viscosity (mPa · s) | TI value (2.6 rpm/ 26 rpm) | Sulfur content (wt %) | Crystallinity degree (%) |
|---|---|---|---|---|---|---|---|---|
| Comparative Example 4 | DMSO/sulfuric acid/ acetic anhydride/pulp (0/0.25/20/0.6) | 120 | Several micrometers or more | White precipitate | — | — | Undetectable | — |

Example 10

Sulfate ester modified cellulose nanofibers were prepared in the same manner as in Example 9 except that: the addition amount of DMSO was changed to 15 g; and the addition amount of acetic anhydride was changed to 5 g (concentration in a fibrillation solution: 24.8 wt %).

Figure 13:
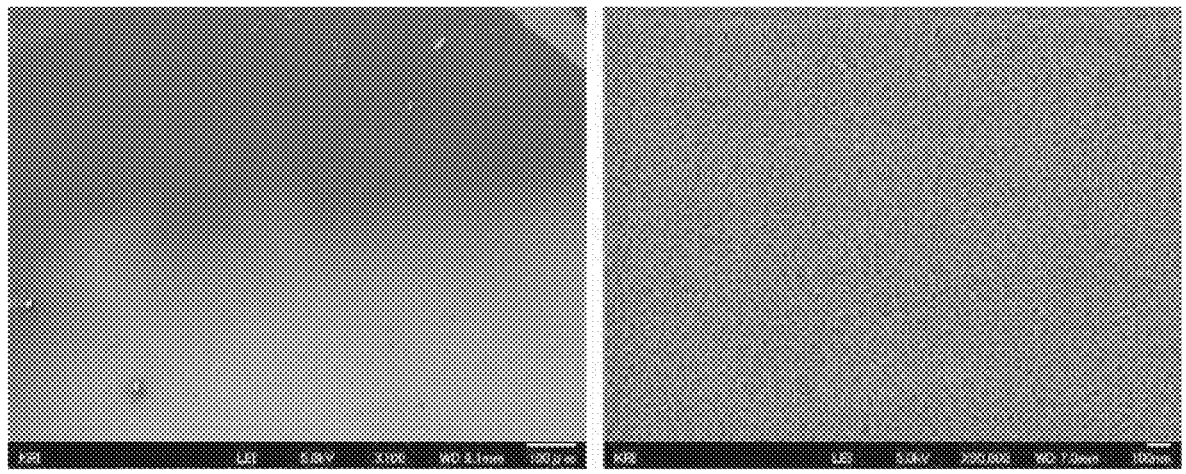
FIG. 13 are SEM photographs of the cellulose nanofibers obtained in Example 10.

The appearance of the resultant aqueous dispersion of the sulfate ester modified cellulose nanofibers is shown in FIG. 9. The IR spectrum and SEM photographs of the nanofibers are shown in FIG. 10 and FIGS. 13, respectively. The evaluation results of the sulfur content, crystallinity degree, viscosity, and thixotropy index of the nanofibers are shown in Table 2. As in Example 9, the absorption band of a carbonyl group involved in acylation modification could not be confirmed from the IR spectrum. Meanwhile, the intensities of the absorption bands (1,250 cm$^{-1}$ and 820 cm$^{-1}$) obviously increased as compared to those of Example 9. The analysis result of the sulfur content showed that the sulfuric acid esterification modification ratio of the nanofibers increased as compared to that of Example 9. Each of the transparency, viscosity, and thixotropy index of the dispersion was higher than that of Example 9.

Example 11

Sulfate ester modified cellulose nanofibers were prepared in the same manner as in Example 9 except that: the addition amount of DMSO was changed to 13 g; and the addition amount of acetic anhydride was changed to 7 g (concentration in a fibrillation solution: 34.5 wt %).

The appearance of the resultant aqueous dispersion of the sulfate ester modified cellulose nanofibers is shown in FIG. 9. The IR spectrum of the nanofibers is shown in FIG. 10. In addition, the evaluation results of the sulfur content, crystallinity degree, viscosity, and TI value of the nanofibers are shown in Table 2. The intensities of the absorption bands (1,250 cm$^{-1}$ and 820 cm$^{-1}$) of the IR spectrum, and the analysis result of the sulfur content each showed that the sulfuric acid esterification modification ratio of the nanofibers increased as compared to that of Example 10.

Example 12

Sulfate ester modified cellulose nanofibers were prepared in the same manner as in Example 9 except that: the addition amount of DMSO was changed to 10 g; and the addition amount of acetic anhydride was changed to 10 g (concentration in a fibrillation solution: 49.6 wt %).

Figure 14:
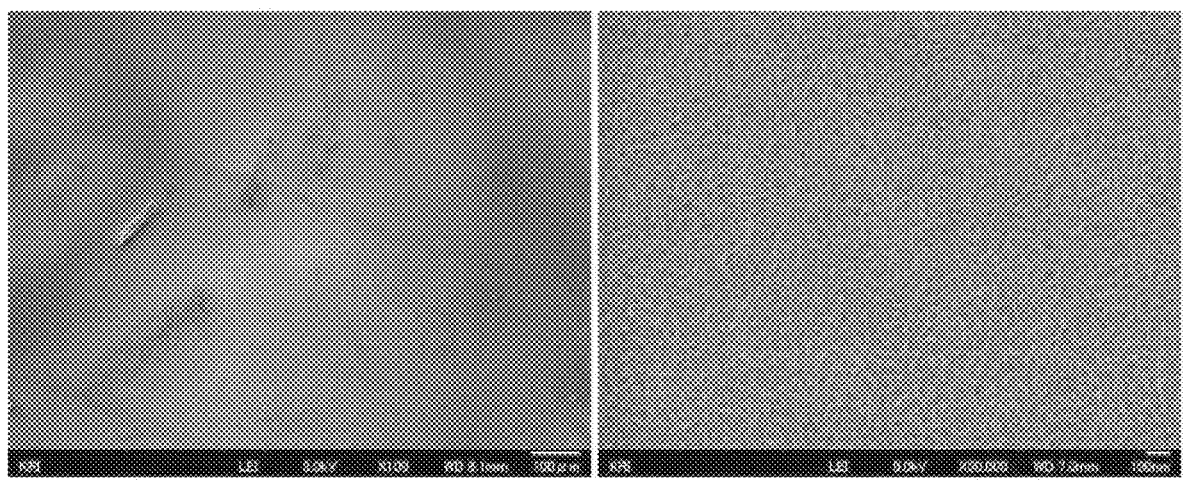
FIG. 14 are SEM photographs of the cellulose nanofibers obtained in Example 12.

The appearance of the resultant aqueous dispersion of the sulfate ester modified cellulose nanofibers is shown in FIG. 9. The IR spectrum and SEM photographs of the nanofibers are shown in FIG. 10 and FIGS. 14, respectively. In addition, the evaluation results of the sulfur content, crystallinity degree, viscosity, and TI value of the nanofibers are shown in Table 2. The transparency of the dispersion reduced as compared to that of Example 11. However, the intensities of the absorption bands at 1,250 cm$^{-1}$ and 820 cm$^{-1}$ of the IR spectrum, and the analysis result of the sulfur content each showed that the sulfuric acid esterification modification ratio of the nanofibers was substantially the same as that of Example 11.

Example 13

Sulfate ester modified cellulose nanofibers were prepared in the same manner as in Example 9 except that the reaction (stirring) time was changed to 150 minutes.

Figure 15:
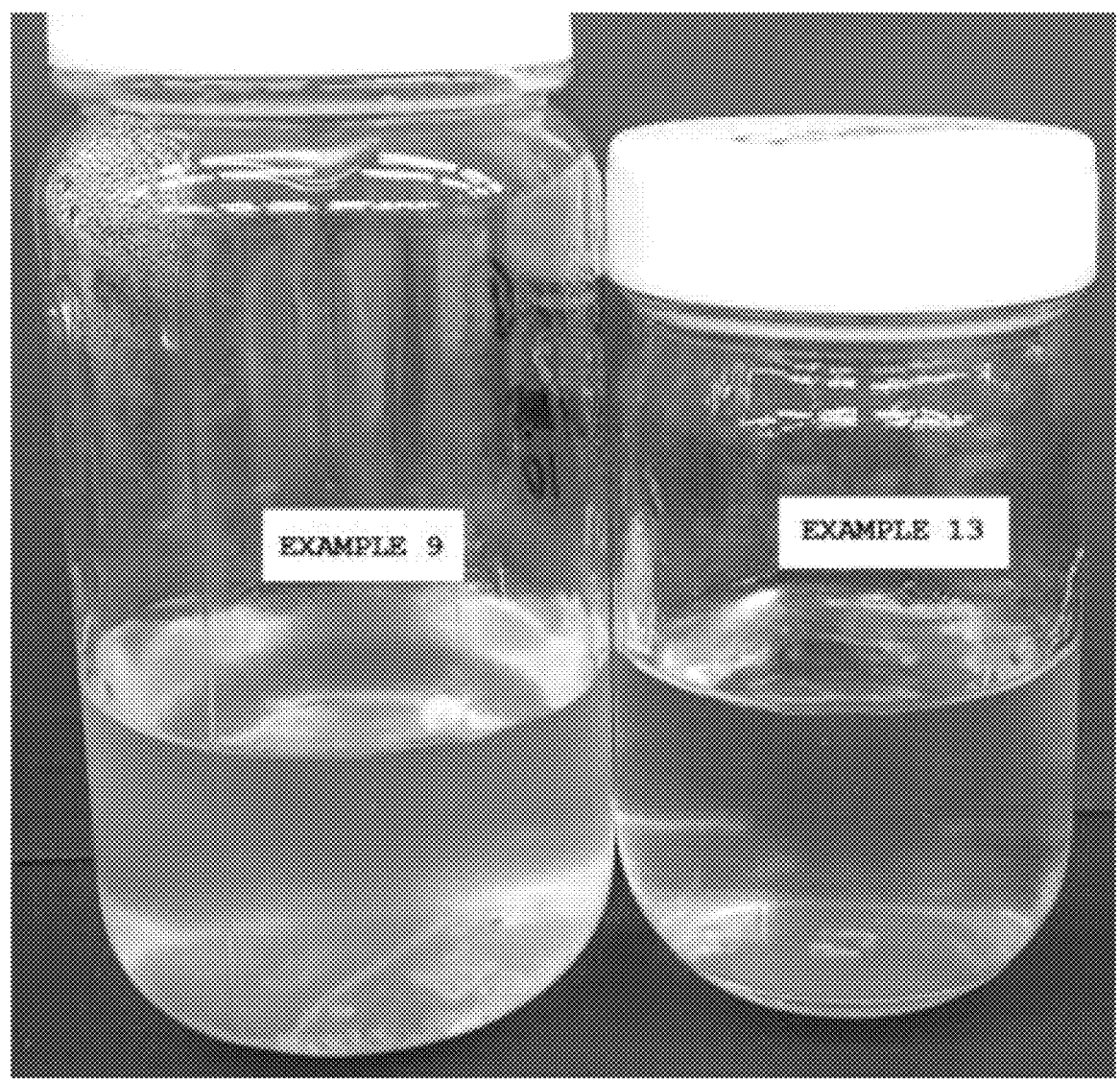
FIG. 15 is a photograph of an aqueous dispersion (solid content concentration: 0.3 wt %) of cellulose nanofibers obtained in Example 13.
Figure 16:
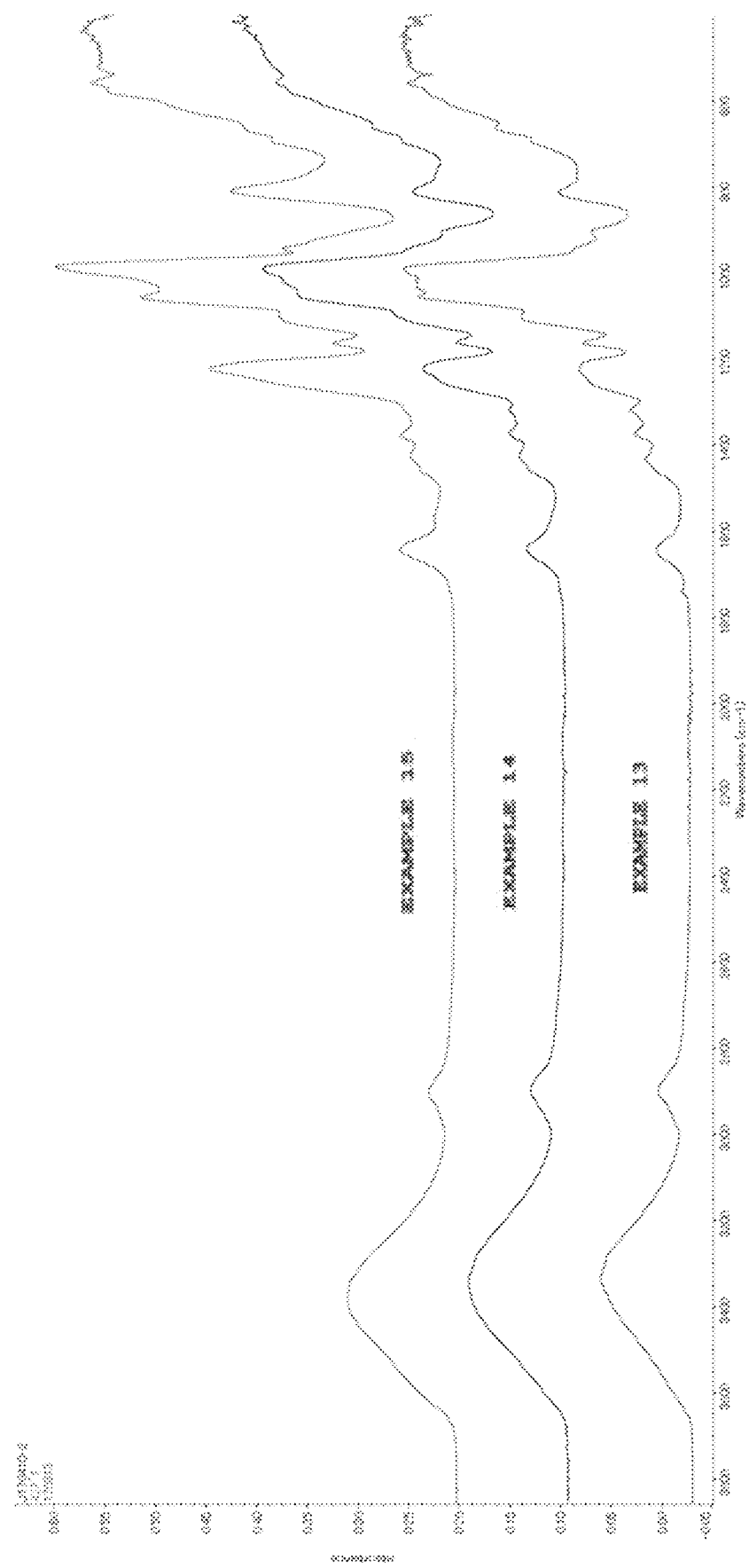
FIG. 16 is an IR spectrum of cellulose nanofibers obtained in each of Examples 13, 14, and 15.

The appearance of the resultant aqueous dispersion of the sulfate ester modified cellulose nanofibers is shown in FIG. 15. The IR spectrum of the nanofibers is shown in FIG. 16. In addition, the evaluation results of the sulfur content, crystallinity degree, viscosity, and thixotropy index of the nanofibers are shown in Table 2. The transparency of the dispersion was higher than that of Example 9. The sulfuric acid esterification modification ratio of the nanofibers increased as compared to that of Example 9.

Examples 14 to 17

Figure 17:
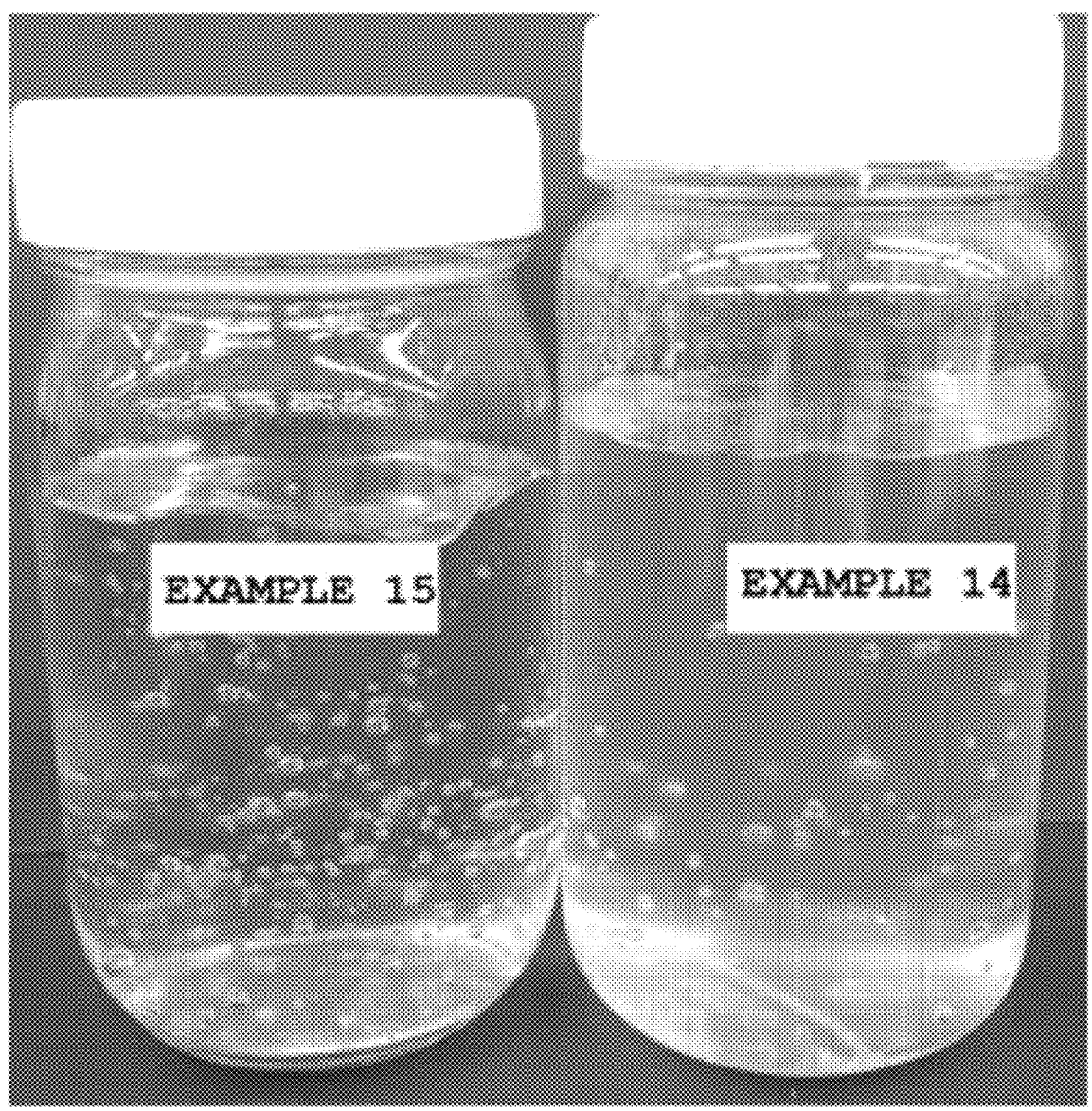
FIG. 17 is a photograph of aqueous dispersions (solid content concentration: 0.3 wt %) of the cellulose nanofibers obtained in Examples 14 and 15.

DMSO, acetic anhydride, and sulfuric acid were weighed in amounts shown in Table 2, and were loaded into a 50-milliliter sample bottle. After that, sulfate ester modified cellulose nanofibers were prepared in the same manner as in Example 9. The appearances of the resultant aqueous dispersions of the sulfate ester modified cellulose nanofibers are shown in FIG. 17 (Examples 14 and 15). The IR spectra of the nanofibers are shown in FIG. 16 (Examples 14 and 15) and FIG. 18 (Examples 16 and 17). In addition, the evaluation results of the sulfur content, crystallinity degree, viscosity, and thixotropy index of the nanofibers are shown in Table 2.

The concentrations of acetic anhydride and sulfuric acid in the fibrillation solution used in each Example are as described below.

The fibrillation solution of Example 14 (concentration of acetic anhydride: 9.8 wt %, concentration of sulfuric acid: 2.4 wt %)

The fibrillation solution of Example 15 (concentration of acetic anhydride: 19.5 wt %, concentration of sulfuric acid: 2.4 wt %)

The fibrillation solution of Example 16 (concentration of acetic anhydride: 10 wt %, concentration of sulfuric acid: 0.5 wt %)

The fibrillation solution of Example 17 (concentration of acetic anhydride: 9.9 wt %, concentration of sulfuric acid: 1.3 wt %)

Example 18

Figure 18:
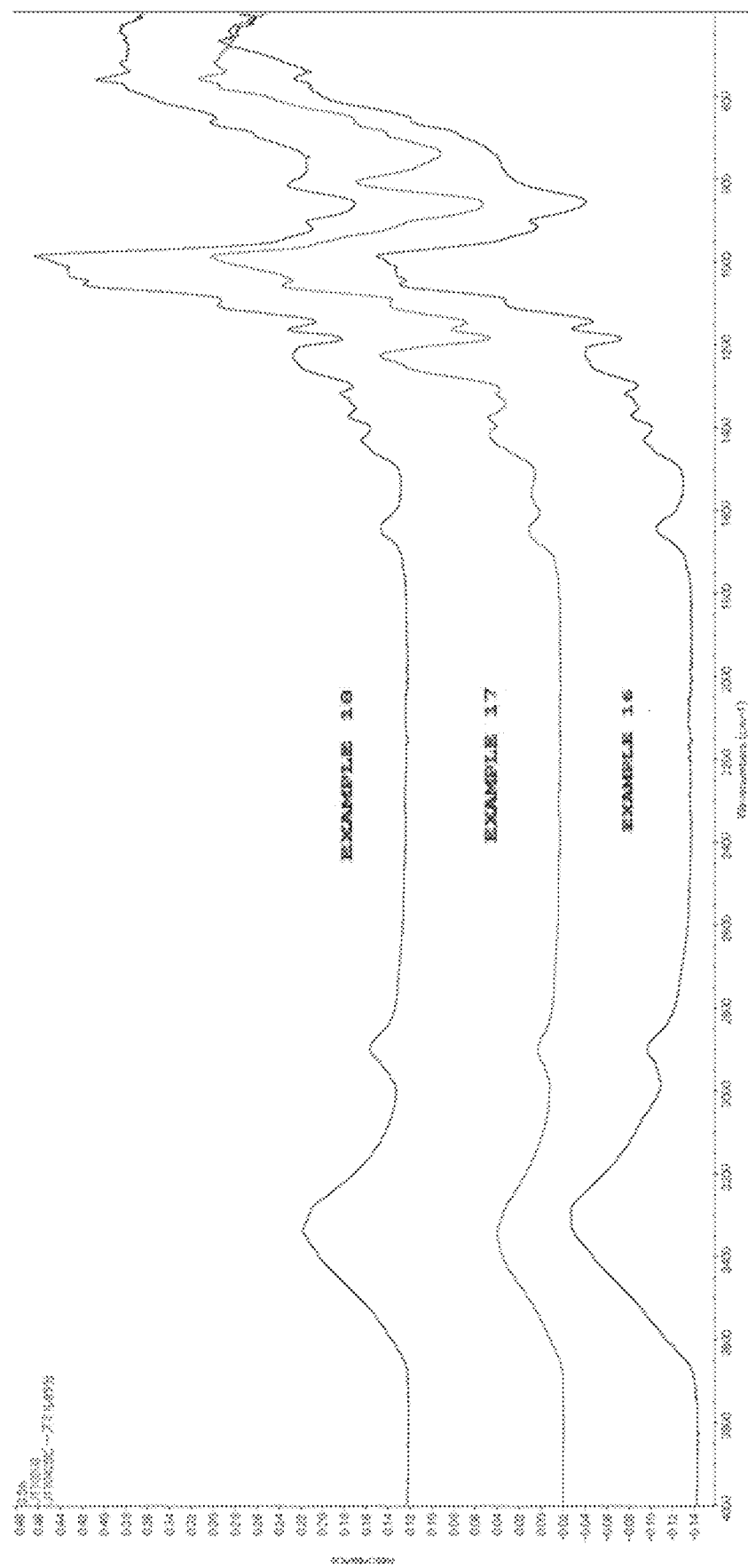
FIG. 18 is an IR spectrum of cellulose nanofibers obtained in each of Examples 16, 17, and 18.

DMSO, acetic anhydride, sulfuric acid, and the cellulose pulp were weighed in amounts shown in Table 2, and were loaded into a 140-milliliter mayonnaise bottle together with 250 g of zirconia beads each having a diameter of 5 mm. The mixture was treated under a room temperature of 23° C. with a paint shaker for 80 minutes. Next, the resultant was neutralized and washed in the same manner as in Example 9 to prepare sulfate ester modified cellulose nanofibers. The IR spectrum of the resultant sulfate ester modified cellulose nanofibers is shown in FIG. 18. In addition, the evaluation results of the sulfur content, crystallinity degree, viscosity, and thixotropy index of the nanofibers are shown in Table 2.

Example 19

Figure 19:
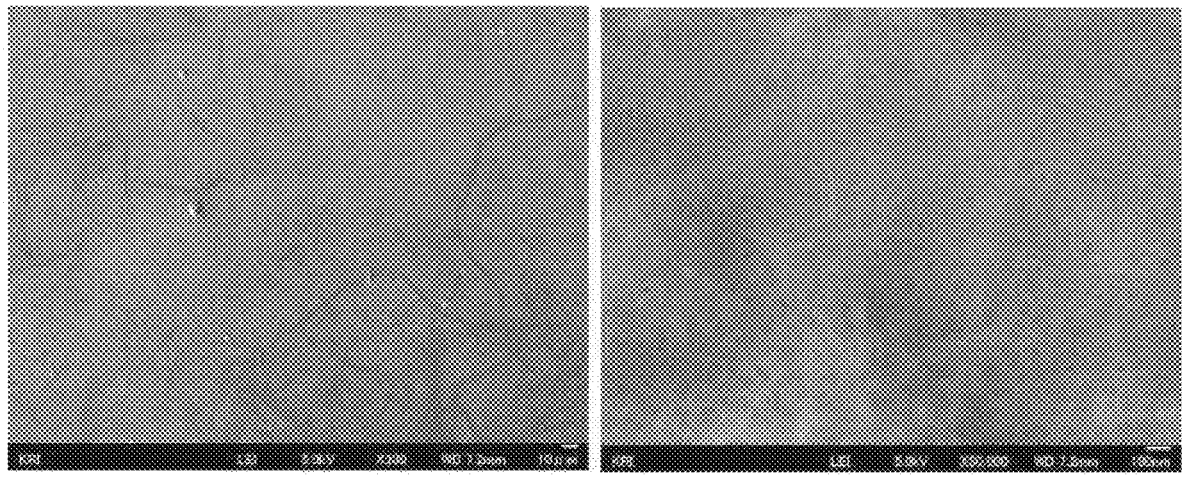
FIG. 19 are SEM photographs of cellulose nanofibers obtained in Example 19.

Sulfate ester modified cellulose nanofibers were prepared in the same manner as in Example 17 except that 16 g of DMSO and 4 g of propionic anhydride (propionic anhydride concentration in a fibrillation solution: 19.7 wt %) were used instead of 18 g of DMSO and 2 g of acetic anhydride. The SEM photographs of the resulted sulfate ester modified cellulose nanofibers are shown in FIG. 19, and their evaluation results are shown in Table 2.

Example 20

Sulfate ester modified cellulose nanofibers were prepared in the same manner as in Example 9 except that: the addition amount of DMSO was changed to 7 g; and the addition amount of acetic anhydride was changed to 13 g (concentration of acetic anhydride in a fibrillation solution: 63 wt %). The evaluation results are shown in Table 2.

Example 21

Sulfate ester modified cellulose nanofibers were prepared in the same manner as in Example 17 except that a flask stirring method was used. That is, the cellulose nanofibers were obtained in the same manner as in Example 2 except that DMSO, acetic anhydride, sulfuric acid, and the pulp were sequentially loaded into a 200-milliliter flask, and were stirred under a room temperature of 23° C. with a stirring rod including a stirring blade for 2.5 hours. The resulted cellulose nanofibers were evaluated in the same manner as in Example 17. As a result of the SEM observation, the fiber diameters of the resulted cellulose nanofibers were substantially the same as those of the cellulose nanofibers of Example 17, and the nanofibers were substantially free of nanofibers each having a fiber diameter of 20 nm or more.

Example 22

Sulfate ester modified cellulose nanofibers were obtained in the same manner as in Example 19 except that 50 g of pyridine was used instead of 3 g of sodium hydrogen carbonate as an alkaline substance for neutralization. The resulted cellulose nanofibers were dispersed in an alcohol-based solvent, such as ethanol, well as compared to the cellulose nanofibers obtained in Example 21. The other evaluation results were substantially the same as those of Example 19.

Comparative Example 3

The cellulose was fibrillated in the same manner as in Example 9 except that acetic anhydride was not added. The resultant fibrillated product was observed with an optical microscope. The pulp was disentangled into a fibrous shape, but the fiber diameters of most of the fibers were of the order of micrometers. The fiber diameters of a small part of the fibers were 20 nm or less. When the resultant aqueous dispersion of the fibers was left to stand at room temperature for 1 hour, a precipitate occurred. Accordingly, its viscosity could not be measured.

Comparative Example 4

The cellulose was fibrillated in the same manner as in Example 9 except that sulfuric acid was not added. As a result of the analysis of the resultant fibrillated product, the fibrillated product was substantially the same as the fibrillated product obtained in Comparative Example 3.

Example 23

Production of Film using Cellulose Nanofibers

Figure 20:
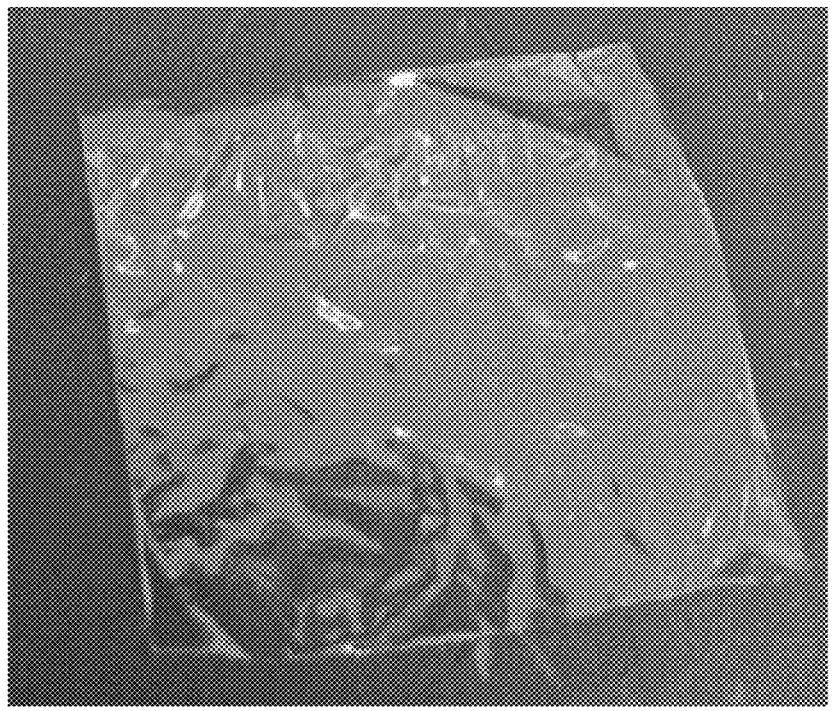
FIG. 20 is a photograph of a film produced from sulfate ester modified cellulose nanofibers obtained in Example 21.

The aqueous dispersion of the sulfate ester modified cellulose nanofibers prepared in Example 10 was cast onto a polypropylene case, and was left to stand at room temperature so that water was evaporated. The appearance and physical property evaluation results of the resultant film are shown in FIG. 20. The film had a visible light transmittance of 86%, a tensile modulus of elasticity of 4,950 MPa, a strength of 106 MPa, and a strain of 5.5%.

Example 24

Production of Fibers containing Cellulose Nanofibers

The aqueous dispersion of the sulfate ester modified cellulose nanofibers prepared in Example 10 was sucked in a 50-milliliter syringe, and was then extruded into a 1 wt % aqueous solution of calcium acetate. The extruded product was left to stand for about 10 minutes to provide a transparent gel-like yarn. The resultant yarn was dried with a fan dryer at 55° C. for 6 hours to provide fibers containing the sulfate ester modified cellulose nanofibers.

As can be seen from the evaluation results of Examples 9 to 22, cellulose nanofibers obtained by the production method of the present invention had small fiber diameters, and an aqueous dispersion thereof had high transparency, a high viscosity, and high thixotropy. In addition, it was found that the film prepared from the sulfate ester modified cellulose nanofibers obtained in Example 10 was excellent in transparency and mechanical properties.

Example 25

Eighteen grams of dimethylsulfoxide (DMSO), 2 g of acetic anhydride (concentration in a fibrillation solution: 9.9 wt %), and 0.15 g of sulfuric acid (concentration in the fibrillation solution: 0.74 wt %) were loaded into a 50-milliliter sample bottle, and the mixture was stirred under a room temperature of 23° C. with a magnetic stirrer for about 30 seconds to provide the fibrillation solution.

Next, 0.6 g of the cellulose pulp was added to the fibrillation solution, and the mixture was stirred at a room temperature of 23° C. for 80 minutes. Next, the fibrillation solution containing the cellulose was repeatedly washed with distilled water three times by using a squeezing method, and was then added to an aqueous solution prepared from 0.5 g of potassium carbonate and 400 ml of distilled water, followed by mixing at room temperature for 10 minutes. After that, the mixture was similarly repeatedly washed with distilled water three times by using the squeezing method to provide neutral cellulose nanofibers.

The resulted cellulose nanofibers were redispersed in distilled water to prepare a 0.3 wt % aqueous dispersion, and the dispersion was stirred with a mixer for 3 minutes to provide an aqueous dispersion of the cellulose nanofibers.

Figure 21:
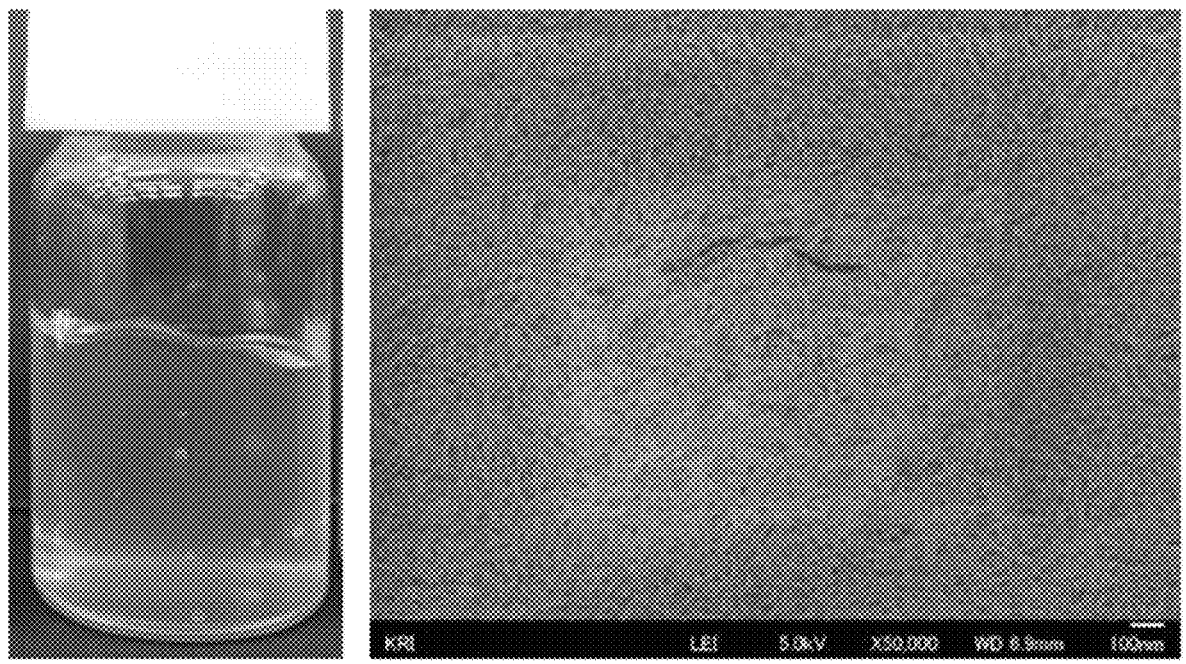
FIG. 21 are a SEM photograph of cellulose nanofibers obtained in the fibrillation step of Example 25 (right) and a photograph of an aqueous dispersion of the cellulose nanofibers (left).
Figure 22:
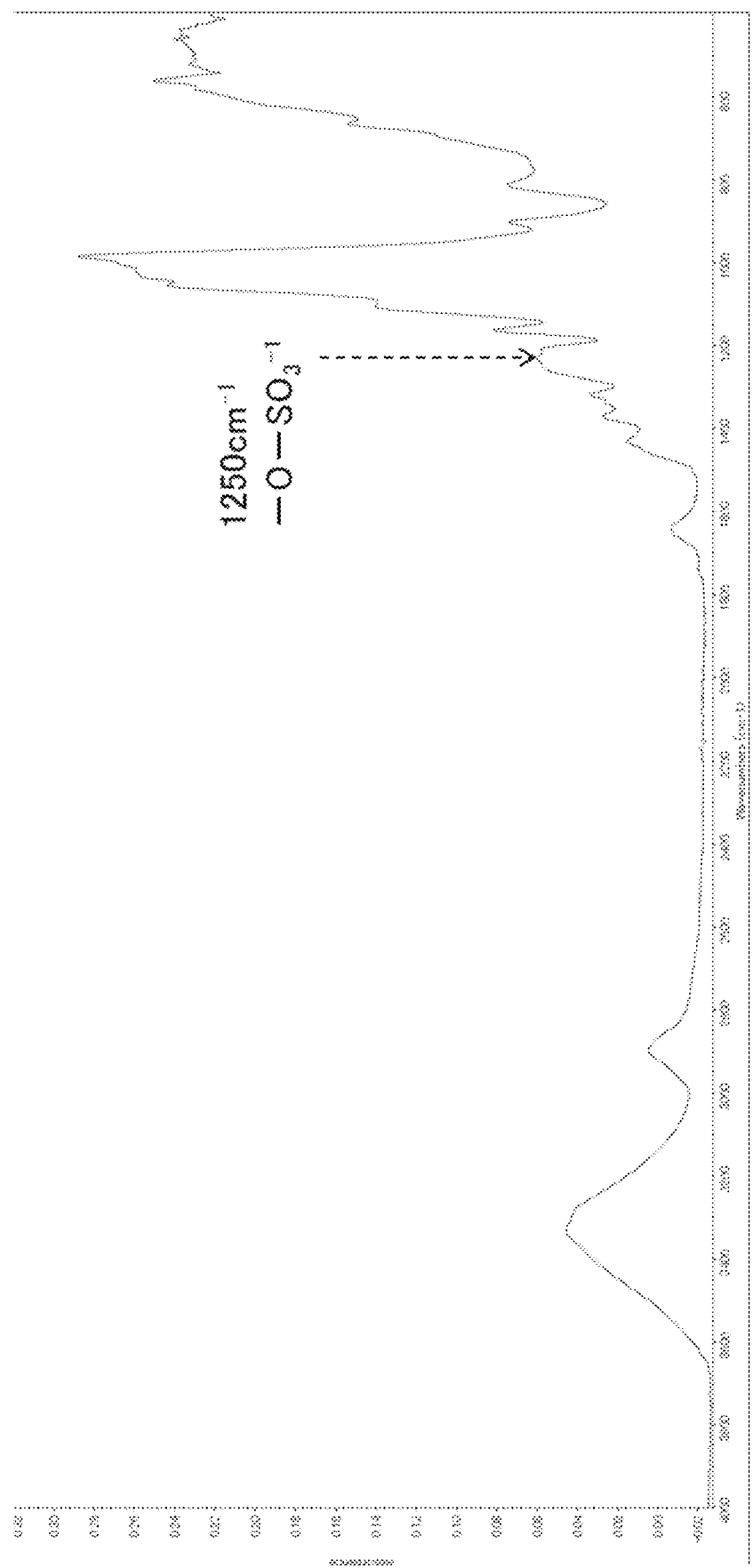
FIG. 22 is an IR spectrum of the cellulose nanofibers obtained in the fibrillation step of Example 25.
Figure 23:
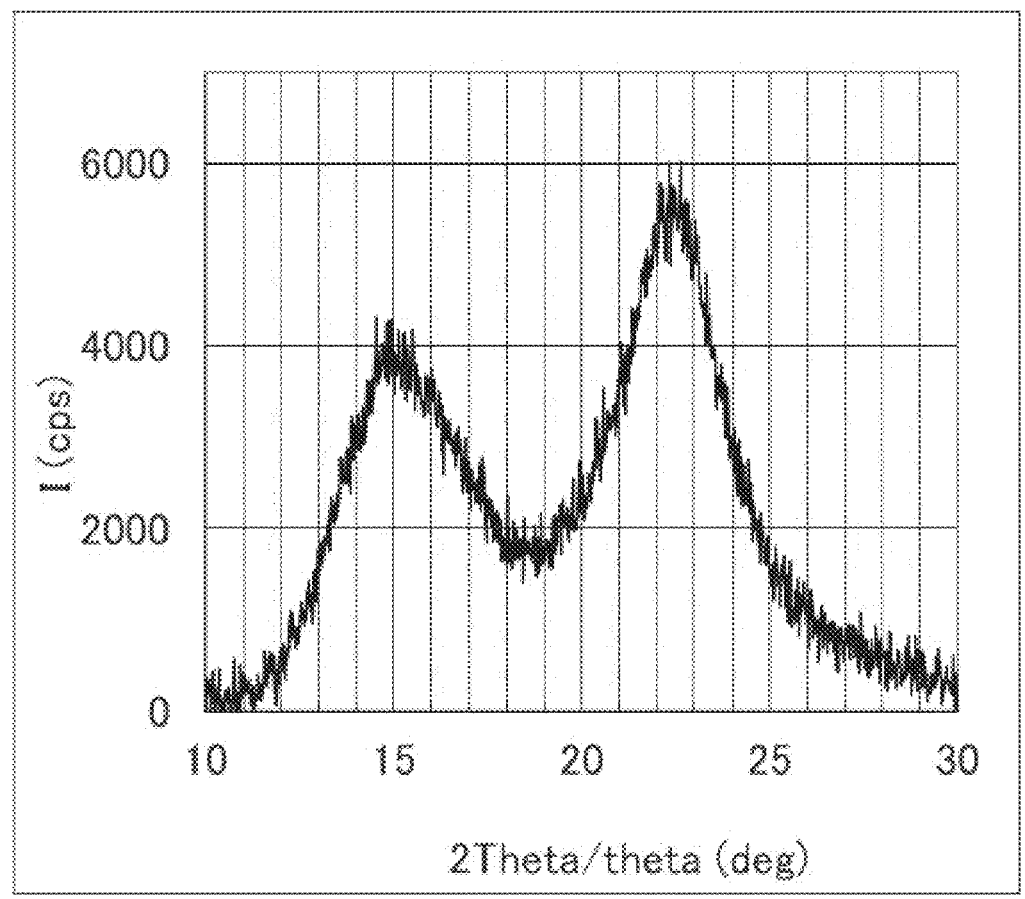
FIG. 23 is an XRD pattern of the cellulose nanofibers obtained in the fibrillation step of Example 25.

The appearance and SEM photograph of the resultant aqueous dispersion are shown in FIG. 21. The aqueous dispersion of the cellulose nanofibers was a semitransparent gel, and the resulted fibers had an average fiber diameter of 10 nm or less. The IR spectrum and XRD pattern of the nanofibers are shown in FIG. 22 and FIG. 23, respectively. As can be seen from the IR spectrum of FIG. 22, the absorption band (1,730 cm$^{-1}$) of a carbonyl group involved in acetylation modification was not detected, and the absorption band (1,250 cm$^{-1}$) of —O—SO$_3^{-1}$ was detected instead. The absorption band at 1,250 cm$^{-1}$ is considered to be derived from a sulfuric acid ester functional group. The cellulose I crystalline structure of natural cellulose was able to be confirmed from the XRD pattern of FIG. 23. The evaluation results of the average degree of substitution of sulfuric acid ester groups, and crystallinity degree, of the nanofibers are shown in Table 3. The resulted cellulose nanofibers had a sulfur content of 2.1 wt % (a degree of substitution of sulfuric acid ester groups of 0.12).

Each of Example 25 to Example 30 is Example relating to a method of producing acetylation-modified cellulose nanofibers, and along with the fact that an average degree of substitution was used as an acetylation modification ratio, the sulfuric acid esterification modification ratio of the nanofibers was also evaluated as an average degree of substitution.

A mixture of the resulted cellulose nanofibers and water (slurry-like, solid content: 0.5 g), and 100 ml of acetone were loaded into a 200-milliliter centrifuge tube, and were mixed so as to be uniform. After that, a supernatant was removed by centrifuging the mixture with a centrifugal separator (1,200 rpm, 20 minutes). 150 Milliliters of acetone was added to the precipitate, and the mixture was stirred and was centrifuged again. The resultant was further washed by the same centrifugation operation twice, and then slurry-like cellulose nanofibers (solid content: 0.5 g, the total weight of acetone and the cellulose nanofibers was about 15 g) remaining at the bottom of the centrifuge tube, 20 g of pyridine, and 1.8 g of acetic anhydride were loaded into a 200-milliliter three-necked round-bottom flask. The flask was immersed in a silicone bath, and the mixture in the flask was heated and stirred at an oil bath temperature of 60° C. for 120 minutes. The flask was removed from the silicone bath, and 60 ml of methanol was added to the mixture, followed by uniform stirring. After that, the resultant mixture was transferred to the centrifuge tube, and its supernatant was removed by centrifugation. The same operation was further repeated twice to wash acetylation-modified cellulose nanofibers.

Figure 24:
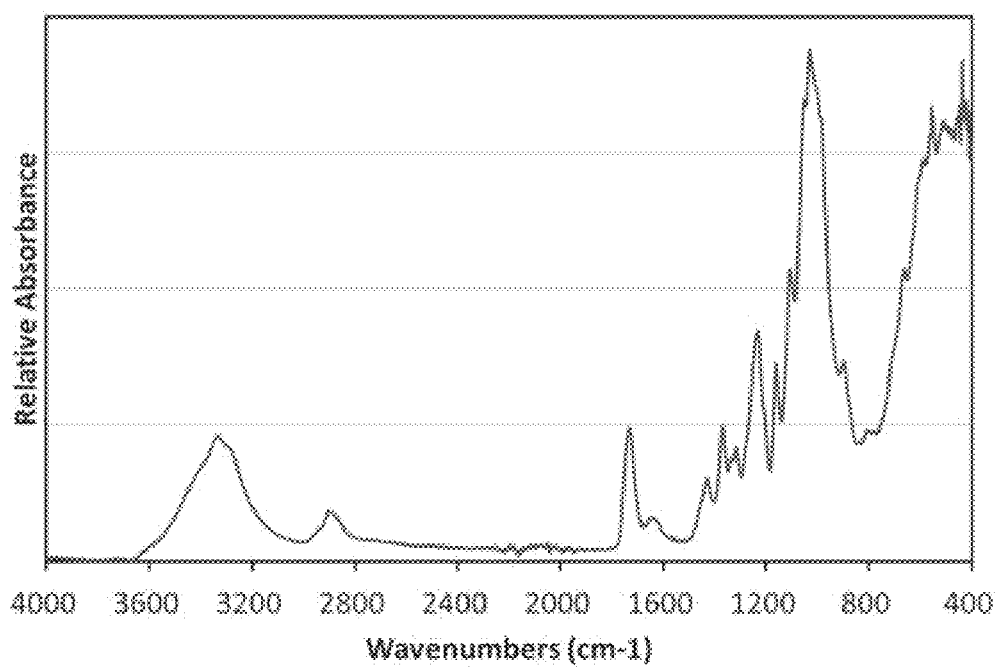
FIG. 24 is an IR spectrum of acetylation-modified cellulose nanofibers obtained in Example 25.

Next, the resultant acetylation-modified cellulose nanofibers were dispersed in a mixed liquid of methanol and water, and an aqueous solution of potassium carbonate was added to the solution until the pH of the solution became 8.5. Next, centrifugation was repeated under the same conditions as those described above three times to wash the nanofibers. The IR spectrum of the resulted acetylation-modified cellulose nanofibers is shown in FIG. 24, and the results of the measurement of their average degree of substitution and XRD are shown in Table 4. The absorption band (1,730 cm$^{-1}$) of a carbonyl group involved in acetylation modification clearly appeared in the IR spectrum of FIG. 24. In this Example, it was considered that part of the hydroxyl groups on the surfaces of the nanofibers were subjected to sulfuric acid esterification, and most of the remaining hydroxyl groups were subjected to esterification modification (acetylation modification).

TABLE 3

| | Composition (weight ratio) | Stirring means | Time (minute(s)) | Fiber diameter | Apperance of dispersion | Average degree of substitution of sulfuric acid ester groups | Crystallinity degree (%) |
|---|---|---|---|---|---|---|---|
| Example 25 | DMSO/acetic anhydride/ sulfuric acid/pulp (18/2/0.15/0.6) | Stirrer | 80 | Mostly 10 nm or less | Semitransparent gel | 0.12 | 69 |
| Example 26 | DMSO/acetic anhydride/ sulfuric acid/pulp (18/2/0.15/0.6) | Stirrer | 60 | Mostly 20 nm or less | Opaque liquid | 0 | 80 |
| Example 27 | DMSO/acetic anhydride/ sulfuric acid/pulp (18/1/0.15/0.6) | Stirrer | 120 | Mostly 20 nm or less | Opaque liquid | 0 | 85 |
| Example 28 | DMSO/acetic anhydride/ sulfuric acid/pulp (18/2/0.1/0.6) | Stirrer | 150 | Mostly 10 nm or less | Opaque gel | 0.11 | 67 |
| Example 29 | DMSO/acetic anhydride/ sulfuric acid/pulp (18/2/0.26/0.6) | Stirrer | 60 | Mostly 20 nm or less | Opaque liquid | 0 | 82 |
| Example 30 | DMSO/acetic anhydride/ sulfuric acid/pulp (45/2.5/0.5/0.6) | Paint shaker | 120 | Mostly 20 nm or less | Opaque gel-like appearance | 0 | 79 |
| Comparative Example 5 | DMSO/acetic anhydride/ sulfuric acid/pulp (20/0/0.25/0.6) | Stirrer | 120 | Several hundreds of nanometers to several tens of micrometers | White precipitate | 0 | — |

TABLE 4

|  | Weight of CNFs | Modification solvent | Modification reaction agent | Catalyst | Average degree of substitution | Crystallinity degree (%) |
|---|---|---|---|---|---|---|
| Example 25 | 0.5 g | Pyridine (20 g) | Acetic anhydride (1.8 g) | Pyridine (same as solvent) | 0.5 | 82 |
| Example 26 | 0.5 g | Pyridine (20 g) | Acetic anhydride (1.8 g) | Pyridine (same as solvent) | 0.48 | 70 |
| Example 27 | 0.5 g | Pyridine/acetone (10 g/10 g) | Acetic anhydride (1.8 g) | Pyridine (same as solvent) | 0.39 | 80 |
| Example 28 | 0.5 g | Pyridine/toluene (10 g/10 g) | Acetic anhydride (1.8 g) | Pyridine (same as solvent) | 0.35 | 69 |
| Example 29 | 0.5 g | DMF (20 g) | Vinyl acetate (3.0 g) | Potassium carbonate (0.6 g) | 0.36 | 80 |
| Example 30 | 0.5 g | DMAc/pyridine (10 g/10 g) | Acetic anhydride (1.8 g) | Pyridine (same as solvent) | 0.55 | 84 |
| Comparative Example 5 | 0.5 g | Pyridine (20 g) | Acetic anhydride (1.8 g) | Pyridine (same as solvent) | 0.2 | 85 |

CNF: cellulose nanofiber

Example 26

Figure 25:
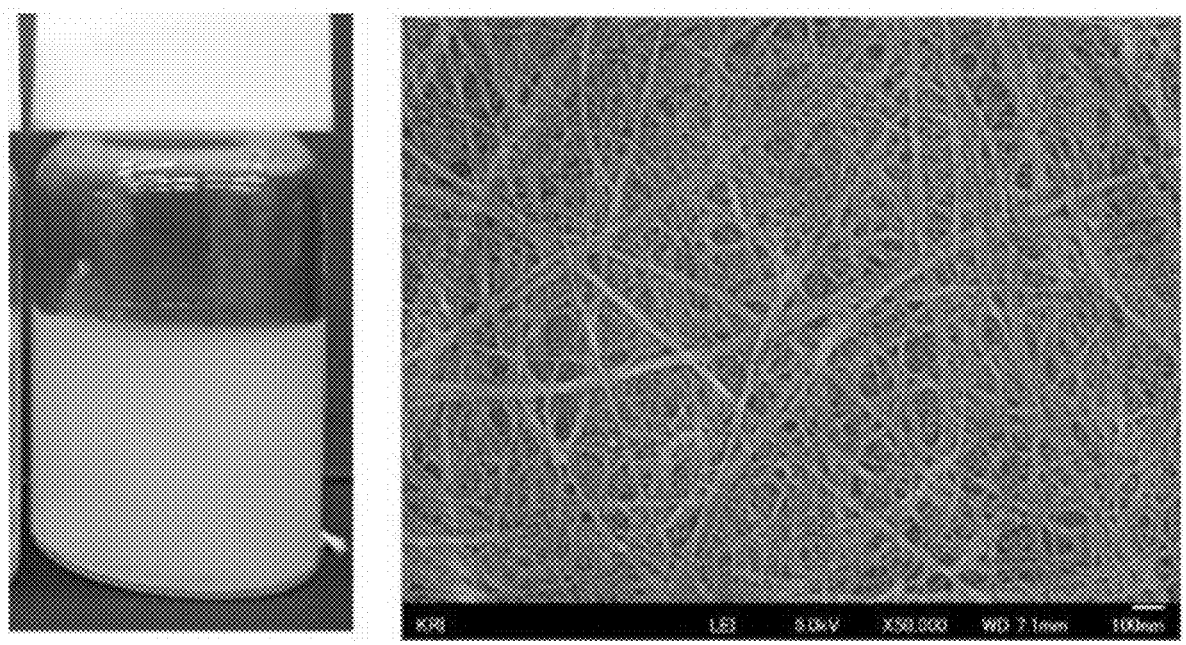
FIG. 25 are a SEM photograph of cellulose nanofibers obtained in the fibrillation step of Example 26 (right) and a photograph of an aqueous dispersion of the cellulose nanofibers (left).
Figure 26:
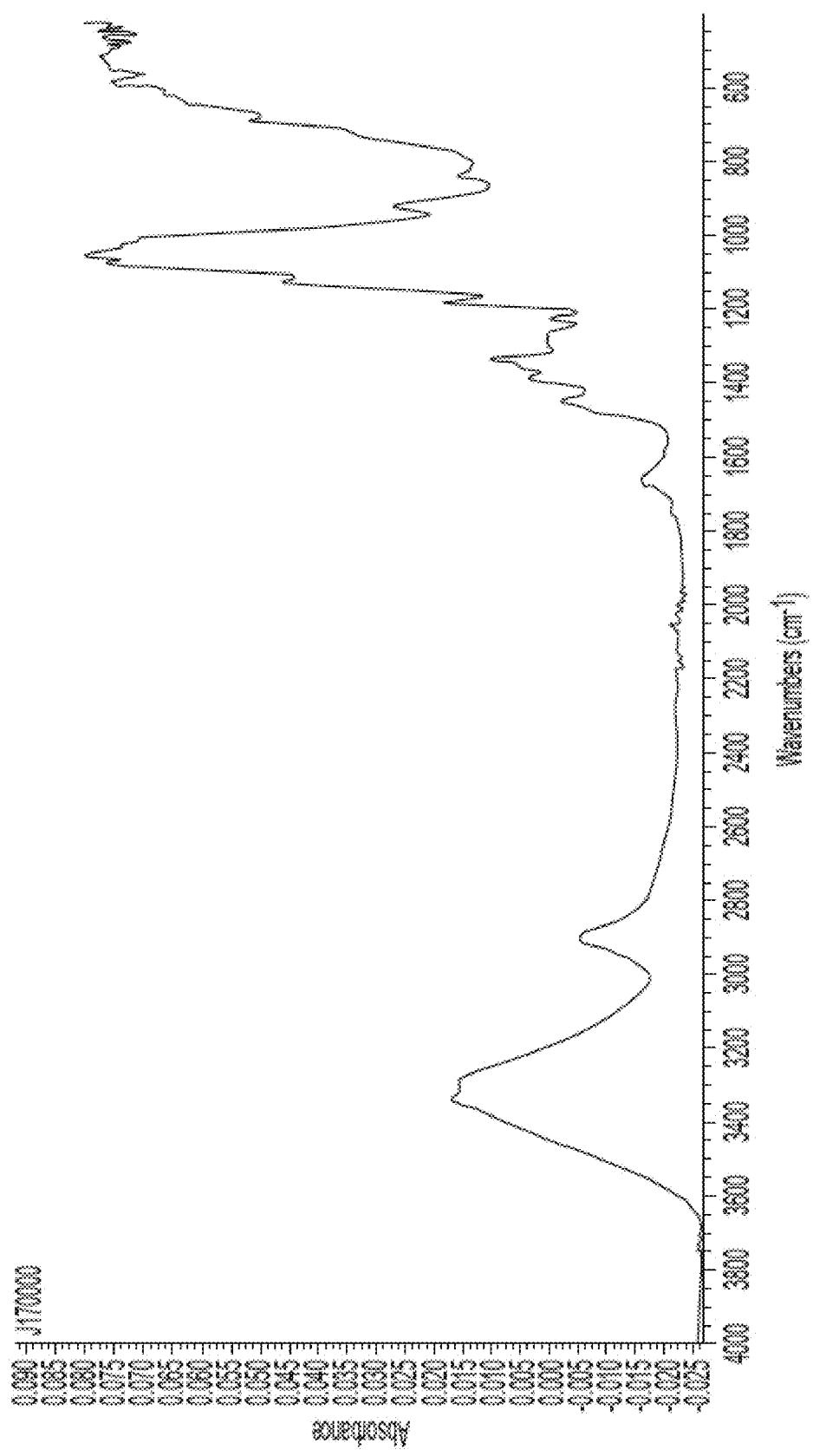
FIG. 26 is an IR spectrum of the cellulose nanofibers obtained in the fibrillation step of Example 26.
Figure 27:
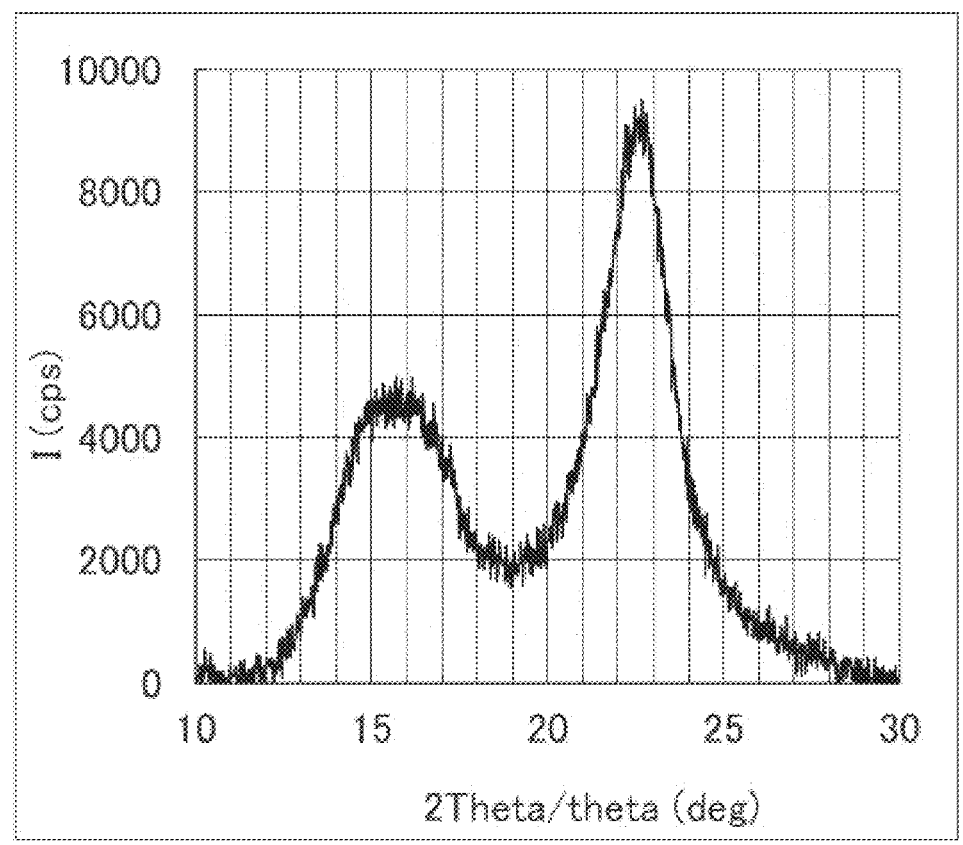
FIG. 27 is an XRD pattern of the cellulose nanofibers obtained in the fibrillation step of Example 26.

Cellulose nanofibers were prepared in the same manner as in the fibrillation step of Example 25 except that the reaction (fibrillation) time was changed to 60 minutes. The appearance and SEM photograph of the resultant aqueous dispersion of the cellulose nanofibers are shown in FIGS. 25, the IR spectrum of the nanofibers is shown in FIG. 26, and the XRD pattern thereof is shown in FIG. 27. The evaluation results of the average degree of substitution of sulfuric acid ester groups, and crystallinity degree, of the nanofibers are shown in Table 3. The sulfate ester modified cellulose nanofibers obtained in this Example had a sulfur content of less than 0.01 wt %.

The acetylation modification reaction of cellulose nanofibers was performed by using the resulted cellulose nanofibers in the same manner as in Example 25. The evaluation results of the average degree of substitution and XRD of the resulted modified cellulose nanofibers are shown in Table 4. In this Example, it was considered that most of the hydroxyl groups on the surfaces of the nanofibers were subjected to esterification modification (acetylation modification).

Example 27

Figure 28:
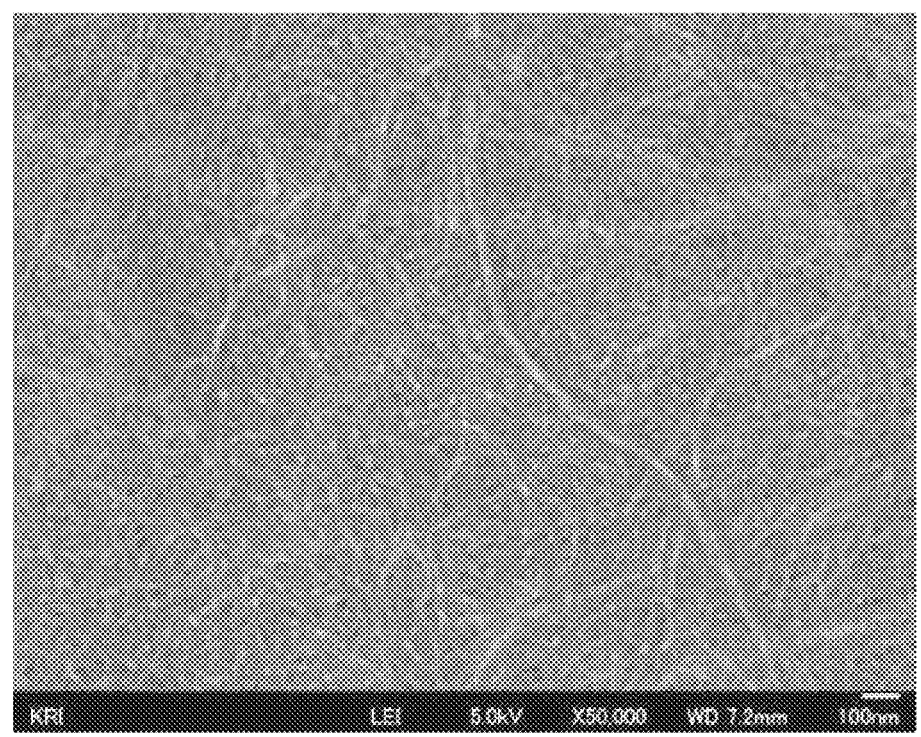
FIG. 28 is a SEM photograph of cellulose nanofibers obtained in the fibrillation step of Example 27.
Figure 29:
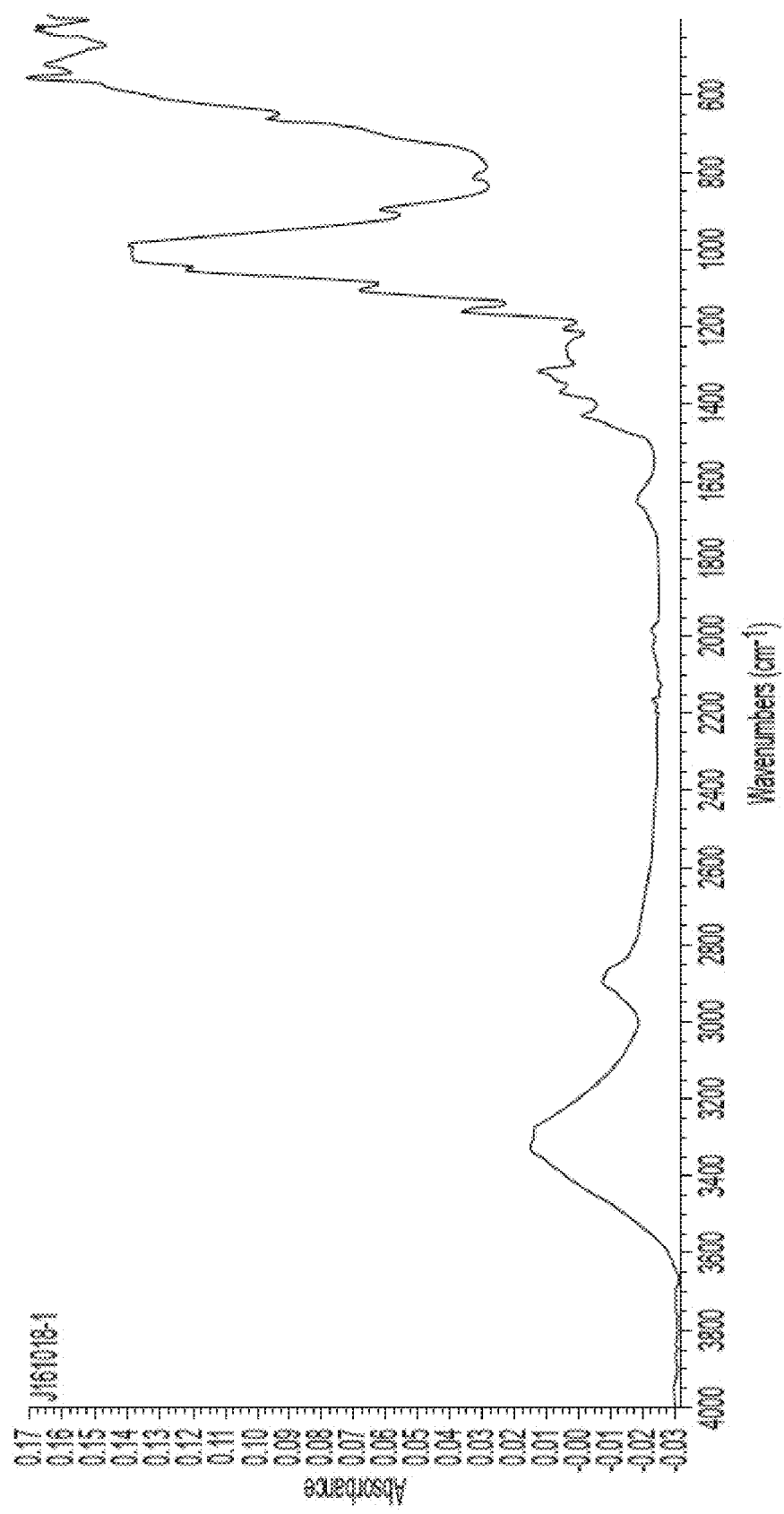
FIG. 29 is an IR spectrum of cellulose nanofibers obtained in the fibrillation step of Example 27.

Cellulose nanofibers were prepared in the same manner as in the fibrillation step of Example 25 except that the addition amount of acetic anhydride was changed to 1 g (concentration in a fibrillation solution: 5.2 wt %). The SEM photograph of the resulted cellulose nanofibers is shown in FIG. 28, and the IR spectrum of the nanofibers is shown in FIG. 29. The evaluation results of the average degree of substitution of sulfuric acid ester groups, and crystallinity degree, of the nanofibers are shown in Table 3. The sulfate ester modified cellulose nanofibers obtained in this Example had a sulfur content of less than 0.01 wt %.

The modification reaction of cellulose nanofibers was performed in the same manner as in Example 25 except that: the resulted cellulose nanofibers were used; and a mixed liquid of 10 g of pyridine and 10 g of acetone was used as a reaction solvent. The evaluation results of the average degree of substitution and XRD of the resulted modified cellulose nanofibers are shown in Table 4. In this Example, it is considered that most of the hydroxyl groups on the surfaces of the nanofibers are subjected to esterification modification (acetylation modification).

Example 28

Cellulose nanofibers were prepared in the same manner as in Example 25 except that: the addition amount of sulfuric acid was changed to 0.1 g (concentration in a fibrillation solution: 0.5 wt %); and the reaction time was changed to 150 minutes. The fiber diameters of most of the resulted cellulose nanofibers were 10 nm or less. The evaluation results of the average degree of substitution of sulfuric acid ester groups, and crystallinity degree, of the nanofibers are shown in Table 3. The resulted sulfate ester modified cellulose nanofibers had a sulfur content of 2.0 wt %.

The acetylation modification reaction of cellulose nanofibers was performed in the same manner as in Example 27 except that: the resulted cellulose nanofibers were used; and a mixed liquid of 10 g of pyridine and 10 g of toluene was used as a reaction solvent. The evaluation results of the average degree of substitution and XRD of the resulted acetylation-modified cellulose nanofibers are shown in Table 4. In this Example, it is considered that part of the hydroxyl groups on the surfaces of the nanofibers are subjected to sulfuric acid esterification, and most of the remaining hydroxyl groups are subjected to esterification modification (acetylation modification).

Example 29

Cellulose nanofibers were prepared in the same manner as in the fibrillation step of Example 26 except that the addition amount of sulfuric acid was changed to 0.26 g (concentration in a fibrillation solution: 1.28 wt %). The fiber diameters of most of the resulted cellulose nanofibers were 20 nm or less. The evaluation results of the average degree of substitution of sulfuric acid ester groups, and crystallinity degree, of the nanofibers are shown in Table 3.

The acetylation modification reaction of cellulose nanofibers was performed in the same manner as in Example 22 except that: the resulted cellulose nanofibers were used; the reaction solvent was changed to 20 g of dimethylformamide (DMF); and 3 g of vinyl acetate was used as an acetylation modification agent and 0.6 g of potassium carbonate was used as a catalyst. The evaluation results of the average degree of substitution and XRD of the resulted acetylation-modified cellulose nanofibers are shown in Table 4. In this Example, it is considered that most of the hydroxyl groups on the surfaces of the nanofibers are subjected to esterification modification (acetylation modification).

Example 30

Figure 30:
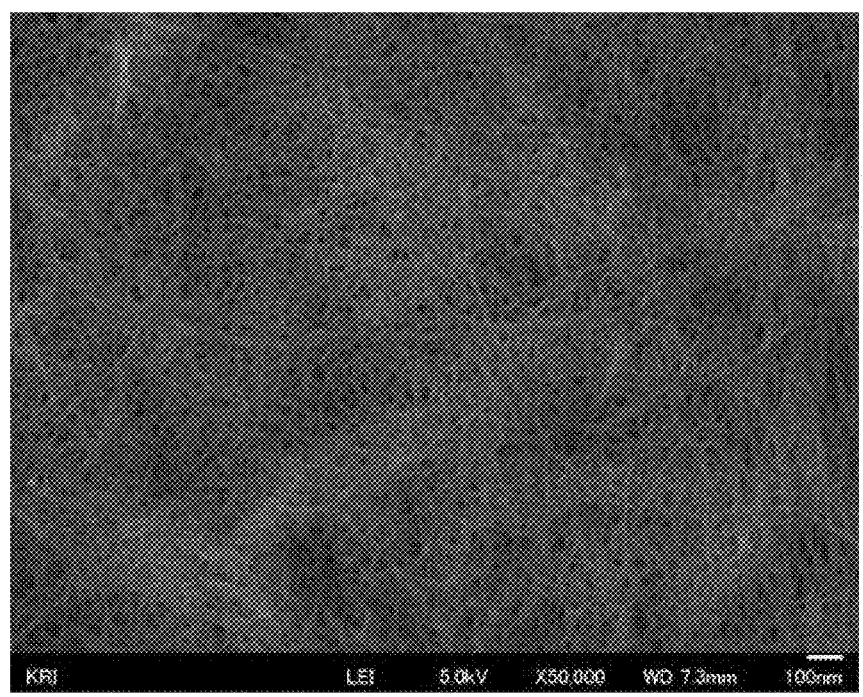
FIG. 30 is a SEM photograph of cellulose nanofibers obtained in the fibrillation step of Example 30.
Figure 31:
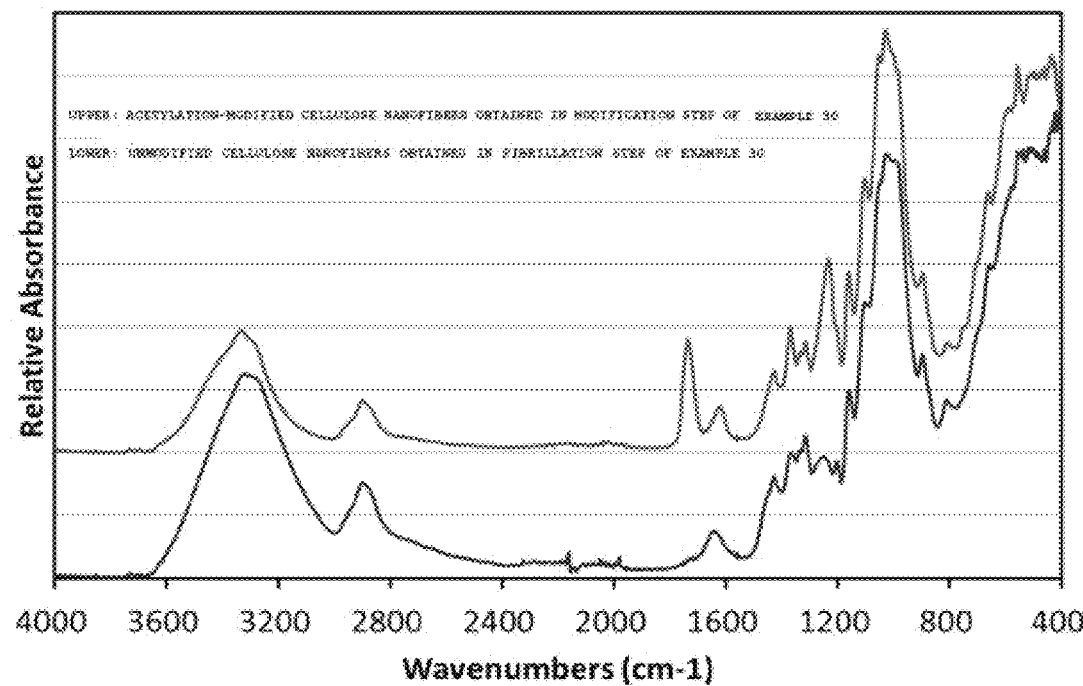
FIG. 31 is an IR spectrum of each of cellulose nanofibers after the fibrillation step (lower) and acetylation-modified cellulose nanofibers (upper) obtained in Example 30.

The cellulose was fibrillated, neutralized, and washed in the same manner as in the fibrillation step of Example 25 except the following: 45 g of DMSO, 2.5 g (concentration in a fibrillation solution: 5.2 wt %) of acetic anhydride, and 0.5 g (concentration in the fibrillation solution: 1.04 wt %) of sulfuric acid were loaded into a 250-milliliter polypropylene bottle, and 250 g of 5 mm zirconia beads were loaded into the bottle, followed by shaking with a paint shaker (RED DEVID) under a room temperature of 23° C. for 120 minutes. The addition amount of potassium carbonate for the neutralization was 3 g. The SEM photograph and IR spectrum of the resulted cellulose nanofibers are shown in FIG. 30 and FIG. 31, respectively. The evaluation results of the average degree of substitution of sulfuric acid ester groups, and crystallinity degree, of the nanofibers are shown in Table 3.

The modification reaction of cellulose nanofibers was performed in the same manner as in Example 24 except that: the resulted cellulose nanofibers were used; and a mixed liquid of 10 g of pyridine and 10 g of dimethylacetamide was used as a reaction solvent. The IR spectrum of the resulted modified cellulose nanofibers was shown in FIG. 31, and the evaluation results of the average degree of substitution and XRD of the nanofibers are shown in Table 4. In this Example, it is considered that most of the hydroxyl groups on the surfaces of the nanofibers are subjected to esterification modification.

Comparative Example 5

Figure 32:
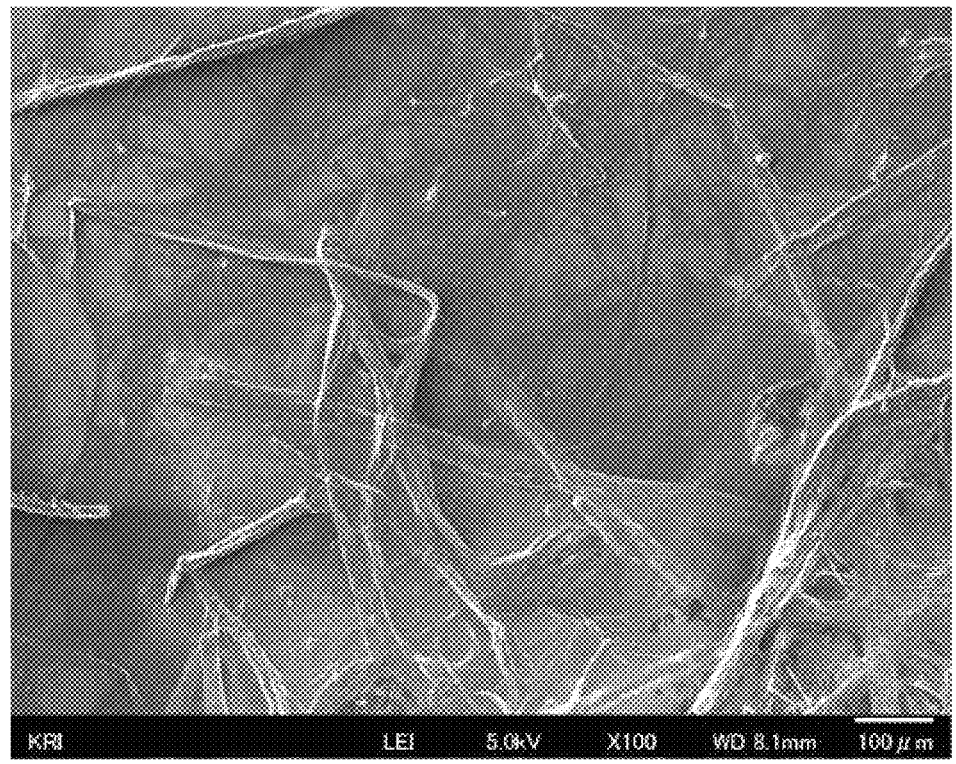
FIG. 32 is a SEM photograph of acetylation-modified cellulose fibers obtained in Comparative Example 6.

The cellulose was fibrillated in the same manner as in the fibrillation step of Example 25 except that acetic anhydride was not added. The SEM photograph of the resultant fibrillated product of the cellulose is shown in FIG. 32, and the evaluation results of the average degree of substitution of sulfuric acid ester groups, and crystallinity degree, of the fibrillated product are shown in Table 3. It was found from the SEM photograph that most of the cellulose fibers remained.

The esterification (acetylation) modification reaction of the fibrillated product containing the cellulose fibers was performed in the same manner as in Example 25. The evaluation results of the average degree of substitution and XRD of the resulted acetylation-modified cellulose fibers are shown in Table 4. In this Comparative Example, a large part of the hydroxyl groups on the surfaces of the fibers were subjected to esterification modification, but most of the fiber diameters of the resulted esterification (acetylation)-modified cellulose fibers were from several micrometers to several tens of micrometers.

INDUSTRIAL APPLICABILITY

The sulfate ester modified cellulose nanofibers of the present invention have high aspect ratios and an average fiber diameter of 20 nm or less, and hence the cellulose nanofibers have characteristics such as a high viscosity and high thixotropy. Accordingly, the sulfate ester modified cellulose nanofibers of the present invention have been highly expected to find use in a thickener, a thixotropy-imparting agent, a surfactant, a humectant or an absorbent, and a pharmaceutical agent. Further, the sulfate ester modified cellulose nanofibers are applicable to a film or sheet material-reinforcing material. Further, the sulfate ester modified cellulose nanofibers have been expected to find use in an application as a medical material by exploiting their antiviral properties. In addition, according to the production method of the present invention, cellulose nanofibers can be produced in an energy-saving manner and at a high fibrillation rate. Further, according to the production method of the present invention, the fiber diameters of cellulose nanofibers can be easily controlled, and hence cellulose nanofibers each having a fiber diameter of from several nanometers to several hundreds of nanometers can be easily prepared.

The invention claimed is:

1. A method of producing cellulose nanofibers, comprising
preparing a fibrillation solution containing dimethylsulfoxide, at least one carboxylic acid anhydride selected from acetic anhydride and propionic anhydride, and sulfuric acid,
impregnating cellulose with the fibrillation solution to fibrillate the cellulose, and
subjecting hydroxyl groups on surfaces of the cellulose to sulfuric acid esterification modification,
wherein the cellulose nanofibers comprise cellulose nanofibers having sulfate ester modified hydroxyl groups on surfaces of the cellulose nanofibers.

2. The method of producing cellulose nanofibers according to claim 1, wherein a weight ratio between the cellulose and the fibrillation solution is from 0.5/99.5 to 50/50 in terms of former/latter ratio.

3. The method of producing cellulose nanofibers according to claim 1, wherein a concentration of the sulfuric acid in the fibrillation solution is from 0.05 wt % to 15 wt %.

4. The method of producing cellulose nanofibers according to claim 1, wherein a concentration of the carboxylic acid anhydride in the fibrillation solution is from 0.5 wt % to 90 wt %.

5. A method of producing modified cellulose nanofibers, comprising the steps of:
producing cellulose nanofibers by the method of claim 1; and
reacting the resulted cellulose nanofibers to further react with an esterification modification agent or a urethanization modification agent to modify surfaces of the cellulose nanofibers.

6. The method of producing modified cellulose nanofibers according to claim 5, wherein a concentration of sulfuric acid in a fibrillation solution to be used in the step of producing the cellulose nanofibers is from 0.05 wt % to 5 wt %.

7. The method of producing modified cellulose nanofibers according to claim 5, wherein the esterification modification agent comprises at least one kind selected from a carboxylic acid anhydride, a vinyl carboxylate, a carboxylic acid halide, and a carboxylic acid.

8. The method of producing modified cellulose nanofibers according to claim 5, wherein the urethanization modification agent comprises an isocyanate.

9. The method of producing cellulose nanofibers according to claim 2, wherein a concentration of the carboxylic acid anhydride in the fibrillation solution is from 0.5 wt % to 90 wt %.

* * * * *